(12) United States Patent
Ohno

(10) Patent No.: US 9,013,527 B2
(45) Date of Patent: Apr. 21, 2015

(54) LIGHT-EMITTING COMPONENT, PRINT HEAD AND IMAGE FORMING APPARATUS

(71) Applicant: Fuji Xerox Co., Ltd., Minato-ku, Tokyo (JP)

(72) Inventor: Seiji Ohno, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/178,971

(22) Filed: Feb. 12, 2014

(65) Prior Publication Data

US 2014/0320577 A1    Oct. 30, 2014

(30) Foreign Application Priority Data

Apr. 25, 2013    (JP) .................................. 2013-093114

(51) Int. Cl.
*G03G 13/04* (2006.01)
*G03G 15/04* (2006.01)
*G02B 27/00* (2006.01)

(52) U.S. Cl.
CPC ...... *G03G 15/04054* (2013.01); *G02B 27/0087* (2013.01)

(58) Field of Classification Search
CPC ..... H01L 27/15; H01L 27/153; H01L 27/156; H01L 33/005; G03G 15/04054
USPC ............... 347/79, 118, 141; 257/79
See application file for complete search history.

(56) References Cited

U.S. PATENT DOCUMENTS

| 5,451,977 | A | 9/1995 | Kusuda et al. |
| 5,814,841 | A | 9/1998 | Kusuda et al. |
| 6,180,960 | B1 * | 1/2001 | Kusuda et al. ................... 257/91 |
| 6,717,182 | B1 * | 4/2004 | Tagami et al. ................... 257/83 |
| 8,134,178 | B2 * | 3/2012 | Ohno ............................. 257/157 |

FOREIGN PATENT DOCUMENTS

JP    2784011 B2    8/1998

* cited by examiner

*Primary Examiner* — Alessandro Amari
*Assistant Examiner* — Michael Konczal
(74) *Attorney, Agent, or Firm* — Sughrue Mion, PLLC

(57) ABSTRACT

A light-emitting component includes: plural transfer thyristors each configured with a semiconductor layer stack laminating first to fourth semiconductor layers, and shifting to an ON state in order; plural coupling transistors each configured with the first to third semiconductor layers, provided to couple adjacent transfer thyristors, the first and the second semiconductor layers of the coupling transistor being continued to the first and the second semiconductor layers of the former transfer thyristor; plural first resistances, each provided between the third semiconductor layer of each transfer thyristor and a wiring for power supply; a second resistance having a resistance value smaller than a product of a resistance value of the first resistance and a ratio of a collector current of the coupling transistor to a cathode current of the transfer thyristor in the ON state; and plural light-emitting thyristors each configured with the semiconductor layer stack.

14 Claims, 19 Drawing Sheets

LIGHT-EMITTING COMPONENT, PRINT HEAD AND IMAGE FORMING APPARATUS

CROSS REFERENCE TO RELATED APPLICATIONS

This application is based on and claims priority under 35 USC §119 from Japanese Patent Application 2013-093114 filed Apr. 25, 2013.

BACKGROUND

1. Technical Field

The present invention relates to a light-emitting component, a print head and an image forming apparatus.

2. Related Art

In an electrophotographic image forming apparatus such as a printer, a copying machine or a facsimile machine, an image is formed on a recording sheet as follows. Firstly, an electrostatic latent image is formed on a charged photoconductor by causing an optical recording unit to emit light of a predetermined wavelength so as to transfer image information onto the photoconductor. Then, the electrostatic latent image is made visible by being developed with toner. Lastly, the toner image is transferred on and fixed to the recording sheet. In addition to an optical-scanning recording unit that performs exposure by laser scanning in the fast scanning direction using a laser beam, a recording device using the following LED print head (LPH) has been employed as such an optical recording unit in recent years in response to demand for downsizing the apparatus. This LPH includes plural light-emitting diodes (LEDs), serving as light-emitting elements, arrayed in the fast scanning direction.

In addition, in a light-emitting chip that mounts a self-scanning type light-emitting element array (SLED) in which plural light-emitting elements are provided in lines on a substrate and subjected to successive lighting control, light-emitting thyristors are used as the light-emitting elements.

SUMMARY

According to an aspect of the present invention, there is provided a light-emitting component including: plural transfer thyristors, each configured with a semiconductor layer stack in which a first semiconductor layer of a first conduction type, a second semiconductor layer of a second conduction type, which is different from the first conduction type, a third semiconductor layer of the first conduction type and a fourth semiconductor layer of the second conduction type are laminated in order, each of the plural transfer thyristors shifting to an ON state in order; plural coupling transistors, each configured with the first semiconductor layer, the second semiconductor layer and the third semiconductor layer in the semiconductor layer stack, provided to couple a former transfer thyristor and a latter transfer thyristor that are adjacent in the order of transferring the ON state in the plural transfer thyristors, and setting the latter transfer thyristor in a condition capable of shifting to the ON state by causing the coupling transistor itself to be in the ON state affected by the former transfer thyristor shifting to the ON state, the first semiconductor layer and the second semiconductor layer of each coupling transistor being continued to the first semiconductor layer and the second semiconductor layer of the former transfer thyristor; plural first resistances, each provided between the third semiconductor layer of each of the plural transfer thyristors and a wiring for power supply; a second resistance provided on an end portion of a wiring that is commonly connected to the fourth semiconductor layer of each of the plural transfer thyristors for supplying a potential to set the transfer thyristor in the ON state, a resistance value of the second resistance being smaller than a product of a resistance value the first resistance and a ratio of a collector current of one of the plural coupling transistors connected subsequent to one of the plural transfer thyristors that is in the ON state to a cathode current of the transfer thyristor in the ON state; and plural light-emitting thyristors, each configured with the semiconductor layer stack, being set in a light-enabled state corresponding to one of the plural transfer thyristors that is in the ON state, and emitting light of a predetermined wavelength by shifting from an OFF state to the ON state.

BRIEF DESCRIPTION OF THE DRAWINGS

Exemplary embodiments of the present invention will be described in detail based on the following figures, wherein.

DETAILED DESCRIPTION

Hereinafter, a description will be given of an exemplary embodiment of the present invention in detail with reference to the accompanying drawings.

First Exemplary Embodiment

Image Forming Apparatus 1

Figure 1:
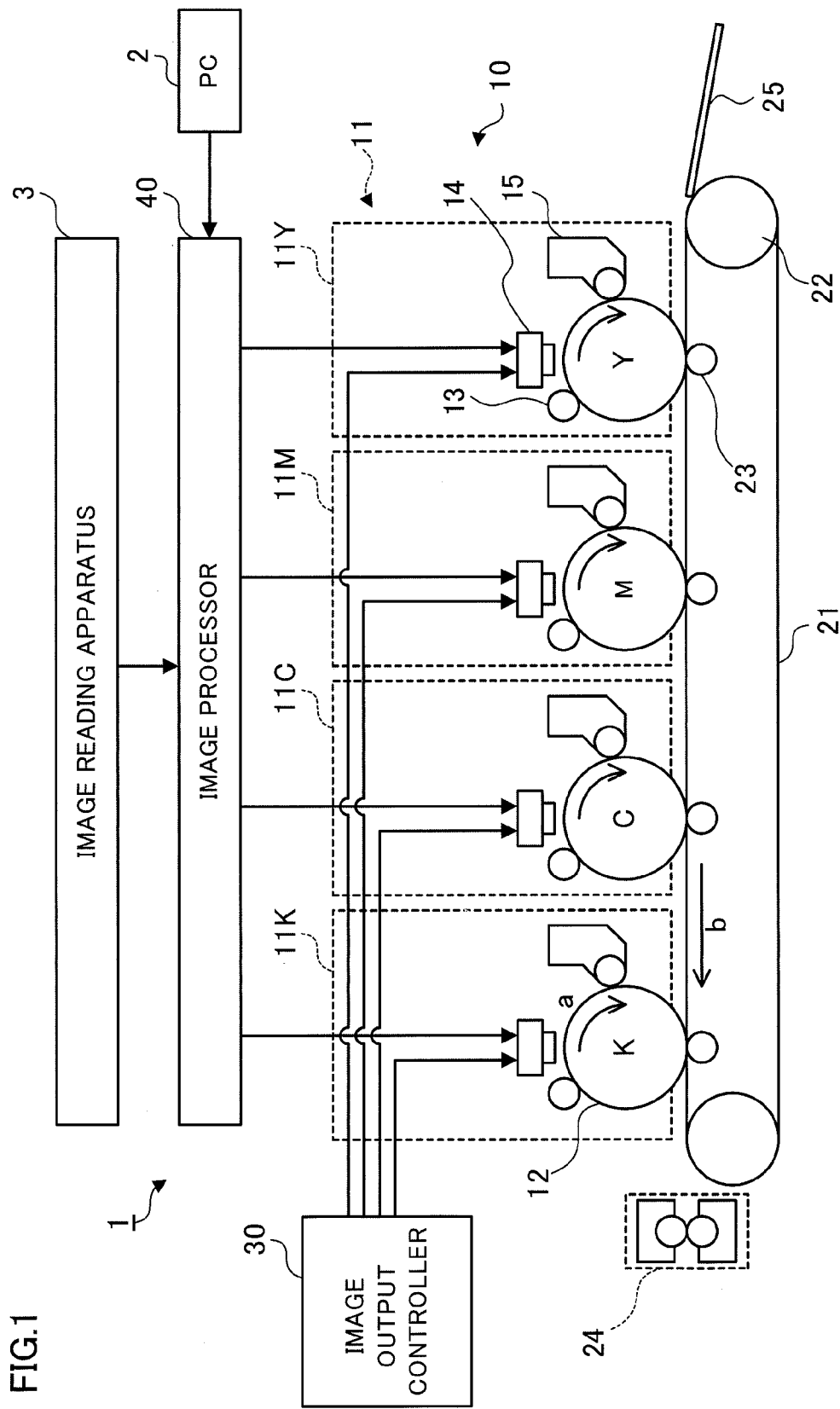
FIG. 1 is a diagram showing an example of an overall configuration of an image forming apparatus to which the first exemplary embodiment is applied.

FIG. 1 is a diagram showing an example of an overall configuration of an image forming apparatus 1 to which the first exemplary embodiment is applied. The image forming apparatus 1 shown in FIG. 1 is what is generally termed as a tandem image forming apparatus. The image forming apparatus 1 includes an image forming process unit 10, an image output controller 30 and an image processor 40. The image forming process unit 10 forms an image in accordance with different color image data. The image output controller 30 controls the image forming process unit 10. The image processor 40, which is connected to devices such as a personal computer (PC) 2 and an image reading apparatus 3, performs predefined image processing on image data received from the above devices.

The image forming process unit 10 includes image forming units 11 formed of plural engines arranged in parallel at intervals set in advance. The image forming units 11 are formed of four image forming units 11Y, 11M, 11C and 11K. Each of the image forming units 11Y, 11M, 11C and 11K includes a photoconductive drum 12, a charging device 13, a print head 14 and a developing device 15. On the photoconductive drum 12, which is an example of an image carrier, an electrostatic latent image is formed, and the photoconductive drum 12 retains a toner image. The charging device 13, as an example of a charging unit, charges the surface of the photoconductive drum 12 at a predetermined potential. The print head 14 exposes the photoconductive drum 12 charged by the charging device 13. The developing device 15, as an example of a developing unit, develops an electrostatic latent image formed by the print head 14. The image forming units 11Y, 11M, 11C and 11K form yellow (Y), magenta (M), cyan (C) and black (K) toner images, respectively.

In addition, the image forming process unit 10 further includes a sheet transport belt 21, a drive roll 22, transfer rolls 23 and a fixing device 24. The sheet transport belt 21 transports a recording sheet 25 as a transferred body so that different color toner images respectively formed on the photoconductive drums 12 of the image forming units 11Y, 11M, 11C and 11K are transferred on the recording sheet 25 by multilayer transfer. The drive roll 22 is a roll that drives the sheet transport belt 21. Each transfer roll 23, as an example of a transfer unit, transfers a toner image formed on the corresponding photoconductive drum 12 onto the recording sheet 25. The fixing device 24 fixes the toner images on the recording sheet 25.

In this image forming apparatus 1, the image forming process unit 10 performs an image forming operation on the basis of various kinds of control signals supplied from the image output controller 30. Under the control by the image output controller 30, the image data received from the personal computer (PC) 2 or the image reading apparatus 3 is subjected to image processing by the image processor 40, and then the resultant data is supplied to the corresponding image forming unit 11. Then, for example in the black (K) color image forming unit 11K, the photoconductive drum 12 is charged at a predetermined potential by the charging device 13 while rotating in an arrow a direction, and then is exposed by the print head 14 emitting light on the basis of the image data supplied from the image processor 40. By this operation, the electrostatic latent image for the black (K) color image is formed on the photoconductive drum 12. Thereafter, the electrostatic latent image formed on the photoconductive drum 12 is developed by the developing device 15, and accordingly the black (K) color toner image is formed on the photoconductive drum 12. Yellow (Y), magenta (M) and cyan (C) color toner images are also formed in the image forming units 11Y, 11M and 11C, respectively.

The respective color toner images on the photoconductive drums 12, which are formed in the respective image forming units 11, are electrostatically transferred to the recording sheet 25 supplied with the movement of the sheet transport belt 21 by a transfer electric field applied to the transfer rolls 23, in sequence. Here, the sheet transport belt 21 moves in an arrow b direction. By this operation, a synthetic toner image, which is superimposed color-toner images, is formed on the recording sheet 25.

Thereafter, the recording sheet 25 on which the synthetic toner image is electrostatically transferred is transported to the fixing device 24. The synthetic toner image on the recording sheet 25 transported to the fixing device 24 is fixed on the recording sheet 25 through fixing processing using heat and pressure by the fixing device 24, and then is outputted from the image forming apparatus 1.

(Print Head 14)

Figure 2:
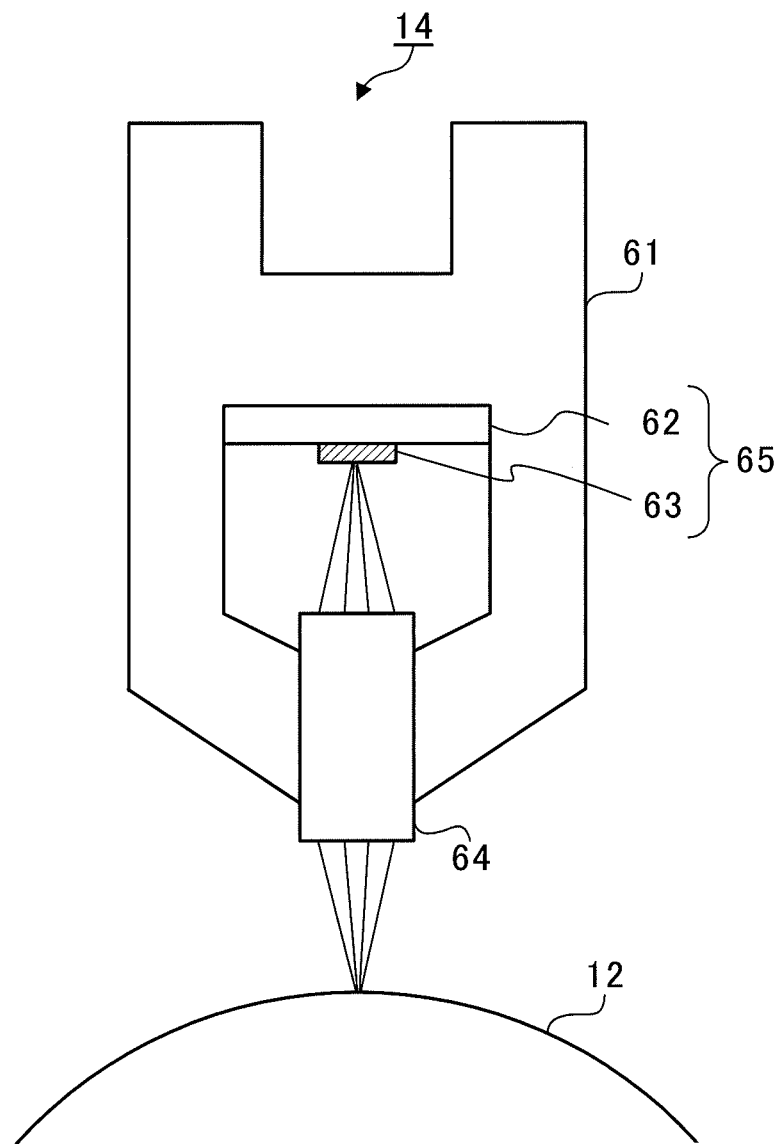
FIG. 2 is a cross-sectional view showing a configuration of a print head.

FIG. 2 is a cross-sectional view showing a configuration of the print head 14. The print head 14, as an example of an exposure unit, includes a housing 61, a light-emitting device 65 and a rod lens array 64. The light-emitting device 65, as an example of a light-emitting unit, includes a light source portion 63 formed of plural light-emitting elements (light-emitting thyristors in the first exemplary embodiment) that exposes the photoconductive drum 12. The rod lens array 64, as an example of an optical unit, focuses light emitted by the light source portion 63 onto the surface of the photoconductive drum 12.

The light-emitting device 65 also includes a circuit board 62 on which the above-described light source portion 63, a signal generating circuit 110 (refer to FIG. 3, which will be described later) driving the light source portion 63 and the like are mounted.

The housing 61 is made of metal, for example, and supports the circuit board 62 and the rod lens array 64. The housing 61 is set so that the light-emitting surfaces of the light-emitting elements in the light-emitting portions 63 (surfaces of regions 311 in FIGS. 6A and 6B, which will be described later) are located on the focal plane of the rod lens array 64. In addition, the rod lens array 64 is arranged along an axial direction of the photoconductive drum 12 (the fast scanning direction and also X direction in FIG. 3 and FIG. 4B, which will be described later.).

Figure 3:
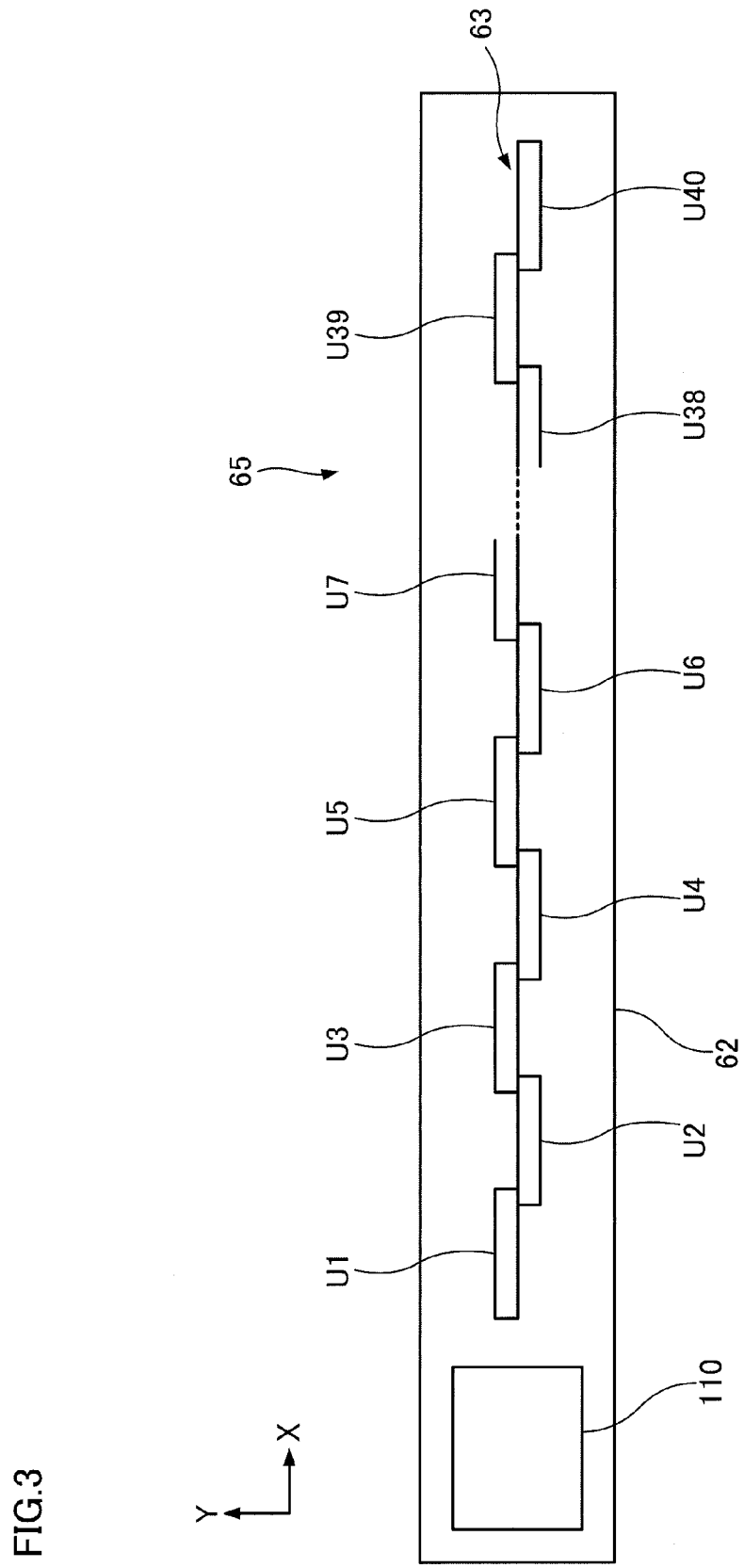
FIG. 3 is a top view of a light-emitting device to which the first exemplary embodiment is applied.

FIG. 3 is a top view of the light-emitting device 65 to which the first exemplary embodiment is applied.

In the light-emitting device 65 shown as an example in FIG. 3, the light source portion 63 is configured with forty light-emitting chips U1 to U40 which are arranged on the circuit board 62 in two lines in the X direction, which is the fast scanning direction, in a staggered manner.

In this specification, "to" in, for example, "U1 to U40" as described above is used for representing plural constituents distinguished by numbers, and means to include constituents located both prior to and subsequent to "to" and constituents having numbers therebetween. For example, "light-emitting chips U1 to U40" includes from the light-emitting chip U1 up to the light-emitting chip U40 in numerical order.

The configurations of the light-emitting chips U1 to U40 may be the same with each other. Thus, the light-emitting chips U1 to U40, when not separately distinguished, are labeled as light-emitting chips U.

It should be noted that, though the number of the light-emitting chips U is forty in total in the first exemplary embodiment, the configuration is not limited to this.

In addition, the light-emitting device 65 has the signal generating circuit 110 that drives the light source portion 63. The signal generating circuit 110 is configured with, for example, an integrated circuit (IC) or the like. It should be noted that the light-emitting device 65 may not be provided with the signal generating circuit 110. In such a case, the signal generating circuit 110 is provided at the outside of the light-emitting device 65, and a control signal for controlling the light-emitting chips U1 to U40 is supplied to the light-emitting device 65 via a cable or the like. However, here, a description will be given on the assumption that the light-emitting device 65 has the signal generating circuit 110.

An arrangement of the light-emitting chips U1 to U40 will be described in detail later.

Figure 4A:
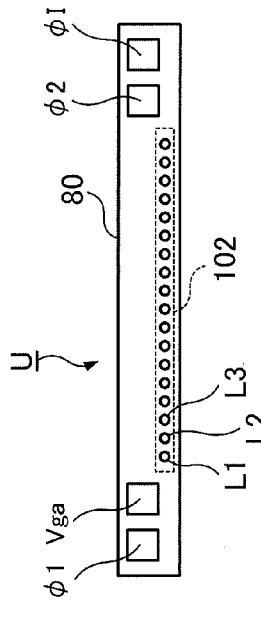
FIGS. 4A and 4B are diagrams showing a configuration of a light-emitting chip, a configuration of a signal generating circuit of the light-emitting device and a wiring configuration on a circuit board, to which the first exemplary embodiment is applied.
Figure 4B:
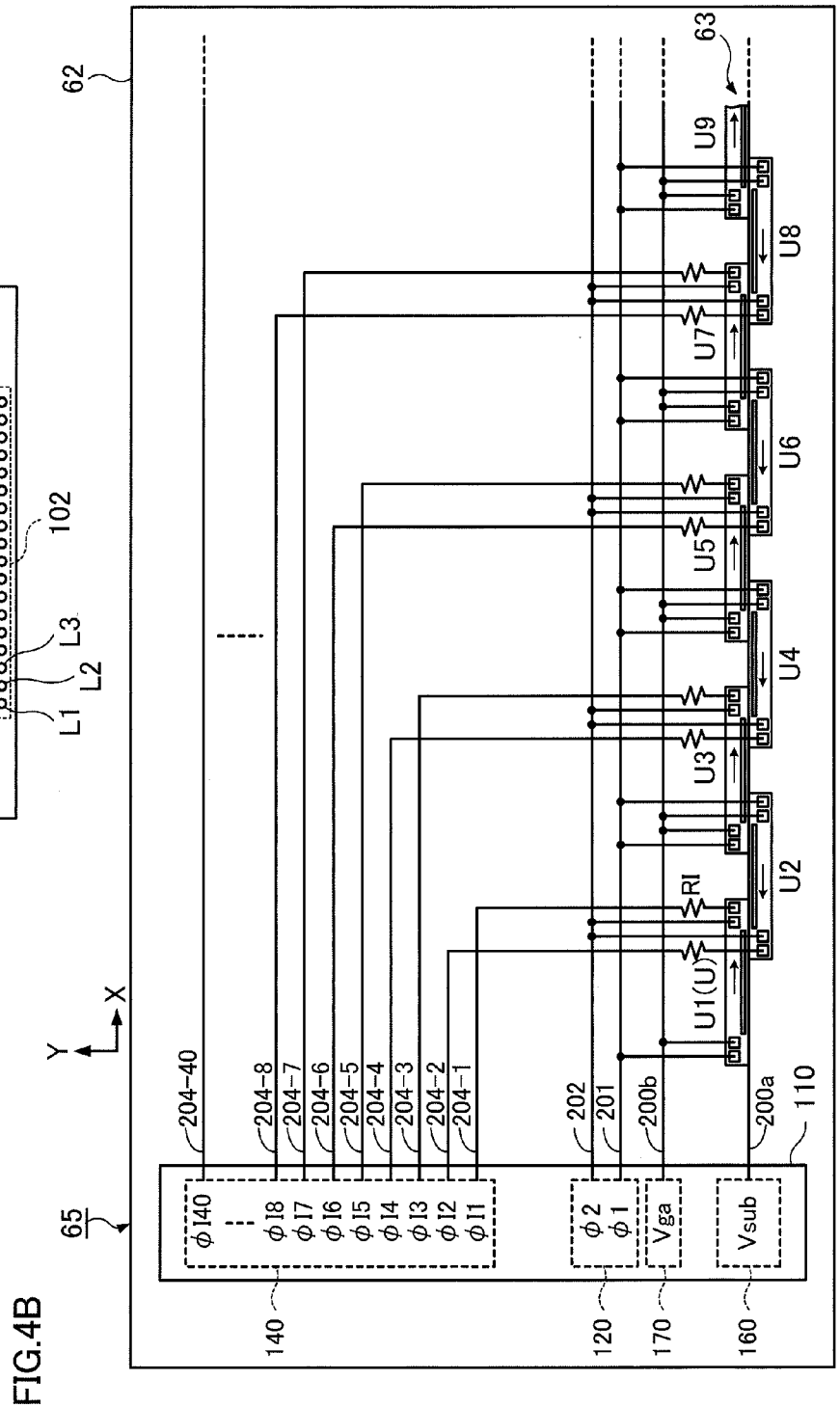

FIGS. 4A and 4B are diagrams showing a configuration of a light-emitting chip U, a configuration of the signal generating circuit 110 of the light-emitting device 65 and a wiring (line) configuration on the circuit board 62, to which the first exemplary embodiment is applied. FIG. 4A shows the configuration of the light-emitting chip U, and FIG. 4B shows the configuration of the signal generating circuit 110 of the light-emitting device 65, and the wiring (line) configuration on the circuit board 62.

First, the configuration of the light-emitting chip U shown in FIG. 4A will be described.

The light-emitting chip U includes a light-emitting portion 102 that includes multiple light-emitting elements (light-emitting thyristors L1, L2, L3, . . . , in the first exemplary embodiment) provided in line along the longitudinal side of one of longitudinal sides on a surface of a substrate 80 having a rectangular surface shape. The light-emitting chip U also includes terminals (φ1 terminal, φ2 terminal, Vga terminal and φI terminal) at both ends in the longitudinal direction of the substrate 80, the terminals being multiple bonding pads to receive various kinds of control signals. It should be noted that these terminals are provided in the order of the φ1 terminal and the Vga terminal from one end of the substrate 80, and are provided in the order of the φI terminal and the φ2 terminal from the other end of the substrate 80. The light-emitting portion 102 is provided between the Vga terminal and the φ2 terminal. Further, on a rear surface of the substrate 80, a back-side electrode 85 (refer to FIG. 6B, which will be described later) is provided as a Vsub terminal.

It should be noted that "in line" is not limited to a case where the plural light-emitting elements are provided on a single straight line as shown in FIG. 4A, but may allow each light-emitting element of the plural light-emitting elements to be arranged with a shifting amount that is different from one another with respect to a direction perpendicular to the line direction. For example, when the light-emitting surface of the light-emitting element (the surface of the region 311 in FIGS. 6A and 6B, which will be described later) is assumed to be a pixel, each light-emitting element may be arranged with a shifting amount of several pixels or some tens of pixels with respect to the direction perpendicular to the line direction. Moreover, adjacent light-emitting elements or groups of plural light-emitting elements may be alternately arranged in the staggered manner.

Next, the configuration of the signal generating circuit 110 of the light-emitting device 65 and the wiring (line) configuration on the circuit board 62 are described with reference to FIG. 4B.

As described above, the circuit board 62 of the light-emitting device 65 is mounted with the signal generating circuit 110 and light-emitting chips U1 to U40, and wiring (line) to connect between the signal generating circuit 110 and the light-emitting chips U1 to U40 is provided.

First, the configuration of the signal generating circuit 110 is described.

The signal generating circuit 110 receives input of image-processed image data and various kinds of control signals from an image output controller 30 and an image processor 40 (refer to FIG. 1). The signal generating circuit 110 rearranges the image data and corrects amount of light based on these image data and various kinds of control signals.

The signal generating circuit 110 includes a transfer signal generating part 120 that transmits a first transfer signal φ1 and a second transfer signal φ2 to the light-emitting chips U1 to U40 based on various kinds of control signals.

Moreover, the signal generating circuit 110 further includes a light-up signal generating part 140 that transmits light-up signals φI1 to φI40 to the light-emitting chips U1 to U40, respectively, based on various kinds of control signals. It should be noted that the light-up signals φI1 to φI40, when not separately distinguished, are labeled as a light-up signal φI.

Still further, the signal generating circuit 110 includes a reference potential supply portion 160 that supplies a reference potential Vsub, which serves as a reference of potential, to the light-emitting chips U1 to U40 and a power supply potential supply portion 170 that supplies a power supply potential Vga to the light-emitting chips U1 to U40 to drive thereof.

Next, an arrangement of the light-emitting chips U1 to U40 will be described.

Odd numbered light-emitting chips U1, U3, U5, . . . are arranged in line at intervals along the longitudinal side direction of each substrate 80. Similarly, even numbered light-emitting chips U2, U4, U6, . . . are arranged in line at intervals along the longitudinal side direction of each substrate 80. The odd numbered light-emitting chips U1, U3, U5, . . . and the even numbered light-emitting chips U2, U4, U6, . . . are arranged in a staggered pattern in a state of being rotated at 180° with each other so that the longitudinal sides on the light-emitting portion 102 side provided in the light-emitting chips U face each other. The light-emitting chips U are set so that the light-emitting elements are arranged at predetermined intervals in the fast scanning direction (the X direction). It should be noted that, in the light-emitting chips U1, U2, U3, . . . in FIG. 4B, directions of arrangements of the light-emitting elements in the light-emitting portion 102 shown in FIG. 4A (in the first exemplary embodiment, the numerical order of the light-emitting thyristors L1, L2, L3, . . . ) are indicated by arrows.

The wiring (line) to connect between the signal generating circuit 110 and the light-emitting chips U1 to U40 will be described.

The circuit board 62 is provided with a power supply line 200a that is connected to the back-side electrode 85 (refer to FIG. 6B to be described later) provided to the rear surface of the substrate 80 of the light-emitting chip U, which is the Vsub terminal, to supply the reference potential Vsub.

The circuit board 62 is also provided with a power supply line 200b that is connected to the Vga terminal provided to each light-emitting chip U to supply a power supply potential Vga for driving.

The circuit board 62 is also provided with a first transfer signal line 201 to transmit a first transfer signal φ1 from the transfer signal generating part 120 of the signal generating circuit 110 to the φ1 terminals of the light-emitting chips U1 to U40 and a second transfer signal line 202 to transmit a second transfer signal φ2 to the φ2 terminals of the light-emitting chips U1 to U40.

Moreover, the circuit board 62 includes a light-up signal lines 204-1 to 204-40 to transmit light-up signals φI1 to φI40 from the light-up signal generating part 140 of the signal generating circuit 110 to φI terminals of the light-emitting chips U1 to U40 via current limitation resistances RI, respectively.

The reference potential Vsub and the power supply potential Vga are supplied to all the light-emitting chips U1 to U40 on the circuit board 62 in common. The first transfer signal φ1 and the second transfer signal φ2 are also transmitted to the light-emitting chips U1 to U40 in common (in parallel). On the other hand, the light-up signals φI1 to φI40 are separately transmitted to the light-emitting chips U1 to U40, respectively.

It should be noted that, in a case where the light-emitting device 65 is not provided with the signal generating circuit 110, in the light-emitting device 65, the power supply lines 200a and 200b, the first transfer signal line 201, the second transfer signal line 202 and the light-up signal lines 204-1 to 204-40 are connected to a connector or the like instead of the signal generating circuit 110, and then connected to the signal generating circuit 110 provided at the outside via a cable connected to the connector or the like.

(Light-Emitting Chip U)

Figure 5:
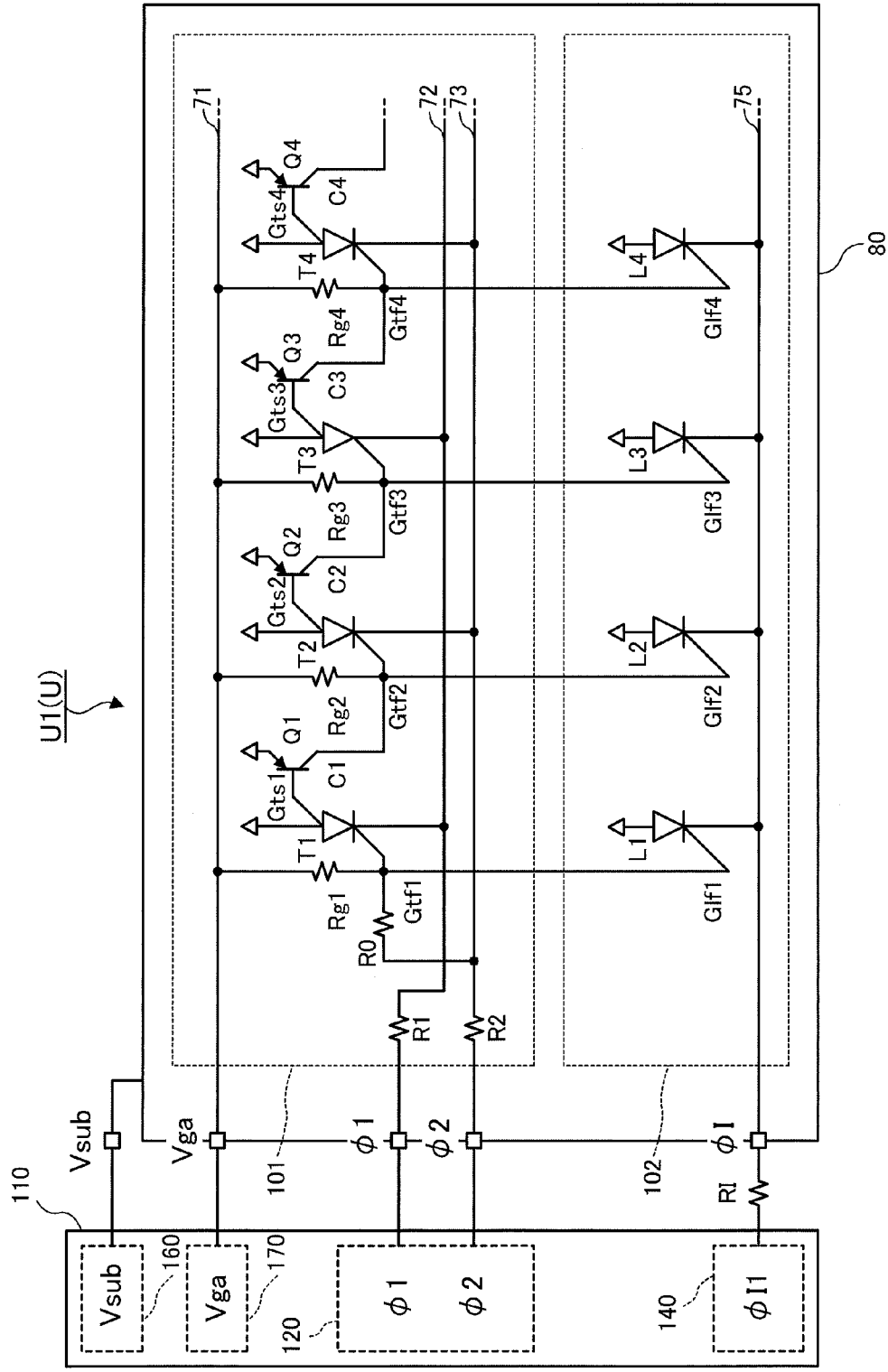
FIG. 5 is an equivalent circuit diagram for illustrating a circuit configuration of the light-emitting chip that mounts a self-scanning type light-emitting element array (SLED) to which the first exemplary embodiment is applied.

FIG. 5 is an equivalent circuit diagram for illustrating the circuit configuration of the light-emitting chip U on which a self-scanning type light-emitting element array (SLED) is mounted, to which the first exemplary embodiment is applied. Each element described below, except for the terminals (the φ1 terminal, the φ2 terminal, the Vga terminal and the φI terminal), is arranged based on the layout on each light-emitting chip U (refer to FIGS. 6A and 6B to be described later). It should be noted that the terminals (the φ1 terminal, the φ2 terminal, the Vga terminal and the φI terminal), although shown at different positions from those in FIG. 4A, are shown at the left end of FIG. 5 for convenience of description. The Vsub terminal provided on the rear surface of the substrate 80 is illustrated to be drawn out of the substrate 80.

Here, the light-emitting chips U are described by using the light-emitting chip U1 as an example in relation with the signal generating circuit 110. Thus, in FIG. 5, the light-emitting chip U is denoted as the light-emitting chip U1 (U). The configurations of other light-emitting chips U2 to U40 are the same as that of the light-emitting chip U1.

As described above, the light-emitting chip U1 (U) includes the light-emitting thyristor array (the light-emitting portion 102 (refer to FIG. 4A)) that includes the light-emitting thyristors L1, L2, L3, . . . arranged in line on the substrate 80.

The light-emitting chip U1 (U) also includes a transfer thyristor array configured with transfer thyristors T1, T2, T3, . . . arranged in line in a similar manner as the light-emitting thyristor array.

Moreover, the light-emitting chip U1 (U) includes coupling transistors Q1, Q2, Q3, . . . , which are pnp bipolar transistors, and are located between respective pairs of two adjacent transfer thyristors, taken sequentially from T1, T2, T3, . . . .

Further, the light-emitting chip U1 (U) includes resistances Rg1, Rg2, Rg3, . . . , as an example of first resistances.

The light-emitting chip U1 (U) includes one start resistance R0. The light-emitting chip U1 (U) further includes current limitation resistances R1 and R2 to prevent excess current from flowing through a first transfer signal line 72 for transmitting a first transfer signal φ1, and a second transfer signal line 73 for transmitting a second transfer signal φ2, which will be described later.

The light-emitting thyristors L1, L2, L3, . . . , in the light-emitting thyristor array, and the transfer thyristors T1, T2, T3, . . . , in the transfer thyristor array are arranged in the numerical order from the left in FIG. 5. Similarly, the coupling transistors Q1, Q2, Q3, . . . , and the resistances Rg1, Rg2, Rg3, . . . , are also arranged in the numerical order from the left in FIG. 5.

The light-emitting thyristor array and the transfer thyristor array are arranged in the order of the transfer thyristor array and the light-emitting thyristor array from the top to the bottom in FIG. 5.

Here, the light-emitting thyristors L1, L2, L3, . . . , the transfer thyristors T1, T2, T3, . . . , the coupling transistors Q1, Q2, Q3, . . . , and the resistances Rg1, Rg2, Rg3, . . . , when not distinguished, are denoted as a light-emitting thyristor L, a transfer thyristor T, a coupling transistor Q and a resistance Rg, respectively.

The number of the light-emitting thyristors L in the light-emitting thyristor array may be a predetermined number. In the first exemplary embodiment, if the number of the light-emitting thyristors L is 128, the number of transfer thyristors T is also 128. Similarly, the number of the resistances Rg is also 128. However, the number of the coupling transistors Q is 1 less than that of the transfer thyristors T, i.e., 127.

It should be noted that the number of the transfer thyristors T may be greater than that of the light-emitting thyristors L.

FIG. 5 shows a part focusing on the light-emitting thyristors L1 to L4 and the transfer thyristors T1 to T4.

The thyristor (the light-emitting thyristor L and the transfer thyristor T) is a semiconductor element including a first gate, a second gate, an anode and a cathode. The coupling transistor Q is a semiconductor element including a collector, a base and an emitter.

As will be described later, other than a case where a p-type ohmic electrode or an n-type ohmic electrode is provided on a portion of the semiconductor layer that corresponds to the first gate, the second gate, the anode, the cathode, the collector, the base or the emitter to be connected via wiring, there is a case in which the thyristor and the coupling transistor Q are connected with each other via the semiconductor layers.

Here, the thyristor (the light-emitting thyristor L and the transfer thyristor T) and the coupling transistor Q are denoted by circuit symbols, and there are some cases in which symbols are not used for the anode and the cathode of the thyristor (the light-emitting thyristor L and the transfer thyristor T), though the first gate (Glf and Gtf to be described later) and the second gate (Gts to be described later) are denoted by symbols. In a similar manner, there are some cases where symbols are not used for the emitter and the base of the coupling transistor Q, though the collector (C to be described later) is denoted by a symbol.

Next, electrical connection of the elements in the light-emitting chip U1 (U) will be described.

The anode of each of the transfer thyristor T and the light-emitting thyristor L is connected to the substrate 80 of the light-emitting chip U1 (U) (anode common). It should be noted that the emitter of the coupling transistor Q is also connected to the substrate 80 of the light-emitting chip U1 (U).

These anodes are then connected to the power supply line 200a (refer to FIG. 4B) via Vsub terminal that is a back-side electrode 85 (refer to FIG. 6B to be described later) provided on the rear surface of the substrate 80. The reference potential Vsub is supplied to the power supply line 200a from the reference potential supply portion 160.

The cathodes of odd-numbered transfer thyristors T1, T3, T5, . . . , are connected to the first transfer signal line 72 along the arrangement of the transfer thyristors T. The first transfer signal line 72 is then connected to the φ1 terminal via the current limitation resistance R1. The first transfer signal line 201 (refer to FIG. 4B) is connected to the φ1 terminal to transmit the first transfer signal φ1 from the transfer signal generating portion 120.

On the other hand, the cathodes of even-numbered transfer thyristors T2, T4, T6, . . . , are connected to the second transfer signal line 73 along the arrangement of transfer thyristors T. The second transfer signal line 73 is then connected to the φ2 terminal via the current limitation resistance R2. The second transfer signal line 202 (refer to FIG. 4B) is connected to the φ2 terminal to transmit the second transfer signal φ2 from the transfer signal generating portion 120.

The cathode of the light-emitting thyristor L is connected to a light-up signal line 75. The light-up signal line 75 is then connected to the φI terminal. In the light-emitting chip U1, the φI terminal is connected to the light-up signal line 204-1 via the current limitation resistance RI, and accordingly, the light-up signal φI1 is transmitted from the light-up signal generating portion 140. The light-up signal φI supplies a current for lighting to the light-emitting thyristor L. It should be noted that, to the φI terminals of the other light-emitting chips U2 to U40, the light-up signal lines 204-2 to 204-40 are connected via the current limitation resistance RI, respectively, and accordingly, the light-up signals φI2 to φI40 are transmitted from the light-up signal generating portion 140.

First gates Gtf1, Gtf2, Gtf3, . . . of the transfer thyristors T1, T2, T3, . . . are connected to the same numbered first gates Glf1, Glf2, Glf3, . . . of the light-emitting thyristors L1, L2, L3 . . . , on one-to-one basis, respectively. Accordingly, in the first gates Gtf1, Gtf2, Gtf3, . . . of the transfer thyristors T1, T2, T3, . . . and the first gates Glf1, Glf2, Glf3, . . . of the light-emitting thyristors L1, L2, L3 . . . , the same numbered first gates have the same potential. Therefore, denotation of, for example, "first gate Gtf1 (first gate Glf1)" is used to indicate that these gates have the same potential.

The coupling transistor Q1 is connected between the second gate Gts1 of the transfer thyristor T1 and the first gate Gtf2 of the transfer thyristor T2. The second gate Gts1 of the transfer thyristor T1 is connected to the base of the coupling transistor Q1, and the first gate Gtf2 of the transfer thyristor T2 is connected to the collector C1 of the coupling transistor Q1.

Between two successive transfer thyristors T, which is numbered at least as 2, the coupling transistor Q is also connected in a similar manner.

Here, the first gates Gtf1, Gtf2 Gtf3, . . . , the second gates Gts1, Gts2, Gts3, . . . , and the first gates Glf1, Glf2, Glf3, . . . , when not distinguished, are referred to as a first gate Gtf, a second gate Gts and a first gate Glf, respectively. Then, denotation of, for example, "first gate Gtf (first gate Glf)" is used to indicate that these gates have the same potential.

It should be noted that, though the light-emitting thyristor L also includes a second gate, the gate is not connected to any other elements, therefore no symbol is assigned.

The first gate Gtf of the transfer thyristor T and the first gate Glf of the light-emitting thyristor L are connected to a power supply line 71 via the resistances Rg provided to the transfer thyristor T respectively corresponding thereto. The power supply line 71 is connected to the Vga terminal. The Vga terminal is connected to the power supply line 200b (refer to FIG. 4B), and the power supply potential Vga is supplied from the power supply potential supply portion 170.

The first gate Gtf1 of the transfer thyristor T1 at one end of the transfer thyristor array is connected to one of terminals of the start resistance R0. On the other hand, the other terminal of the start resistance R0 is connected to the second transfer signal line 73.

In FIG. 5, a portion including the transfer thyristor T, the coupling transistor Q, the resistance Rg, the start resistance R0 and the current limitation resistances R1 and R2 is denoted as a transfer portion 101. A portion including the light-emitting thyristor L corresponds to the light-emitting portion 102.

Figure 6A:
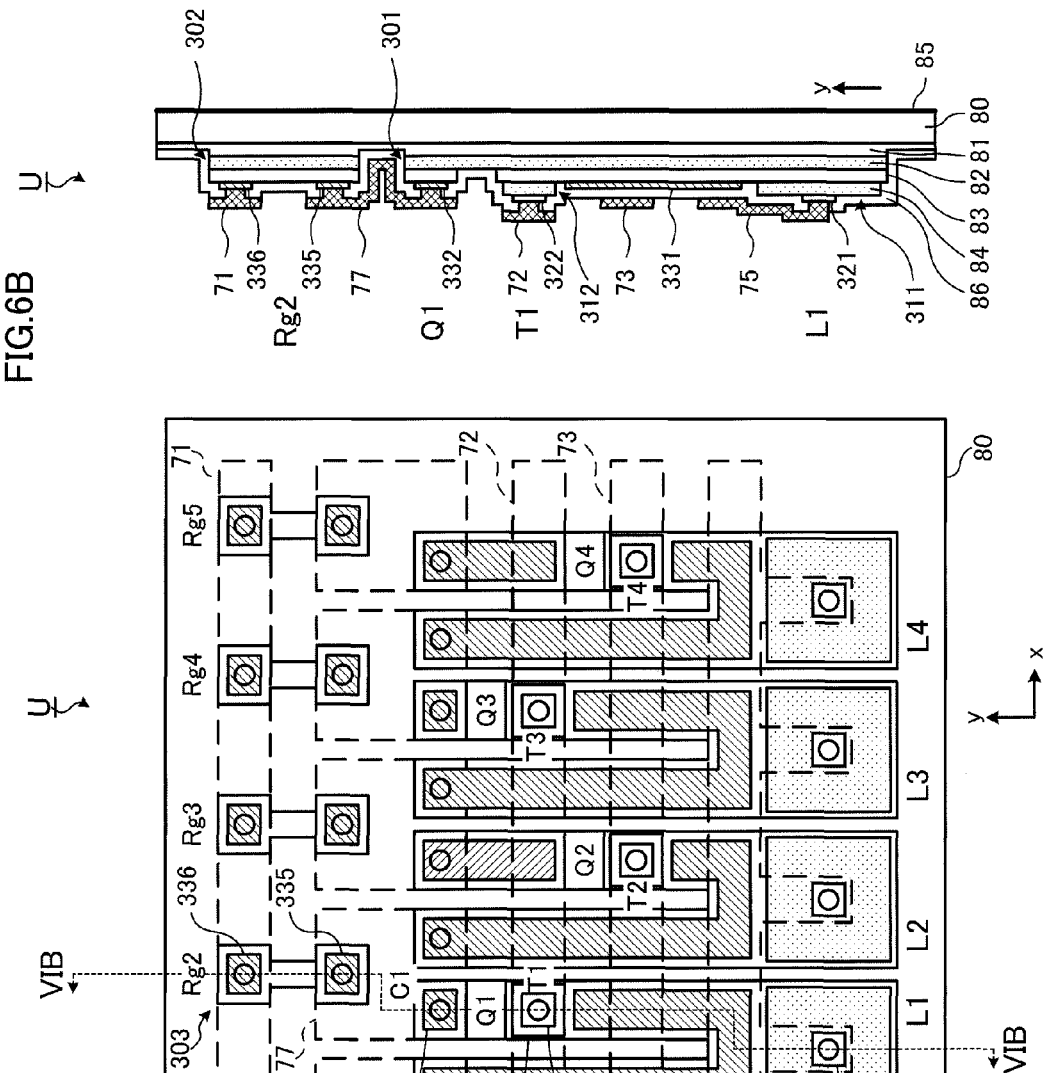
FIGS. 6A and 6B are examples of a layout plan view and a cross-sectional view of the light-emitting chip to which the first exemplary embodiment is applied.
Figure 6B:
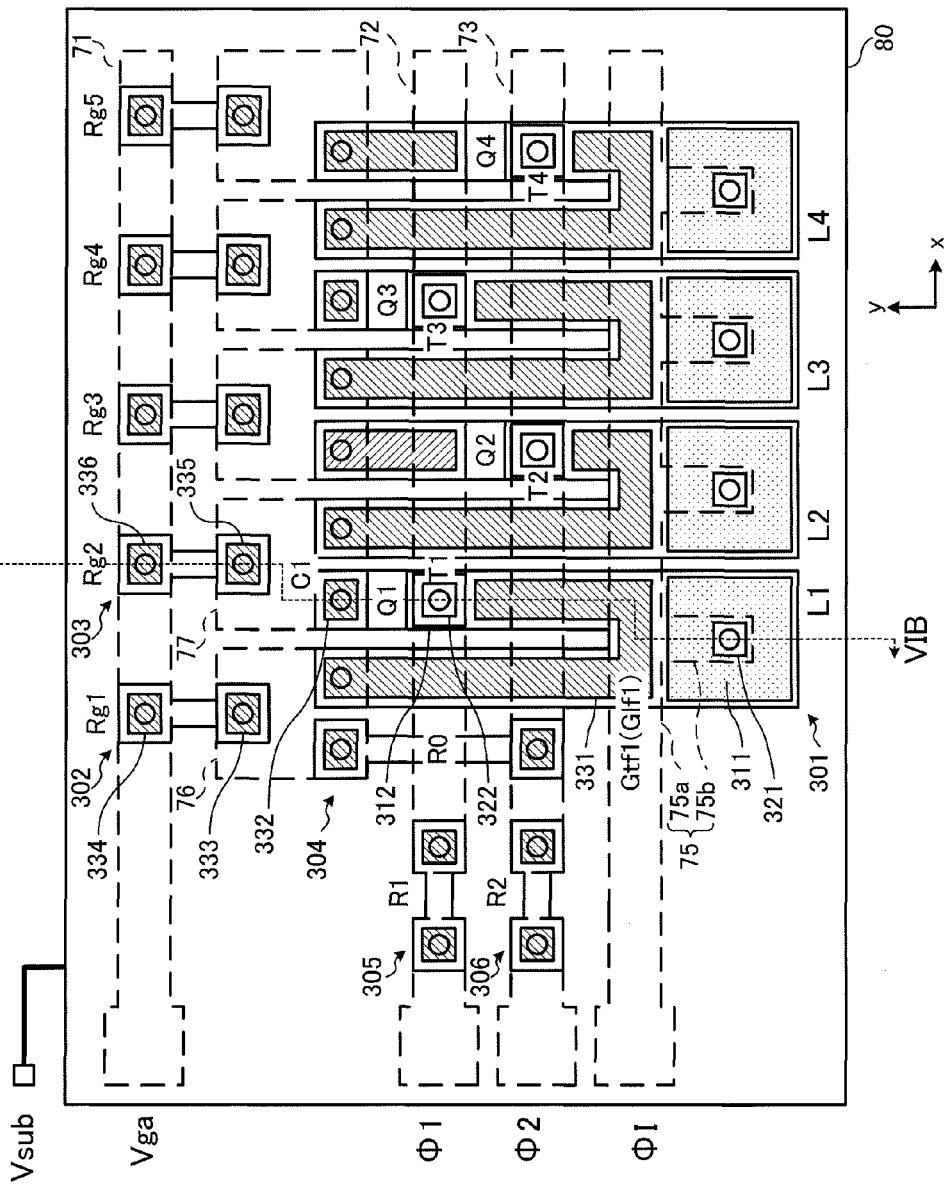

FIGS. 6A and 6B are examples of a layout plan view and a cross-sectional view of the light-emitting chip U to which the first exemplary embodiment is applied. Here, since a connective relation between the light-emitting chip U and the signal generating circuit 110 is not shown, it is unnecessary to give a description by taking the light-emitting chip U1 as an example. Therefore, denotation will be the light-emitting chip U.

FIG. 6A is a layout plan view of the light-emitting chip U, and shows the part centered on the light-emitting thyristors L1 to L4 and the transfer thyristors T1 to T4. It should be noted that the terminals (the φ1 terminal, the φ2 terminal, the Vga terminal and the φI terminal), although shown at different positions from those in FIG. 4A, are shown at the left end of FIG. 6A for convenience of description. The Vsub terminal provided on the rear surface of the substrate 80 is illustrated to be drawn out of the substrate 80. When the terminals are supposed to be provided corresponding to FIG. 4A, the φ2 terminal, the φI terminal and the current limitation resistance R2 are provided at a right-end portion of the substrate 80 in FIG. 6A. It should be noted that the start resistance R0 is placed at an end portion on a side of the transfer thyristor array where transfer is started.

In FIG. 6A, wirings (the power supply line 71, the first transfer signal line 72, the second transfer signal line 73, the light-up signal line 75 and the like) are indicated by broken lines, to thereby make a structure under the wirings clear.

FIG. 6B is a cross-sectional view taken along the line VIB-VIB shown in FIG. 6A. Thus, FIG. 6B shows the cross sections of the light-emitting thyristor L1, the transfer thyristor T1, the coupling transistor Q and the resistance Rg2 in the order from the bottom to the top of FIG. 6B. In FIGS. 6A and 6B, names of elements, the first gate Gtf1 of the transfer thyristor T1, the first gate Glf1 of the light-emitting thyristor L1 and the collector C1 of the coupling transistor Q are denoted.

As shown in FIG. 6B, the light-emitting chip U includes multiple islands (a first island 301, a second island 302, a third island 303 and the like, which will be described later) configured by separating a semiconductor layer stack in which, on the p-type substrate 80, the p-type being an example of a first conduction type, a p-type first semiconductor layer 81, an n-type second semiconductor layer 82, the n-type being an example of a second conduction type, a p-type third semiconductor layer 83, and an n-type fourth semiconductor layer 84 are laminated in the order. In other words, as shown in FIG. 6B, these multiple islands are formed by separating at least the n-type second semiconductor layer 82, the p-type third semiconductor layer 83 and the n-type fourth semiconductor layer 84 from one another. It should be noted that the p-type first semiconductor layer 81 may or may not be separated. In FIG. 6B, part of the p-type first semiconductor layer 81 is removed in the thickness direction. Moreover, the p-type first semiconductor layer 81 may also serve as the substrate 80.

As will be described later, in these islands, the light-emitting thyristor L, the transfer thyristor T, the coupling transistor Q, the resistance Rg and the like are configured by removing part or all of the n-type fourth semiconductor layer 84 or the p-type third semiconductor layer 83.

As shown in FIG. 6B, an insulating layer 86 is provided to the light-emitting chip U so as to cover the surface and side surface of the islands. These islands and wirings are connected to each other via through holes (in FIG. 6A, denoted by "○") provided in the insulating layer 86. Hereinafter, descriptions of the insulating layer 86 and the through holes will be omitted.

As shown in FIG. 6A, the first island 301 has a U-shaped plan shape, and the light-emitting thyristor L1 is provided on a center portion of the U-shape, whereas the transfer thyristor T1 and the coupling transistor Q1 are provided on one end of the U-shape (at the right side in FIG. 6A).

The second island 302 and the third island 303 have a plan shape that connects rectangles at both end portions (at the vertical sides in FIG. 6A), and resistances Rg1 and Rg2 are provided to the second island 302 and the third island 303, respectively.

The fourth island 304, the fifth island 305 and the sixth island 306 have the plan shape similar to those of the second island 302 and the third island 303, and the start resistance R0, the current limitation resistance R1 and the current limitation resistance R2 are provided to the fourth island 304, the fifth island 305 and the sixth island 306, respectively.

In the light-emitting chip U, plural islands similar to the first island 301 and the second island 302 (the third island 303) are formed in parallel. These islands includes the light-emitting thyristors L2, L3, L4, . . . , the transfer thyristors T2, T3, T4, . . . , the coupling transistors Q2, Q3, Q4, . . . , and the resistances Rg3, Rg4, Rg5, . . . in a similar manner as the first island 301 and the second island 302 (the third island 303).

Also, as shown in FIG. 6B, the rear surface of the substrate 80 includes the back-side electrode 85 as Vsub terminal.

Here, the first island 301 to the sixth island 306 will be further described in detail with reference to FIGS. 6A and 6B.

In the first island 301 having a plan shape of the U-shape, in the light-emitting thyristor L1 provided to the center portion of the U-shape, it is assumed that the p-type first semiconductor layer 81 provided on the p-type substrate 80 is an anode and a region 311 of the n-type fourth semiconductor layer 84, which is left after the surrounding n-type fourth semiconductor layer 84 is removed, is a cathode. An n-type ohmic electrode 321 is provided on the region 311 of the n-type fourth semiconductor layer 84. It should be noted that the p-type first semiconductor layer 81, the n-type fourth semiconductor layer 84 and the n-type ohmic electrode 321 are referred to as an anode layer, a cathode layer and a cathode, respectively, in some cases.

Further, the p-type third semiconductor layer 83 is a first gate Glf1, and a p-type ohmic electrode 331 is provided on the p-type third semiconductor layer 83, which has been exposed by removing the n-type fourth semiconductor layer 84, along the inside of the U-shape of the first island 301. At one side of the U-shape, the p-type ohmic electrode 331 extends to the proximity of the transfer thyristor T provided at the center portion of the U-shape, and at the other side of the U-shape, the p-type ohmic electrode 331 extends to the end portion of the U-shape. In some cases, the p-type third semiconductor layer 83 and the p-type ohmic electrode 331 are referred to as a first ohmic layer and a first gate Glf1, respectively.

The n-type second semiconductor layer 82 is the second gate. It should be noted that the n-type second semiconductor layer 82 is referred to as a second gate layer in some cases.

The light-emitting thyristor L emits light at an interface between the n-type second semiconductor layer 82 and the p-type third semiconductor layer 83. The light passes through the insulating layer 86 from a portion in the surface of the region 311 (the light-emitting surface) of the n-type fourth semiconductor layer 84, which is the cathode, except for a portion where the light emission is hindered (light is cut off) by the n-type ohmic electrode 321, the light-up signal line 75 and a branch portion 75b for connecting the n-type ohmic electrode 321, to be emitted.

In the first island 301, the transfer thyristor T1 is provided at the center portion on one side of the U-shape (at the right side in FIG. 6A). At the portion where the transfer thyristor T1 is provided, the p-type first semiconductor layer 81 provided on the p-type substrate 80 is an anode, and a region 312 of the n-type fourth semiconductor layer 84, which is left after the surrounding n-type fourth semiconductor layer 84 is removed, is a cathode. An n-type ohmic electrode 322 is provided on the region 312 of the n-type fourth semiconductor layer 84. It should be noted that the p-type first semiconductor layer 81, the n-type fourth semiconductor layer 84 and the n-type ohmic electrode 322 are referred to as the anode layer, the cathode layer and the cathode, respectively, in some cases.

Further, the p-type third semiconductor layer 83 is a first gate Gtf1. The p-type ohmic electrode 331 on the p-type third semiconductor layer 83 is denoted as the first gate Gtf1 in some cases. In other words, the first gate Glf1 of the light-emitting thyristor L1 and the first gate Gtf1 of the transfer thyristor T1 are the p-type ohmic electrode 331 and also the first gate Gtf1 (the first gate Glf1).

The n-type second semiconductor layer 82 is a second gate Gts1. It should be noted that the n-type second semiconductor layer 82 is sometimes referred to as a second gate layer.

In the first island 301 having the plan shape of U-shape, the coupling transistor Q1 is provided at an end portion on one side of the U-shape (at the right side in FIG. 6A). At the portion where the coupling transistor Q1 is provided, the n-type fourth semiconductor layer 84 has been removed. The p-type first semiconductor layer 81 is an emitter, the n-type second semiconductor layer 82 is a base, and the p-type third semiconductor layer 83 exposed by removing the n-type fourth semiconductor layer 84 is a collector C1. The p-type ohmic electrode 332 is provided on the p-type third semiconductor layer 83 exposed by removing the n-type fourth semiconductor layer 84. It should be noted that, in some cases, the p-type first semiconductor layer 81, the n-type second semiconductor layer 82, the p-type third semiconductor layer 83 and the p-type ohmic electrode 332 are referred to as an emitter layer, a base layer, a collector layer and a collector C1, respectively.

The p-type first semiconductor layer 81 of a portion in the light-emitting thyristor L1 that operates as the anode, the p-type first semiconductor layer 81 of a portion in the transfer thyristor T1 that operates as the anode, and the p-type first semiconductor layer 81 of a portion in the coupling transistor Q1 that operates as the emitter are successively placed.

In addition, the n-type second semiconductor layer 82 of a portion in the light-emitting thyristor L1 that operates as the second gate, the n-type second semiconductor layer 82 of a portion in the transfer thyristor T1 that operates as the second gate, and the n-type second semiconductor layer 82 of a portion in the coupling transistor Q1 that operates as the base are successively placed.

The p-type third semiconductor layer 83 of a portion in the light-emitting thyristor L1 that operates as the first gate Glf1 and the p-type third semiconductor layer 83 of a portion in the transfer thyristor T1 that operates as the first gate Gtf1 are successively placed.

In the second island 302 provided with the resistance Rg1, the n-type fourth semiconductor layer 84 has been removed. Then, on the exposed p-type third semiconductor layer 83, a p-type ohmic electrode 333 and a p-type ohmic electrode 334 are provided. The p-type third semiconductor layer 83 between the p-type ohmic electrode 333 and the p-type ohmic electrode 334 on the p-type third semiconductor layer 83 is provided to form the resistance Rg1. The third island 303 provided with the resistance Rg2 is similar to the second island 302. That is, the p-type third semiconductor layer 83 between a p-type ohmic electrode 335 and a p-type ohmic electrode 336 provided on the exposed p-type third semiconductor layer 83 forms the resistance Rg2.

Similar to the resistance Rg1 provided to the second island 302, each of the start resistance R0 provided to the fourth island 304, the current limitation resistance R1 provided to the fifth island 305 and the current limitation resistance R2 provided to the sixth island 306 has a resistance configured with the p-type third semiconductor layer 83 between two p-type ohmic electrodes.

Connection relationship between the elements in FIG. 6A will be described.

The light-up signal line 75 includes a trunk portion 75a and plural branch portions 75b, and the trunk portion 75a is provided to extend in the direction of the light-emitting thyristor array. The branch portions 75b are branched from the trunk portion 75a and connected to the n-type ohmic electrode 321 (the cathode) on the region 311 in the n-type fourth semiconductor layer 84 of the light-emitting thyristor L1 provided in the first island 301. In a similar manner, the cathodes of the other light-emitting thyristors L provided in the islands similar to the first islands 301 are also connected to the light-up signal line 75. The light-up signal line 75 is connected to the φI terminal.

The first transfer signal line 72 is connected to the n-type ohmic electrode 322 (the cathode) on the region 312 in the n-type fourth semiconductor layer 84 of the transfer thyristor T1 provided in the first island 301. The cathodes of the other odd-numbered transfer thyristors T provided in the islands similar to the first islands 301 are also connected to the first transfer signal line 72. The first transfer signal line 72 is connected to the φ1 terminal via the current limitation resistance R1 provided in the fifth island 305.

On the other hand, the second transfer signal line 73 is connected to the cathodes of the even-numbered transfer thyristors T provided in the islands to which reference numerals are not assigned. The second transfer signal line 73 is connected to the φ2 terminal via the current limitation resistance R2 provided in the sixth island 306.

The power supply line 71 is connected to the p-type ohmic electrode 334 of the resistance Rg1 provided to the second island 302 and the p-type ohmic electrode 336 of the resistance Rg2 provided to the third island 303. In a similar manner, other resistances Rg provided to the islands similar to the second island 302 (the third island 303) are also connected to the power supply line 71. The power supply line 71 is connected to the Vga terminal.

Then, the p-type ohmic electrode 331 (the first gate Gtf1 (the first gate Glf1)) provided along the inside of the U-shape of the first island 301, which has the plan shape of the U-shape, extends to an end portion of the other side of the U-shape, and is connected to the p-type ohmic electrode 333 of the resistance Rg1 provided to the second island 302 via a connection wiring 76.

The p-type ohmic electrode 332 (the collector C1 of the coupling transistor Q1) provided at the end portion on one side of the U-shape of the first island 301 having the plan shape of the U-shape is connected to the p-type ohmic electrode 335 of the resistance Rg2 provided to the third island 303 via a connection wiring 77.

Other light-emitting thyristors L, transfer thyristors T, coupling transistors Q and resistances Rg have similar connection relationship, though descriptions thereof will be omitted here.

The p-type ohmic electrode 331 (the first gate Gtf1 (the first gate Glf1)) in the first island 301 and the p-type ohmic electrode 333 (one of terminals of the resistance Rg1) in the second island 302 are connected to one of p-type ohmic electrodes (having no reference numeral) of the start resistance R0 provided to the fourth island 304 via the above-described connection wiring 76. The other terminal of the start resistance R0 is connected to the second transfer signal line 73.

In this way, the light-emitting chip U1 (U) shown in FIG. 5 is configured.

(Transfer Thyristor T and Coupling Transistor Q)

Here, the transfer thyristor T and the coupling transistor Q will be described.

Figure 7B:
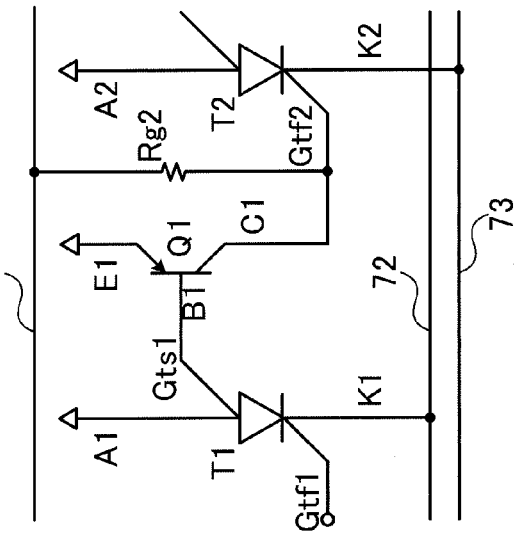
FIGS. 7A to 7C are diagrams for illustrating transfer thyristors and coupling transistors.
Figure 7A:
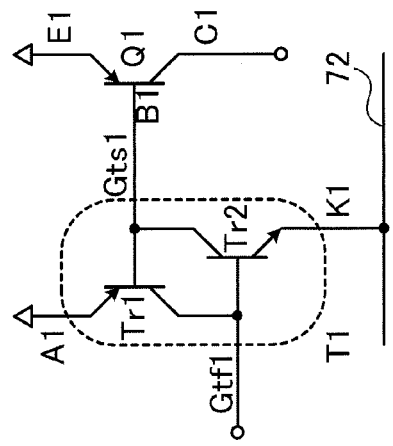
Figure 7C:
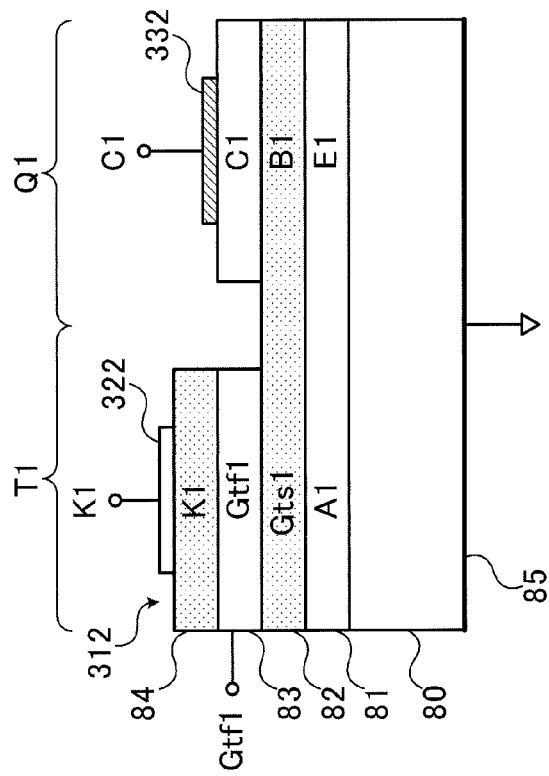

FIG. 7A to 7C are diagrams for illustrating the transfer thyristor T1 and the coupling transistor Q1. FIG. 7A is a diagram that denotes the transfer thyristor T1 and the coupling transistor Q1 by symbols of equivalent transistors. FIG. 7B denotes the transfer thyristor T1 by symbols of thyristors and adds the adjacent transfer thyristor T2. FIG. 7C is a cross-sectional view of the transfer thyristor T1 and the coupling transistor Q1. FIG. 7C is also a diagram that enlarges a portion of the transfer thyristor T1 and the coupling transistor Q1 in the cross-sectional view in FIG. 6B.

In FIGS. 7A to 7C, for ease in description, the anode and the cathode are denoted as A1 and K1, respectively, in the transfer thyristor T1, the anode and the cathode are denoted as A2 and K2, respectively, in the transfer thyristor T2, and the emitter, the base and the collector are denoted as E1, B1 and C1, respectively, in the coupling transistor Q1.

As shown in FIG. 7A, the transfer thyristor T1 has a configuration that combines a pnp-transistor Tr1, which is a pnp bipolar transistor, and an npn-transistor Tr2, which is an npn bipolar transistor. Specifically, a base of the pnp-transistor Tr1 is connected to a collector of the npn-transistor Tr2, and a collector of the pnp-transistor Tr1 is connected to a base of the npn-transistor Tr2. An emitter of the pnp-transistor Tr1 is the anode A1 of the transfer thyristor T1, the collector of the pnp-transistor Tr1 (the base of the npn-transistor Tr2) is the first gate Gtf1 of the transfer thyristor T1, the collector of the npn-transistor Tr2 (the base of the pnp-transistor Tr1) is the second gate Gts1 of the transfer thyristor T1, and an emitter of the npn-transistor Tr2 is the cathode K1 of the transfer thyristor T1. The emitter of the pnp-transistor Tr1, which is the anode A1 of the transfer thyristor T1, is connected to the substrate 80 having the reference potential Vsub.

The coupling transistor Q1 is a pnp-transistor, and the base B1 thereof is connected to the npn-transistor Tr2, which is the second gate Gts1 of the transfer thyristor T1, and the base of the pnp-transistor Tr1. The emitter of the coupling transistor Q1 is connected to the substrate 80 having the reference potential Vsub.

As shown in FIG. 7A, the pnp-transistor Tr1 of the transfer thyristor T1 and the coupling transistor Q1 constitute a current mirror circuit. In other words, a current in proportion to a current passing through the pnp-transistor Tr1 passes through the coupling transistor Q1.

Hereinafter, as an example, the reference potential Vsub that is supplied to the back-side electrode 85, which is the Vsub terminal (refer to FIGS. 5 and 6B), will be described as a high-level potential of 0V (hereinafter, referred to as "H" (0V)), and the power supply potential Vga that is supplied to the Vga terminal will be described as a low-level potential of −3.3V (hereinafter, referred to as "L" (−3.3V)).

In the first exemplary embodiment, the light-emitting device 65 (refer to FIG. 3) is driven at a negative potential.

As shown in FIG. 6B, the thyristors (the transfer thyristor T and the light-emitting thyristor L) and the coupling transistors Q are configured by laminating the p-type semiconductor layers (the p-type first semiconductor layer 81 and the p-type third semiconductor layer 83) and the n-type semiconductor layers (the n-type second semiconductor layer 82 and the n-type fourth semiconductor layer 84) on the p-type substrate 80. These layers are supposed to be composed of GaAs, GaAlAs or the like, and a forward direction potential (a diffusion potential) Vd of pn junction configured with the p-type semiconductor layers and the n-type semiconductor layers is assumed to be 1.5V as an example.

First, basic operations of the thyristors (the transfer thyristors T and the light-emitting thyristors L) will be described by the transfer thyristor T1.

The p-type first semiconductor layer 81, which is the anode A1 of the transfer thyristor T1, is provided on the p-type substrate 80, and has the reference potential Vsub ("H" (0V)) supplied to the back-side electrode 85 of the p-type substrate 80.

In the transfer thyristor in an OFF state, there is a state between the anode A1 and the cathode K1 in which a small current flows compared to an ON state. At this time, the pnp-transistor Tr1 and the npn-transistor Tr2 constituting the transfer thyristor T1 are in the OFF state.

Here, it is assumed that the first transfer signal line 72 connected to the cathode K1 of the transfer thyristor T1 has a potential "L" (−3.3V).

At this time, if the first gate Gtf1 is at the potential that adds the diffusion potential Vd (1.5V) to "L" (−3.3V), namely, here, the potential higher than −1.8V (the positive side is referred to as "high", and the negative side is referred to as "low"), there is generated a forward bias between the emitter and the base of the npn-transistor Tr2, to be brought into the ON state from the OFF state. Then, since the collector of the npn-transistor Tr2 is drawn to the "L" (−3.3V) side, a forward bias is generated between the emitter ("H" (0V)) and the base of the pnp-transistor Tr1, and thereby the pnp-transistor Tr1 is also brought into the ON state from the OFF state. In other words, both of the pnp-transistor Tr1 and the npn-transistor Tr2 come to the ON state, and accordingly, the transfer thyristor T1 is brought into the ON state from the OFF state. The shift of the transfer thyristor T1 from the OFF state to the ON state is referred to as turning on.

In the transfer thyristor T1 in the ON state, the first gate Gtf1 has a potential closer to the potential of the anode A1 (namely, a negative potential whose absolute value is larger than the potential of the anode A1). Here, since the anode A1 is set at the reference potential Vsub ("H" (0V)), the potential of the first gate Gtf1 is assumed to be "H" (0V). The second gate Gts1 has a potential (−1.5V), which is a result of subtracting the forward direction potential Vd (1.5V) of the pn junction from the potential of the anode A1.

The cathode K1 of the transfer thyristor T1 in the ON state has a potential closer to a potential obtained by subtracting the diffusion potential Vd (1.5V) from the potential of the anode A1 ("H" (0V)) (a negative potential whose absolute value is larger than 1.5V). It should be noted that the potential of the cathode K1 is set according to current supply capacity of a power supply that supplies a current to the thyristor in the ON state.

As described above, by providing a forward bias between the emitter (the cathode K1) and the base (the first gate Gtf1) of the npn-transistor Tr2 that constitutes the transfer thyristor T1, the transfer thyristor T1 is turned on. To provide the forward bias between the emitter (the cathode K1) and the base (the first gate Gtf1) of the npn-transistor Tr2, the potential of the cathode K1 may be set lower than a potential obtained by subtracting the diffusion potential Vd (1.5V) from the potential of the first gate Gtf1. The potential obtained by subtracting the diffusion potential Vd from the potential of the first gate Gtf1 is referred to as a threshold voltage of the transfer thyristor T1. Accordingly, the threshold voltage of the transfer thyristor T1 is determined by the potential of the first gate Gtf1, and the transfer thyristor T1 is turned on when the cathode K1 (the first transfer signal line 72) comes to have a potential lower than the threshold voltage.

The transfer thyristor T1 that has turned on maintains the ON state if a potential lower than a potential obtained by subtracting the diffusion potential Vd (1.5V) from the potential of the anode A1 ("H" (0V)) (a maintenance voltage) is applied to the cathode K1, and thereby a current capable of maintaining the ON state (a maintenance current) is continuously supplied from a power supply.

On the other hand, when a potential higher than a potential obtained by subtracting the diffusion potential Vd (1.5V) from the potential of the anode A1 ("H" (0V)) is applied to the cathode K1, the transfer thyristor T1 in the ON state shifts from the ON state to the OFF state. The shift of the transfer thyristor T1 from the ON state to the OFF state is referred to as turning off. For example, if the cathode K1 comes to a potential "H" (0V), since the potential is higher than the maintenance voltage required to maintain the ON state (a potential lower than −1.5V) as well as the potential of the cathode K1 and the potential of the anode A1 become equal, the transfer thyristor T1 is turned off.

Next, a description will be given of operations of the coupling transistor Q1.

When the transfer thyristor T1 is in the OFF state, the coupling transistor Q1 is also in the OFF state.

As mentioned above, when the transfer thyristor T1 is turned on, the forward bias is generated between the emitter (the anode A1) and the base (the second gate Gts1) of the pnp-transistor Tr1. Then, since the second gate Gts1 is connected to the base B1 of the coupling transistor Q1, the forward bias is also provided between the emitter E1 and the base B1 of the coupling transistor Q1, and accordingly, the coupling transistor Q1 is shifted from the OFF state to the ON state.

It should be noted that, if the potential between the emitter E1 and the base B1 of the coupling transistor Q1 becomes higher than a potential obtained by subtracting the diffusion potential Vd (1.5V) from the potential of the emitter E1 ("H" (0V)), the coupling transistor Q1 is shifted from the ON state to the OFF state.

In the foregoing, descriptions have been given of the transfer thyristor T1 and the coupling transistor Q1; however, other transfer thyristors T and coupling transistors Q operate in a similar manner. The light-emitting thyristors L also operate similar to the transfer thyristor T1.

Further description will be given with reference to FIG. 7B.

As described above, when the transfer thyristor T1 is turned on, the coupling transistor Q1 is shifted from the OFF state to the ON state. The collector C1 of the coupling transistor Q1 is connected to the first gate Gtf2 of the transfer thyristor T2, as well as being connected to the power supply line 71 of the power supply potential Vga ("L" (−3.3V)) via the resistance Rg2. Accordingly, the potential of the collector C1 of the coupling transistor Q1 (the first gate Gtf2 of the transfer thyristor T2) is determined by a current passing through the coupling transistor Q1 and the resistance Rg2 and resistance of each of the coupling transistor Q1 and the resistance Rg2.

Here, a description will be given on the assumption that the potential of the collector C1 of the coupling transistor Q1 (the first gate Gtf2 of the transfer thyristor T2) becomes −1V as an example.

Then, the threshold voltage of the transfer thyristor T2 becomes a potential (−2.5V) obtained by subtracting the diffusion potential Vd (1.5V) from the potential of the first gate Gtf2 (−1V). Accordingly, when the potential of the second transfer signal line 73 becomes lower than the potential (−2.5V), the transfer thyristor T2 is turned on.

In other words, by shifting to the ON state, the coupling transistor Q1 causes the threshold voltage of the transfer thyristor T2 to be higher, to thereby cause the transfer thyristor T2 to be brought into a state capable of shifting to the ON state.

As shown in FIG. 7C, the p-type first semiconductor layer 81 is the anode A1 in the portion where the transfer thyristor T1 is configured, whereas the p-type first semiconductor layer 81 is the emitter E1 in the portion where the coupling transistor Q1 is configured. The n-type second semiconductor layer 82 is the second gate Gts1 in the portion where the transfer thyristor T1 is configured, whereas the n-type second semiconductor layer 82 is the base B1 in the portion where the coupling transistor Q1 is configured. The p-type third semiconductor layer 83 is the first gate Gtf1 in the portion where the transfer thyristor T1 is configured, whereas the p-type third semiconductor layer 83 is the collector C1 in the portion where the coupling transistor Q1 is configured. The n-type fourth semiconductor layer 84 is the cathode K1 in the portion where the transfer thyristor T1 is configured; however, the n-type fourth semiconductor layer 84 is removed in the portion where the coupling transistor Q1 is configured.

As shown in FIG. 7A, since both of the anode A1 of the transfer thyristor T1 and the emitter E1 of the coupling transistor Q1 have the reference potential Vsub ("H" (0V)), the p-type first semiconductor layer 81 thereof may be continued.

Moreover, as shown in FIG. 7A, the second gate Gts1 of the transfer thyristor T1 and the base B1 of the coupling transistor Q1 are connected to each other. Accordingly, the n-type second semiconductor layer 82 is required to be continued between the portion where the transfer thyristor T1 is configured and the portion where the coupling transistor Q1 is configured.

Further, as shown in FIG. 7A, the first gate Gtf1 of the transfer thyristor T1 and the collector C1 of the coupling transistor Q1 are not connected to each other. Accordingly, the p-type third semiconductor layer 83 is required to be separated between the portion where the transfer thyristor T1 is configured and the portion where the coupling transistor Q1 is configured.

Consequently, the p-type third semiconductor layer 83 is required to be separated between the portion where the transfer thyristor T1 is configured and the portion where the coupling transistor Q1 is configured. It should be noted that the portion where the transfer thyristor T1 is configured and the portion where the coupling transistor Q1 is configured may be separated electrically in the p-type third semiconductor layer 83.

FIG. 7C shows a state in which the p-type third semiconductor layer 83 is removed between the portion where the transfer thyristor T1 is configured and the portion where the coupling transistor Q1 is configured. It should be noted that FIG. 6B shows a state in which part of the p-type third semiconductor layer 83 is left between the portion where the transfer thyristor T1 is configured and the portion where the coupling transistor Q1 is configured. These will be described later.

(Operations of Light-Emitting Device 65)

Next, operations of the light-emitting device 65 will be described.

As mentioned above, the description will be given on the assumption that the reference potential Vsub is "H" (0V) and the power supply potential Vga is "L" (−3.3V). Moreover, it is assumed that the first transfer signal φ1, the second transfer signal φ2 and the light-up signal φI have two potentials, namely, "H" (0V) and "L" (−3.3V). It should be noted that "H" (0V) and "L" (−3.3V) are abbreviated as "H" and "L", respectively, in some cases.

As described above, the light-emitting device 65 includes the light-emitting chips U1 to U40 (refer to FIGS. 3 and 4B).

As shown in FIG. 4B, the reference potential Vsub ("H" (0V)) and the power supply potential Vga ("L" (−3.3V)) are supplied to all the light-emitting chips U1 to U40 on the circuit board 62 in common. In a similar manner, the first transfer signal φ1 and the second transfer signal φ2 are transmitted to all the light-emitting chips U1 to U40 in common (in parallel).

On the other hand, the light-up signals φI1 to φI40 are separately transmitted to the light-emitting chips U1 to U40, respectively. The light-up signals φI1 to φI40 set light up or light off of the light-emitting thyristors L of the respective light-emitting chips U1 to U40 based on image data. Consequently, the light-up signals φI1 to φI40 have different waveform from one another in accordance with the image data. However, the light-up signals φI1 to φI40 are transmitted in parallel at the same timing.

Since the light-emitting chips U1 to U40 are driven in parallel, description of operations of the light-emitting chip U1 will be sufficient to cover the other light-emitting chips U2 to U40.

<Timing Chart>

Figure 8:
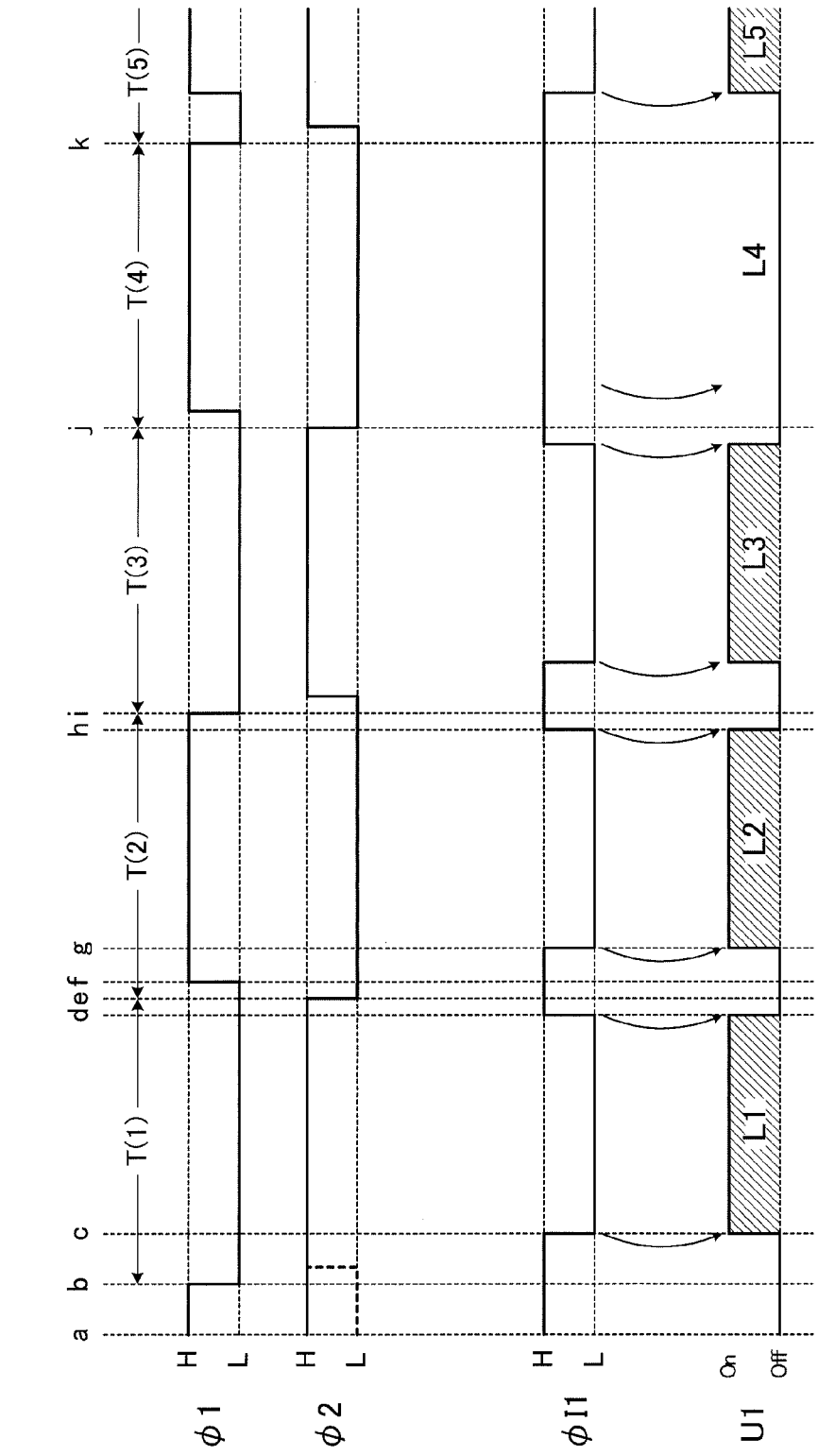
FIG. 8 is a timing chart for illustrating operations of the light-emitting device and the light-emitting chip to which the first exemplary embodiment is applied.

FIG. 8 is a timing chart for illustrating operations of the light-emitting device 65 and the light-emitting chips U to which the first exemplary embodiment is applied.

FIG. 8 shows the timing chart of a portion to control whether or not to light up (referred to as lighting control) the five light-emitting thyristors, namely L1 to L5, in the light-emitting chip U1. It should be noted that, in FIG. 8, the light-emitting thyristors L1, L2, L3 and L5 in the light-emitting chip U1 are lighted up, whereas the light-emitting thyristor L4 is lighted off (not lighted up).

As mentioned above, since the other light-emitting chips U2 to U40 are driven in parallel with the light-emitting chip U1, description of operations of the light-emitting chip U1 will be sufficient to cover the light-emitting chips U2 to U40.

In FIG. 8, it is assumed that time elapses in alphabetical order from a time point a to a time point k. The control whether or not to light up (lighting control) is performed on the light-emitting thyristor L1 during a time period T(1) from a time point b to a time point e, performed on the light-emitting thyristor L2 during a time period T(2) from a time point e to a time point i, performed on the light-emitting thyristor L3 during a time period T(3) from a time point i to a time point j, and performed on the light-emitting thyristor L4 during a time period T(4) from a time point j to a time point k. In a similar manner, lighting control of the light-emitting thyristors having a number of 5 or more is performed.

Here, time periods T(1), T(2), T(3), . . . , have the same length, and, when not distinguished, are referred to as time period T.

It should be noted that the length of time periods T(1), T(2), T(3), . . . may be variable as long as mutual relationship between signals described below is maintained.

Waveforms of the first transfer signal φ1, the second transfer signal φ2 and the light-up signal φI will be described. It should be noted that, in the time period from the time point a to the time point b, the light-emitting chip U1 starts operations (the same is true for the light-emitting chips U2 to U40). A description of the signals in this time period will be given in the description of operations.

In the first transfer signal φ1 transmitted to the φ1 terminal (refer to FIGS. 5 and 6A) and the second transfer signal φ2 transmitted to the φ2 terminal (refer to FIGS. 5 and 6A), waveforms are repeated with two consecutive time periods Ts (for example, the time period T(1) and the time period T(2)).

The first transfer signal φ1 shifts from "H" to "L" at the start time point b of the time period T(1) and shifts from "L" to "H" at the time point f. Then, at the end time point i of the time period T(2), the first transfer signal φ1 shifts from "H" to "L".

The second transfer signal φ2 is at "H" at the start time point b of the time period T(1), and shifts from "H" to "L" at the time point e. Then, the second transfer signal φ2 maintains "L" at the end time point i of the time period T(2).

As the second transfer signal φ2 is compared to the first transfer signal φ1, the second transfer signal φ2 corresponds to the first transfer signal φ1 shifted to a point delayed by the time period T on the time axis. In the first transfer signal φ1, a waveform in the time periods T(1) and T(2) is repeated in the time period T(3) and the time periods subsequent thereto. On the other hand, in the second transfer signal φ2, a waveform indicated by a broken line in the time period T(1) and a waveform in the time period T(2) are repeated in the time period T(3) and the time periods subsequent thereto. The reason why the waveform of the second transfer signal φ2 in the time period T(1) is different from those in the time period T(3) and the time periods subsequent thereto is that the time period T(1) is a time period in which the light-emitting device 65 starts operations thereof.

A pair of transfer signals of the first transfer signal φ1 and the second transfer signal φ2 designates the transfer thyristors T in the ON state and the same-numbered light-emitting thyristors L as a target of control whether or not to light up (referred to as lighting control) by transferring (propagating) the ON state through the transfer thyristors T shown in FIGS. 5 and 6A in the numerical order, as will be described later.

It should be noted that, in the two transfer thyristors T having consecutive numbers, the transfer thyristor T having a smaller number is referred to as "former (former segment)" or "former (former-segment) transfer thyristor T" and the transfer thyristor T having a larger number is referred to as "latter (latter segment)" or "latter (latter-segment) transfer thyristor T" in some cases.

Further, in the light-emitting chip U, a side to which the ON state of the transfer thyristors T will be transferred is referred to as "latter side" and a side from which the ON state has been transferred is referred to as "former side" in some cases.

Next, the light-up signal φI1 transmitted to the φI terminal of the light-emitting chip U1 will be described. It should be noted that the light-up signals φI2 to φI40 are transmitted to the other light-emitting chips U2 to U40, respectively.

Here, a description will be given of the light-up signal φI1 in the time period T(1) of the lighting control for the light-emitting thyristor L1 in the light-emitting chip U1.

In the case of lighting the light-emitting thyristor L1, the light-up signal φI1 is at "H" at the start time point b of the time period T(1) and shifts from "H" to "L" at the time point c. Then, the light-up signal φI1 shifts from "L" to "H" at the time point d, and maintains "H" at the end time point e of the time period T(1).

The operations of the light-emitting device 65 and the light-emitting chip U1 are described according to the timing chart shown in FIG. 8 with reference to FIGS. 4A, 4B and 5. It should be noted that, hereinafter, description will be given of the time periods T(1) and T(2) in which the light-emitting thyristors L1 and L2 are subjected to the lighting control.
(1) Time Point a
<Light-Emitting Device 65>

At the time point a, the reference potential supply portion 160 of the signal generating circuit 110 in the light-emitting device 65 sets the reference potential Vsub ("H" (0V)). The power supply potential supply portion 170 sets the power supply potential Vga ("L" (−3.3V)). Then, the power supply line 200a on the circuit board 62 of the light-emitting device 65 is at the reference potential Vsub ("H" (0V)) and the Vsub terminal of each of the light-emitting chips U1 to U40 is at "H". Similarly, the power supply line 200b is at the power supply potential Vga ("L" (−3.3V)) and the Vga terminal of each of the light-emitting chips U1 to U40 is at "L" (refer to FIG. 4B). Accordingly, the power supply line 71 of each of the light-emitting chips U1 to U40 is at "L" (refer to FIG. 5).

The transfer signal generating portion 120 of the signal generating circuit 110 sets each of the first transfer signal φ1 and the second transfer signal φ2 at "H". Then, the first transfer signal line 201 and the second transfer signal line 202 are set at "H" (refer to FIG. 4B). Accordingly, the φ1 terminal and the φ2 terminal of each of the light-emitting chips U1 to U40 are set at "H". The potential of the first transfer signal line 72 connected to the φ1 terminal via the current limitation resistance R1 is also at "H", and the potential of the second transfer signal line 73 connected to the φ2 terminal via the current limitation resistance R2 is also at "H" (refer to FIG. 5).

Further, the light-up signal generating portion 140 of the signal generating circuit 110 sets each of the light-up signals φI1 to φI40 at "H". Then, the light-up signal lines 204-1 to 204-40 are also at "H" (refer to FIG. 4B). Accordingly, the φI terminal of each of the light-emitting chips U1 to U40 is at "H" via the current limitation resistance R1, and the light-up signal line 75 connected to the φI terminal is also at "H" (refer to FIG. 5).

It should be noted that, although the potential is assumed to change in a step-like manner in FIG. 8 and the following description, the potential actually changes gradually. Thus, even while the potential is still changing, as long as the below-mentioned conditions are satisfied, the thyristor is possibly turned on or turned off and the coupling transistor Q is variable between the ON state and the OFF state.

Next, operations of the light-emitting chip U1 will be described.

<Light-Emitting Chip U1>

The anodes of the transfer thyristor T and the light-emitting thyristor L are connected to the Vsub terminal, and accordingly, the potential thereof is set at "H" (0V).

The cathode of each of the odd-numbered transfer thyristors T1, T3, T5, . . . is connected to the first transfer signal line 72, and the potential thereof is set at "H". The cathode of each of the even-numbered transfer thyristors T2, T4, T6, . . . is connected to the second transfer signal line 73, and the potential thereof is set at "H". Accordingly, the transfer thyristor T is in the OFF state because both of the anode and the cathode are set at "H".

The cathode of the light-emitting thyristor L is connected to the light-up signal line 75 of "H". Accordingly, the light-emitting thyristor L is also in the OFF state because both of the anode and the cathode are set at "H".

As described above, the first gate Gtf1 on one end of the transfer thyristor array in FIG. 5 is connected to one of the terminals of the start resistance R0. The first gate Gtf1 is also connected to the power supply line 71 of "L" (−3.3V) via the resistance Rg1. The other terminal of the start resistance R0 is connected to the second transfer signal line 73 of "H" (0V) via the current limitation resistance R2. Accordingly, the first gate Gtf1 is at a potential obtained by dividing the potential difference between "L" (−3.3V) of the power supply line 71 and "H" (0V) of the second transfer signal line 73 by the resistance Rg1 and the start resistance R0. It should be noted that, since the second transfer signal line 73 is connected to the φ2 terminal of "H" (0V) via the current limitation resistance R2, the first gate Gtf1 may be at the potential obtained by dividing the potential difference between "L" (−3.3V) of the power supply line 71 and "H" (0V) of the φ2 terminal by the resistance Rg1, the start resistance R0 and the current limitation resistance R2. Here, it is assumed that the start resistance R0 and the current limitation resistance R2 are smaller than the resistance Rg1, and the first gate Gtf1 is at −1V as an example. Then, the threshold voltage of the transfer thyristor T1 is at −2.5V.

It should be noted that the potential of the first gate Gtf1 can be set in accordance with the resistance Rg1, the start resistance R0 and the current limitation resistance R2.

Since the first gate Glf1 of the light-emitting thyristor L1 is connected to the first gate Gtf1 of the transfer thyristor T1, the threshold voltage of the light-emitting thyristor L1 is also at −2.5V.

At this time, since both of the anode (the p-type first semiconductor layer 81) and the cathode (the n-type fourth semiconductor layer 84) are at "H" (0V) and the transfer thyristor T1 is in the OFF state, even though the potential of the first gate Gtf1 (the p-type third semiconductor layer 83) becomes −1V, the potential of the second gate Gts1 (the n-type second semiconductor layer 82) is not lower than a potential obtained by subtracting the diffusion potential Vd (1.5V) from "H" (0V), namely, −1.5V. Consequently, the coupling transistor Q1 is incapable of changing to the ON state, and is in the OFF state. Accordingly, the first gate Gtf2 of the transfer thyristor T2 is at "L" (−3.3V) of the power supply line 71 via the resistance Rg2. That is, the threshold voltage of the transfer thyristor T2 is −4.8V. Similarly, the threshold voltage of the other transfer thyristors T3, T4, T5, . . . is also −4.8V.

The first gates Glf2, Glf3, Glf4, . . . of the light-emitting thyristors L2, L3, L4, . . . are connected to the first gates Gtf2, Gtf3, Gtf4, . . . of the transfer thyristors T2, T3, T4, . . . , respectively, and therefore, the threshold voltage thereof is −4.8V.

(2) Time Point b

At the time point b shown in FIG. 8, the first transfer signal φ1 shifts from "H" to "L". This makes the light-emitting device 65 start operations.

When the first transfer signal φ1 shifts from "H" to "L", the potential of the first transfer signal line 72 shifts from "H" to "L" (−3.3V) via the φ1 terminal and the current limitation resistance R1. Then, the potential of the cathode of the transfer thyristor T1, whose threshold voltage is −2.5V, is at "L" (−3.3V), and thereby the transfer thyristor T1 is turned on. However, the odd-numbered transfer thyristors T having the number of 3 or more, the cathodes of which are connected to the first transfer signal line 72, are incapable of turning on because the threshold voltage thereof is −4.8V. On the other hand, the even-numbered transfer thyristors T are also incapable of turning on because the second transfer signal φ2 is at "H" (0V) and the second transfer signal line 73 is also at "H" (0V).

When the transfer thyristor T1 is turned on, the potential of the first transfer signal line 72 becomes −1.5 V, which is obtained by subtracting the diffusion potential Vd (1.5 V) from the reference potential of the Vsub ("H" (0V)) of the anode. The potential of the first gate Gtf1 becomes "H" (0V) of the reference potential of the Vsub ("H" (0V)) of the anode. The potential of the first gate Glf1 of the light-emitting thyristor L1 connected to the first gate Gtf 1 of the transfer thyristor T1 also becomes "H" (0V). The threshold voltage of the light-emitting thyristor L1 becomes −1.5V.

On the other hand, when the transfer thyristor T1 is turned on, the coupling transistor Q1 shifts from the OFF state to the ON state. Then the potential of the collector C1 of the coupling transistor Q1 (the first gate Gtf2 of the transfer thyristor T2) shifts to −1V. Consequently, the threshold voltage of the transfer thyristor T2 and the light-emitting thyristor L2 becomes −2.5V.

However, since the potential of the second transfer signal line 73 is "H" (0V), the light-emitting thyristor T2 is not turned on.

It should be noted that, since the transfer thyristor T2 is in the OFF state, the coupling transistor Q2 is in the OFF state and the first gate Gtf3 of the transfer thyristor T3 is at "L" (−3.3V). Accordingly, the threshold voltage of the transfer thyristor T3 and the light-emitting thyristor L3 is −4.8V. In a similar manner, the threshold voltage of the transfer thyristors T and the light-emitting thyristors L having the number of 4 or more is also −4.8V.

Immediately after the time point b (refers to a steady state after some changes in the thyristor are caused by changes in a potential of a signal at the time point b here), the transfer thyristor T1 and the coupling transistor Q1 are in the ON state, and the other transfer thyristors T and coupling transistors Q and all the light-emitting thyristors L are in the OFF state.

It should be noted that, hereinafter, the transfer thyristors T, the coupling transistors Q and the light-emitting thyristors L in the ON state will be mentioned, whereas the transfer thyristors T, the coupling transistors Q and the light-emitting thyristors L in the OFF state will not be mentioned.

(3) Time Point c

At the time point c, the light-up signal φI1 shifts from "H" to "L".

When the light-up signal φI1 shifts from "H" to "L", the light-up signal line 75 shifts from "H" (0V) to "L" (−3.3V) via the current limitation resistance R1 and the φI terminal. Then, the light-emitting thyristor L1 having a threshold voltage of −1.5V is turned on, to be thereby lighted (emit light). This causes the potential of the light-up signal line 75 to close to −1.5V (a negative potential whose absolute value is larger than 1.5V). It should be noted that, although the light-emitting thyristor L2 has a threshold voltage of −2.5V, the light-emitting thyristor L2 is not turned on because the light-emitting thyristor L1, which has a high threshold voltage of −1.5V, is turned on to cause the potential of the light-up signal line 75 to close to −1.5V (a negative potential whose absolute value is larger than 1.5V).

Immediately after the time point c, the transfer thyristor T1 and the coupling transistor Q1 are in the ON state, and the light-emitting thyristor L1 is also in the ON state and is lighted (emits light).

(4) Time Point d

At the time point d, the light-up signal ϕI1 shifts from "L" to "H".

When the light-up signal ϕI1 shifts from "L" to "H", the light-up signal line 75 shifts from "L" to "H" via the current limitation resistance R1 and the ϕI terminal. Then, since both of the anode and the cathode become "H", the light-emitting thyristor L1 is turned off to be lighted off (not lighted). The lighting time period of the light-emitting thyristor L1 is from the time point c, at which the light-up signal ϕI1 shifts from "H" to "L", to the time point d, at which the light-up signal ϕI1 shifts from "L" to "H", namely, a time period in which the light-up signal ϕI1 is at "L".

Immediately after the time point d, the transfer thyristor T1 and the coupling transistor Q1 are in the ON state.

(5) Time Point e

At the time point e, the second transfer signal ϕ2 shifts from "H" to "L". Here, the time period T(1) to perform lighting control on the light-emitting thyristor L1 is ended, and the time period T(2) to perform lighting control on the light-emitting thyristor L2 is started.

When the second transfer signal ϕ2 shifts from "H" to "L", the potential of the second transfer signal line 73 shifts from "H" to "L" via the ϕ2 terminal. As described above, the transfer thyristor T2 is turned on since the threshold voltage thereof −2.5V. This causes the potential of the first gate Gtf2 (the first gate Glf2) to become "H" (0V). Accordingly, the threshold voltage of the light-emitting thyristor T2 becomes −1.5V.

By turning on of the transfer thyristor T2, the coupling transistor Q2 shifts from the OFF state to the ON state, and thereby the potential of the first gate Gtf3 of the transfer thyristor T3 becomes −1V. Accordingly, the threshold voltage of the transfer thyristor T3 and the light-emitting thyristor L3 becomes −2.5V.

It should be noted that the threshold voltage of the transfer thyristors T and the light-emitting thyristors L having a number of 4 or more is −4.8V.

Since the potential of the light-up signal ϕI1 is "H" (0V), no light-emitting thyristor L emits light.

Immediately after the time point e, the transfer thyristors T1 and T2 and the coupling transistors Q1 and Q2 are in the ON state.

(6) Time Point f

At the time point f, the first transfer signal ϕ1 shifts from "L" to "H".

When the first transfer signal ϕ1 shifts from "L" to "H", the potential of the first transfer signal line 72 shifts from "L" to "H" via the ϕ1 terminal. Then, in the transfer thyristor T1 in the ON state, both of the anode and the cathode become "H", and the transfer thyristor T1 is turned off.

The first gate Gtf1 (the first gate Glf1) is connected to the power supply line 71 ("L" (−3.3V)) via the resistance Rg1, and also connected to the second transfer signal line 73, whose potential is at "L" (−3.3V), via the start resistance R0. Accordingly, the potential of the first gate Gtf1 (the first gate Glf1) shifts from "H" (0V) to "L" (−3.3V). Consequently, the threshold voltage of the transfer thyristor T1 and the light-emitting thyristor L1 becomes −4.8V.

Immediately after the time point f, the transfer thyristor T2 is in the ON state.

(7) Others

At the time point g, the light-up signal ϕI1 shifts from "H" to "L", and thereby the light-emitting thyristor L2 is turned on to be lighted (emit light) similar to the light-emitting thyristor L1 at the time point c.

Then, at the time point h, the light-up signal ϕI1 shifts from "L" to "H", and thereby the light-emitting thyristor L2 is turned off to be lighted off similar to the light-emitting thyristor L1 at the time point d.

Further, at the time point i, the light-up signal ϕI1 shifts from "H" to "L", and thereby, similar to the transfer thyristor T1 at the time point b or the transfer thyristor T2 at the time point e, the transfer thyristor T3 having a threshold voltage of −2.5V is turned on. At this time, the transfer thyristor T1 is incapable of turning on because the threshold voltage thereof is −4.8V.

At the time point i, the time period T(2) to perform lighting control on the light-emitting thyristor L2 is ended, and the time period T(3) to perform lighting control on the light-emitting thyristor L3 is started.

Hereinafter, the operations described above will be repeated.

It should be noted that, if the light-emitting thyristors L are not lighted (do not emit light) but are remained to be lighted off, as the light-up signal ϕI1 indicated from the time point j to the time point k in the time period T(4) to perform lighting control on the light-emitting thyristor L4 in FIG. 8, the light-up signal ϕ1 may be remained at "H" (0V). By doing so, the light-emitting thyristor L4 is remained to be lighted off though the threshold voltage thereof is −1.5V.

As described above, the transfer thyristors T are connected to each other by the coupling transistors Q. Consequently, if a former transfer thyristor T is turned on, a coupling transistor Q shifts from the OFF state to the ON state to increase a threshold voltage of a latter transfer thyristor T. Accordingly, at a timing that the first transfer signal ϕ1 or the second transfer signal ϕ2 connected to the cathode of the latter transfer thyristor T shifts from "H" (0V) to "L" (−3.3V), the latter transfer thyristor T is turned on.

When the transfer thyristor T is turned on, the potential of the first gate Gtf becomes "H" (0V). Since the first gate Gtf of the transfer thyristor T and the first gate Glf of the light-emitting thyristor L are connected to each other, the threshold voltage of the light-emitting thyristor L becomes −1.5V. Then, at a timing that the light-up signal ϕI shifts from "H" (0V) to "L" (−3.3V), the light-emitting thyristor L is turned on to be lighted (emit light).

In other words, by shifting to the ON state, the transfer thyristor T designates the light-emitting thyristor L as a target of the lighting control and sets the light-emitting thyristor L in a light enabled state. The light-up signal ϕI sets the light-emitting thyristor L in the light enabled state as the target of the lighting control to be lighted or not lighted.

In this manner, the waveform of the light-up signal ϕI is set in accordance with the image data to control whether or not to light up each light-emitting thyristor L.

Figure 9:
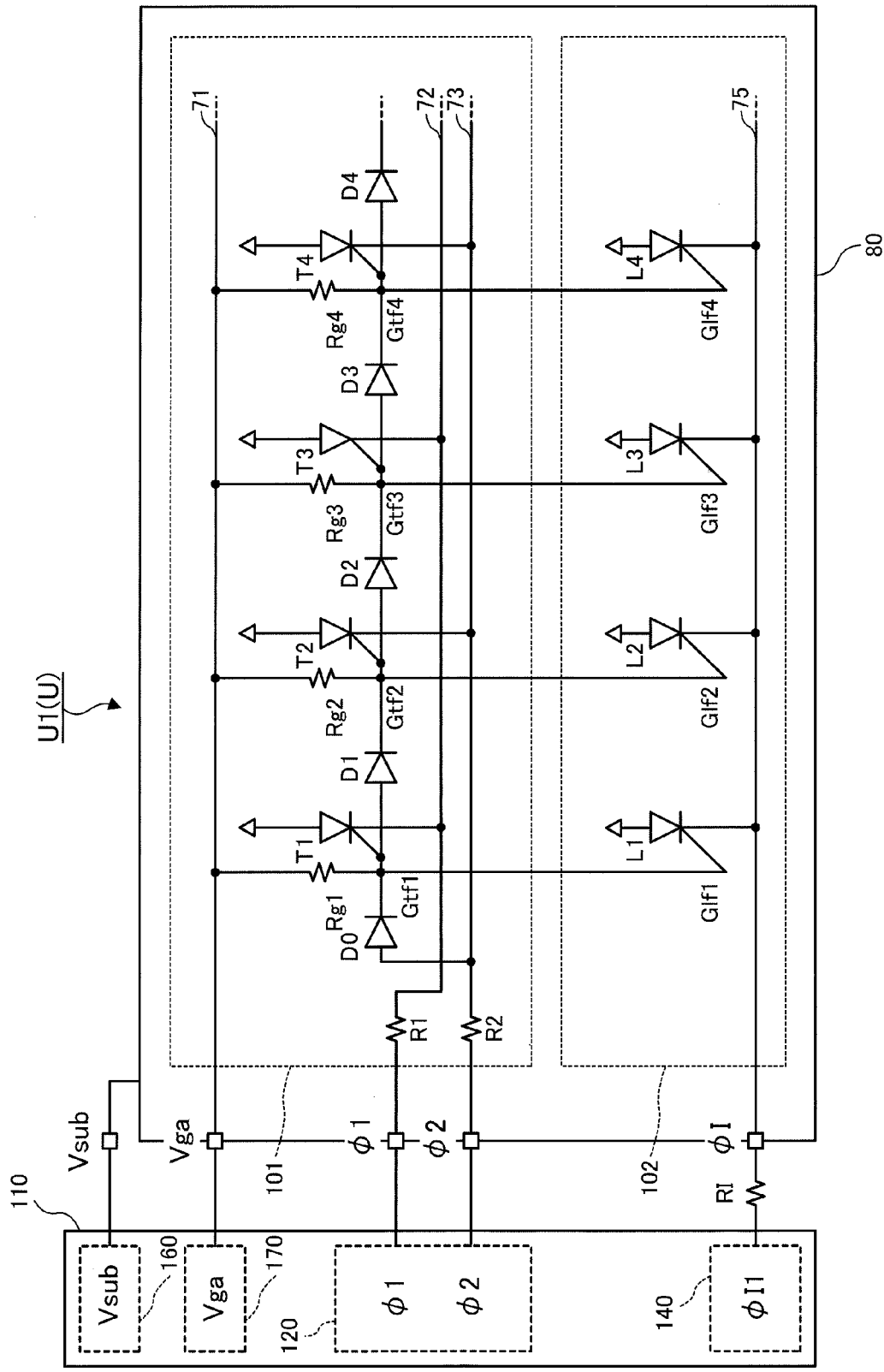
FIG. 9 is an equivalent circuit diagram for illustrating a circuit configuration of the light-emitting chip that mounts a self-scanning type light-emitting device array (SLED) to which the first exemplary embodiment is not applied.

FIG. 9 is an equivalent circuit diagram for illustrating a circuit configuration of the light-emitting chip U that mounts a self-scanning type light-emitting device array (SLED), to which the first exemplary embodiment is not applied. Here, the light-emitting chips U are also described by using the light-emitting chip U1 as an example in relation with the signal generating circuit 110. Thus, in FIG. 9, the light-emitting chip U is denoted as the light-emitting chip U1 (U).

In the light-emitting chip U1 (U) shown in FIG. 5 that mounts a self-scanning type light-emitting device array (SLED), to which the first exemplary embodiment is applied, the transfer thyristors T1, T2, T3, . . . are connected via the coupling transistors Q1, Q2, Q3, . . . . In contrast, in the light-emitting chip U1 (U) shown in FIG. 5 that mounts a self-scanning type light-emitting device array (SLED), to which the first exemplary embodiment is not applied, the transfer thyristors T1, T2, T3, . . . are connected via the coupling diodes D1, D2, D3, . . . . It should be noted that the coupling diodes D1, D2, D3, . . . , when not separately distinguished, are labeled as the coupling diodes D.

When FIG. 9 is compared to FIG. 5, in the light-emitting chip U1 (U) in FIG. 9 that mounts a self-scanning type light-emitting device array (SLED), to which the first exemplary embodiment is not applied, instead of the coupling transistors Q, the coupling diodes D are provided. Then, instead of the start resistance R0, a start diode D0 is provided. Hereinafter, similar components to those of the light-emitting chip U1 (U) shown in FIG. 5 are labeled with the same reference numerals, and detailed description thereof will be omitted, and different components will be described.

The coupling diodes D1, D2, D3, . . . are connected between respective pairs of two adjacent first gates Gtf taken sequentially from the first gates Gtf1, Gtf2, Gtf3, . . . of the transfer thyristors T1, T2, T3, . . . . That is, the coupling diodes D1, D2, D3, . . . are connected in series so as to be inserted between adjacent first gates Gtf1, Gtf2, Gtf3, . . . , respectively. The coupling diode D1 is arranged in a direction so that a current flows from the first gate Gtf1 to the first gate Gtf2. Other coupling diodes D2, D3, D4, . . . are also arranged in the same manner.

The first gate Gtf1 of the transfer thyristor T1 on one end of the transfer thyristor array is connected to the cathode of start diode D0. The anode of the start diode D0 is connected to the second transfer signal line 73.

It should be noted that the second gate Gts of the transfer thyristor T is not used in the light-emitting chip U1 (U) that mounts a self-scanning type light-emitting device array (SLED), to which the first exemplary embodiment is not applied.

The light-emitting chip U1 (U) shown in FIG. 9 that mounts a self-scanning type light-emitting device array (SLED), to which the first exemplary embodiment is not applied also operates according to the timing chart shown in FIG. 8. Hereinafter, description will be given of the components of the light-emitting chip U1 (U) different from the light-emitting chip U1 (U) shown in FIG. 5 that mounts a self-scanning type light-emitting device array (SLED), to which the first exemplary embodiment is applied.

(1) Time Point a

As described above, the first gate Gtf1 on one end of the transfer thyristor array in FIG. 9 is connected to the cathode of the start diode D0. The first gate Gtf1 is connected to the power supply line 71 having the power supply potential Vga ("L" (−3.3V)) via the resistance Rg1. The anode of the start diode D0 is connected to the second transfer signal line 73 having a potential of "H" (0V). Accordingly, the start diode D0 has a forward bias, and thereby the potential of the cathode of the start diode D0 (the first gate Gtf1 of the transfer thyristor T1) is a value obtained by subtracting the diffusion potential Vd (1.5V) from the potential of the anode of the start diode D0 ("H" (0V)), namely, −1.5V.

Moreover, when the potential of the first gate Gtf1 of the transfer thyristor T1 becomes −1.5V, the coupling diode D1 comes to have a forward bias because the potential of the anode (the first gate Gtf1 of the transfer thyristor T1) is −1.5V and the cathode (the first gate Gtf2 of the transfer thyristor T2) is connected to the power supply line 71 of "L" (−3.3V) via the resistance Rg2. Accordingly, the potential of the first gate Gtf2 of the transfer thyristor T2 is a value obtained by subtracting the diffusion potential Vd (1.5V) from the potential of the first gate Gtf1 of the transfer thyristor T1 (−1.5V), namely, −3V.

However, the first gates Gtf of the transfer thyristors T having a number of 3 or more are not affected by the potential of the anode of the start diode D0 being "H" (0V), and the potential of these first gates Gtf is equal to "L" (−3.3V) of the power supply line 71.

Consequently, the threshold voltage of the transfer thyristor T1 and the light-emitting thyristor L1 becomes −3V, the threshold voltage of the transfer thyristor T2 and the light-emitting thyristor L2 becomes −4.5V, and the threshold voltage of the transfer thyristors T and the light-emitting thyristors L having a number of 3 or more becomes −4.8V.

(2) Time Point b

At the time point b shown in FIG. 8, the first transfer signal φ1 shifts from "H" to "L", and the potential of the first transfer signal line 72 shifts from "H" to "L". Then, the transfer thyristor T1 having a threshold voltage of −3V is turned on.

When the transfer thyristor T1 is turned on, the potential of the first gate Gtf1 (the first gate Glf1) becomes "H" (0V), which is the potential of the anode of the transfer thyristor T1. Then, the potential of the first gate Gtf2 (the first gate Glf2) becomes −1.5V, the potential of the first gate Gtf3 (the first gate Glf3) becomes −3V, and the potential of the first gates Gtf (the first gates Glf) having a number of 4 or more becomes "L" (−3.3V).

Consequently, the threshold voltage of the light-emitting thyristor L1 becomes −1.5V, the threshold voltage of the transfer thyristor T2 and the light-emitting thyristor L2 becomes −3V, the threshold voltage of the transfer thyristor T3 and the light-emitting thyristor L3 becomes −4.5V, and the threshold voltage of the transfer thyristors T and the light-emitting thyristors L having a number of 4 or more becomes −4.8V.

Immediately after the time point b, the transfer thyristor T1 is in the ON state, and other transfer thyristors T and light-emitting thyristors L are in the OFF state.

(3) Time Point c

At the time point c, the light-up signal φI1 shifts from "H" to "L", and the light-up signal line 75 shifts from "H" to "L" via the current limitation resistance RI and the φI terminal. Then, the light-emitting thyristor L1 with a threshold voltage of −1.5V is turned on, to be thereby lighted (emit light).

Immediately after the time point c, the transfer thyristor T1 is in the ON state, and the light-emitting thyristor L1 is also in the ON state and is lighted (emit light).

(4) Time Point d

At the time point d, the light-up signal φI1 shifts from "L" to "H", and thereby the light-emitting thyristor L1 is turned off, to be thereby lighted off (not lighted).

Immediately after the time point d, the transfer thyristor T1 is in the ON state.

(5) Time Point e

At the time point e, the second transfer signal φ2 shifts from "H" to "L", and accordingly, the transfer thyristor T2 with a threshold voltage of −3V is turned on. Consequently, the potential of the first gate Gtf2 (the first gate Glf2) becomes "H" (0V), the potential of the first gate Gtf3 (the first gate Glf3) becomes −1.5V, and the potential of the first gate Gtf4 (the first gate Glf4) becomes −3V. The potential of the first gates Gtf (the first gates Glf) having a number of 5 or more becomes −3.3V.

Immediately after the time point e, the transfer thyristors T1 and T2 are in the ON state.

(6) Time Point f

At the time point f, the first transfer signal φ1 shifts from "L" to "H", then both of the anode and the cathode of the transfer thyristor T1 in the ON state become "H", and accordingly the transfer thyristor T1 is turned off. Then, the potential of the first gate Gtf1 (the first gate Glf1) becomes the power supply potential Vga ("L" (−3.3V)) of the power supply line 71 via the resistance Rg1. Consequently, the coupling diode D1 comes to have a reverse bias. Accordingly, the first gate Gtf1 (the first gate Glf1) is not affected by the potential of the first gate Gtf2 (the first gate Glf2) being "H" (0V). In other words, the transfer thyristors T that include the first gates Gtf connected by the coupling diodes D with the reverse bias come to have a threshold voltage of −4.8V, and are not turned on by the first transfer signal φ1 or the second transfer signal φ2 whose potential is "L" (−3.3V).

Immediately after the time point f, the transfer thyristor T2 is in the ON state.

Thereafter, as described in the light-emitting chip U1 (U) shown in FIG. 5 that mounts a self-scanning type light-emitting element array (SLED) to which the first exemplary embodiment is applied, the above-described operations will be repeated.

In the light-emitting chip U1 (U) shown in FIG. 9 that mounts a self-scanning type light-emitting element array (SLED) to which the first exemplary embodiment is not applied, the threshold voltage of the transfer thyristors T prior to turning on is −3V. That is, the difference between the threshold voltage of the transfer thyristors T (−3V) and the potential "L" (−3.3V) of the first transfer signal φ1 and the second transfer signal φ2 is −0.3V.

Consequently, if transfer failures occur in the transfer portion 101 affected by noise or the like, in which transfer (propagation) of the ON state of the transfer thyristors T is instable or interrupted, disturbance occurs in an image to be formed.

In contrast, in the light-emitting chip U1 (U) shown in FIG. 5 that mounts a self-scanning type light-emitting element array (SLED) to which the first exemplary embodiment is applied, the threshold voltage of the transfer thyristors T prior to turning on is −2.5V, and therefore the difference between the threshold voltage of the transfer thyristors T (−2.5V) and the potential "L" (−3.3V) of the first transfer signal φ1 and the second transfer signal φ2 is −0.8V.

In other words, in the light-emitting chip U that mounts a self-scanning type light-emitting element array (SLED) to which the first exemplary embodiment is applied, in which the transfer thyristors T are connected by the coupling transistors Q, in comparison with the light-emitting chip U that mounts a self-scanning type light-emitting element array (SLED) to which the first exemplary embodiment is not applied, in which the transfer thyristors T are connected by the coupling diodes D, the difference between the threshold voltage of the transfer thyristors T and the potential "L" of the first transfer signal φ1 and the second transfer signal φ2 is large, and accordingly, an operation margin is wide. Consequently, the light-emitting chip U that mounts a self-scanning type light-emitting element array (SLED) to which the first exemplary embodiment is applied, in which the transfer thyristors T are connected by the coupling transistors Q, is insusceptible to noise or the like, and occurrence of the transfer failures in the transfer portion, in which transfer (propagation) of the ON state of the transfer thyristors T is interrupted, is suppressed. Accordingly, malfunction of the print head 14 is suppressed, and thereby occurrence of disturbance in an image to be formed is suppressed.

(Method of Manufacturing Light-Emitting Chip U)

A description will be given of a method of manufacturing the light-emitting chip U to which the first exemplary embodiment is applied.

FIGS. 10A to 10D are cross-sectional views for illustrating a method of manufacturing the light-emitting chip U to which the first exemplary embodiment is applied. FIGS. 10A to 10D show a portion of the transfer thyristor T1 and the coupling transistor Q1 of the first island 301 in the cross-sectional view shown in FIG. 6B.

According to FIGS. 10A to 10D, a description will be given of a method of manufacturing the light-emitting chip U to which the first exemplary embodiment is applied. Here, it is assumed that the light-emitting chip U is manufactured by a technique of photolithography.

Figure 10A:
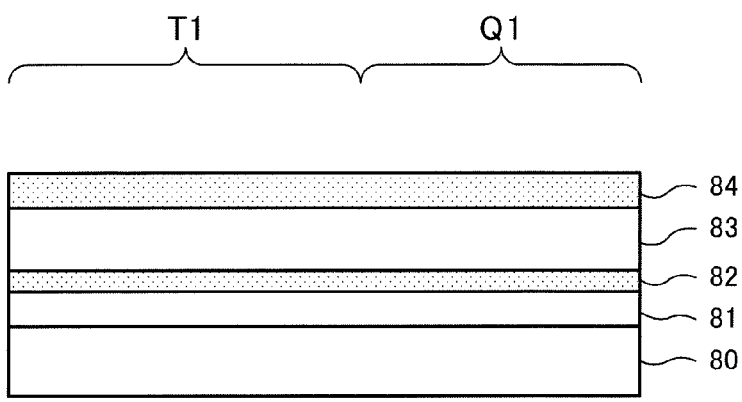
FIGS. 10A to 10D are cross-sectional views for illustrating a method of manufacturing the light-emitting chip to which the first exemplary embodiment is applied.

As shown in FIG. 10A, the light-emitting chip U is formed as a semiconductor layer stack in which the p-type first semiconductor layer 81, the n-type second semiconductor layer 82, the p-type third semiconductor layer 83 and the n-type fourth semiconductor layer 84 are laminated in order on the p-type substrate 80 by use of a compound semiconductor, such as GaAs or GaAlAs.

It should be noted that the p-type substrate 80 may also serve as the p-type first semiconductor layer 81.

Figure 10B:
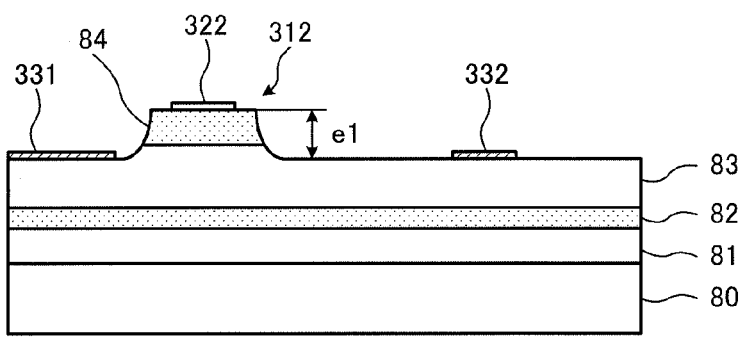

Next, as shown in FIG. 10B, an etching for providing the first gate and the collector is performed, in which a partial region of the n-type fourth semiconductor layer 84 is removed to expose the p-type third semiconductor layer 83 that forms the first gate Gtf1 of the transfer thyristor T and the collector C1 of the coupling transistor Q. It should be noted that, in the etching for providing the first gate and the collector, a depth e1 from the surface of the n-type fourth semiconductor layer 84 is etched. The depth e1 is set to enter into the p-type third semiconductor layer 83 side from an interface between the n-type fourth semiconductor layer 84 and the p-type third semiconductor layer 83.

In a portion where the transfer thyristor T1 is constituted, the n-type ohmic electrode 322 is formed on the region 312 of the n-type fourth semiconductor layer 84 serving as the cathode (the cathode layer). Further, on the exposed p-type third semiconductor layer 83, the p-type ohmic electrode 331 serving as the first gate Gtf1 is formed. Then, in a portion where the coupling transistor Q1 is constituted, the p-type ohmic electrode 332 serving as the collector C1 is formed on the exposed p-type third semiconductor layer 83.

Figure 10C:
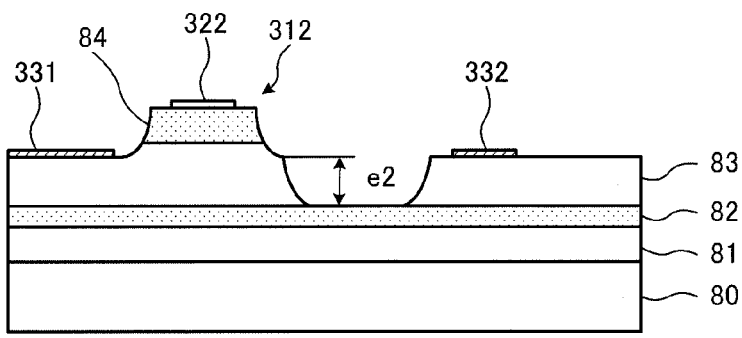

Then, as shown in FIG. 10C, a separation etching is performed to etch part of the p-type third semiconductor layer 83 for separating the first gate Gtf1 of the transfer thyristor T1 and the collector C1 of the coupling transistor Q1.

Here, a depth e2 from the surface of the p-type third semiconductor layer 83, which has been exposed by removing part of the n-type fourth semiconductor layer 84, is etched. The depth e2 is set at an interface between the p-type third semiconductor layer 83 and the n-type second semiconductor layer 82. It should be noted that the depth e2 may be set to partially etch the n-type second semiconductor layer 82 in the thickness direction, or part of the p-type third semiconductor layer 83 may remain in the thickness direction. It should be noted that the remaining part of the p-type third semiconductor layer 83 may be depleted so as not to electrically connect the first gate Gtf of the transfer thyristor T1 and the base B1 of the coupling transistor Q1.

Figure 10D:
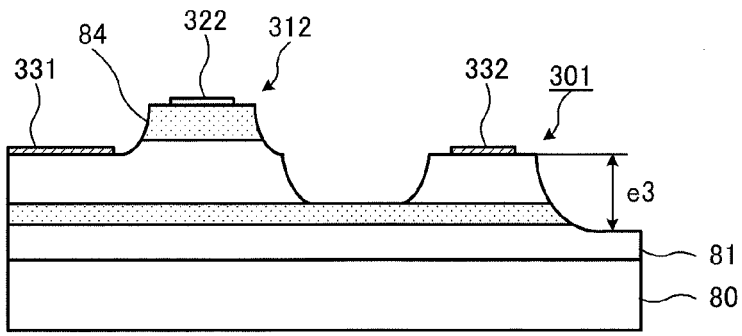

Further, as shown in FIG. 10D, an island etching is performed, in which the p-type third semiconductor layer 83, the n-type second semiconductor layer 82 and part of the p-type first semiconductor layer 81 are etched from the surface of the p-type third semiconductor layer 83 exposed by removing the n-type fourth semiconductor layer 84, to thereby form the first island 301.

Here, a depth e3 from the surface of the p-type third semiconductor layer 83, which is exposed by the etching for providing the first gate and the collector, is etched. The depth e3 is set to etch part of the p-type first semiconductor layer 81 in the thickness direction.

Here, though the description is given by taking the first island 301 in which the transfer thyristor T1 and the coupling transistor Q1 are constituted as an example, other islands (the second island to the sixth island, and islands not labeled with reference numerals) are formed in a similar manner.

An island formed by etching a semiconductor layer stack is referred to as mesa, and the island etching for forming the island is referred to as mesa etching in some cases.

The etching for providing the first gate and the collector, the separation etching and the island etching may be performed as a wet etching that uses an etching solution (an etchant), or a dry etching that uses plasmarized reactive gas.
(Potential of Collector C of Coupling Transistor Q)

In the light-emitting chip U shown in FIG. 5, it has been described that the potential of the collector C of the coupling transistor Q in the ON state is −1V.

Here, the potential of the collector C of the coupling transistor Q will be described in more detail.

Figure 11A:
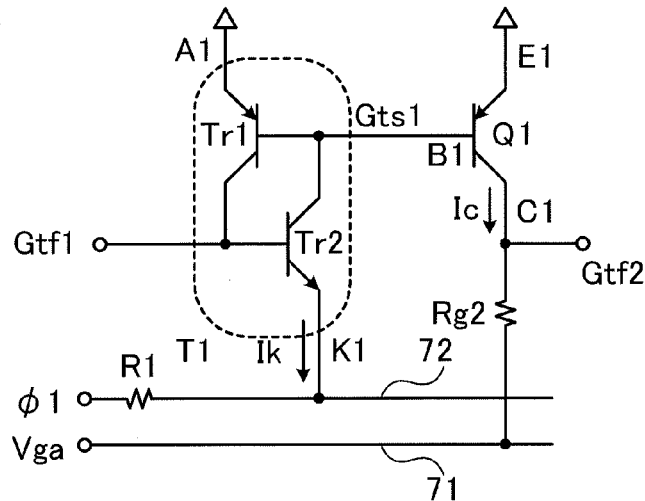
FIGS. 11A to 11C are diagrams for illustrating a potential of a collector (a collector potential) of the coupling transistor.
Figure 11B:
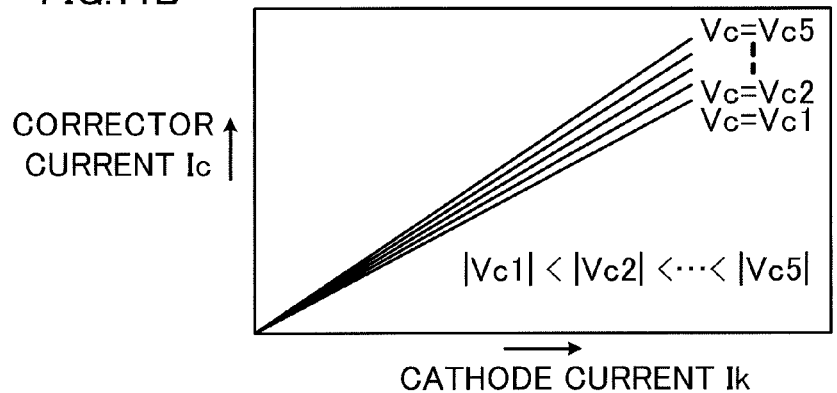
Figure 11C:
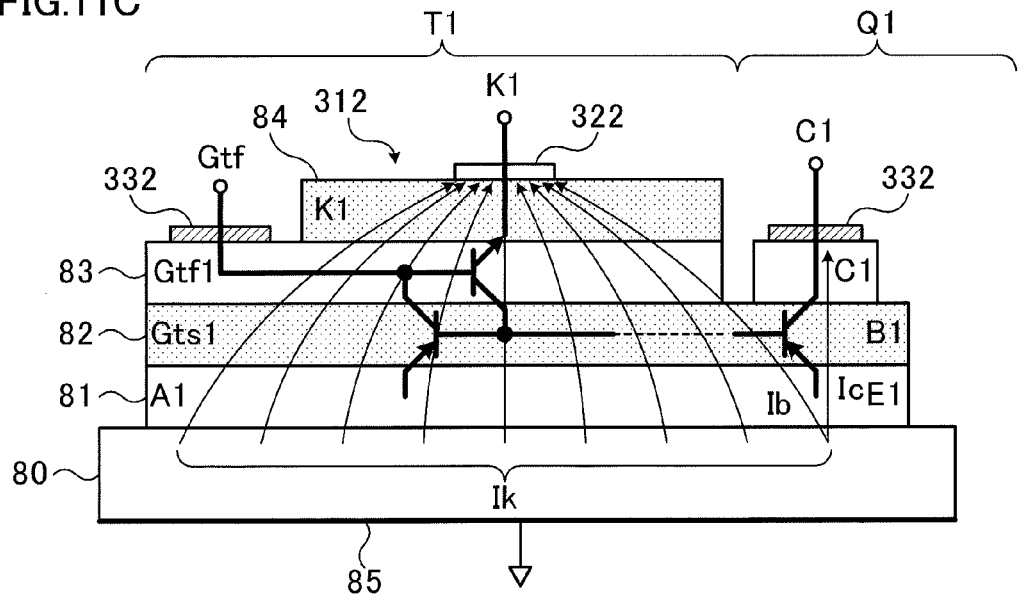

FIGS. 11A to 11C are diagrams for illustrating a potential of the collector C (a collector voltage Vc) of the coupling transistor Q. FIG. 11A is a diagram representing the transfer thyristor T1 and the coupling transistor Q1 by symbols of an equivalent transistor. FIG. 11A is similar to FIG. 7A, but the cathode K1 of the transfer thyristor T1 is connected to the first transfer signal line 72, and then connected to the φ1 terminal via the current limitation resistance R1. The collector C1 of the coupling transistor Q1 is connected to the power supply line 71 ("L" (−3.3V)) via the resistance Rg2, and also connected to the first gate Gtf2 of the not-shown transfer thyristor T2. FIG. 11B is a diagram illustrating a relation between a cathode current Ik flowing from the anode A1 to the cathode K1 in the transfer thyristor T1 in the ON state and a collector current Ic flowing from the emitter E1 to the collector C1 in the coupling transistor Q1 in the ON state. FIG. 11C is a diagram enlarging a portion of the transfer thyristor T1 and the coupling transistor Q1 in the cross-sectional view in FIG. 6B. Here, the transfer thyristor T1 and the coupling transistor Q1 are additionally represented by the symbols of the equivalent transistor, and also the cathode current Ik in the transfer thyristor T1 and collector current Ic and a base current Ib flowing through the base in the coupling transistor Q1 are shown.

Here, as shown in FIG. 11A, it is assumed that the cathode current Ik (suppose that the current value is Ik) flows in the transfer thyristor T1 in the ON state. At this time, the collector current Ic (suppose that the current value is Ic) in the coupling transistor Q1 in the ON state is as shown in FIG. 11B. In FIG. 11B, the collector current Ic is shown with the potential Vc of the collector C1 (suppose that the voltage is Vc) as a parameter.

The collector current Ic is proportioned to the cathode current Ik, and the larger the absolute value of the potential Vc of the collector C1, the larger the collector current Ic.

This is because, as shown in FIG. 11C, part of the cathode current Ik becomes the base current Ib (suppose that the current value is Ib) to the base B1 of the coupling transistor Q1, and a current of β-fold current amplification factor of the base current Ib is taken out as the collector current Ic (Ic=β× Ib).

The base current Ib flows through the n-type second semiconductor layer 82. Accordingly, the base current Ib and the current amplification factor β are unknown. So, an apparent current amplification factor β' is defined as shown in expression (1), and it is assumed that the collector current Ic is β' times, which is the apparent current amplification factor, the cathode current Ik.

$$\beta' = Ic/Ik \quad (1)$$

It should be noted that, as shown in expression (1), since the apparent current amplification factor β' is a ratio of the collector current Ic to the cathode current Ik, the apparent current amplification factor β' corresponds to the gradient (collector current Ic/cathode current Ik) in FIG. 11B. As shown in FIG. 11B, the apparent current amplification factor β' varies in accordance with the collector voltage Vc. However, within a range in which the coupling transistor Q1 is not saturated, the variation according to the collector voltage Vc can be assumed to be small, as shown in FIG. 11B. Consequently, here, the apparent current amplification factor β' is treated as a constant.

As shown in FIG. 11A, the collector C1 of the coupling transistor Q1 is connected to the power supply line 71 of the power supply potential Vga ("L" (−3.3V)) via the power supply resistance Rg2. Here, it is assumed that the coupling transistor Q1 operates without being saturated since the power supply resistance Rg2 is large.

The transfer thyristor T1 is in the ON state, and thereby the cathode current Ik flows therethrough. Consequently, the collector current Ic shown in expression (2) flows through the coupling transistor Q1.

$$Ic = \beta' \times Ik \quad (2)$$

The cathode K1 of the transfer thyristor T1 is at a potential obtained by subtracting the diffusion potential Vd from the anode A1 ("H" (0V)). Accordingly, as shown in FIG. 11A, the cathode current Ik flows from the φ1 terminal, whose potential has become "L" (−3.3V) (=power supply potential Vga ("L" (−3.3V))), via the current limitation resistance R1. Consequently, since Ik=−(Vga+Vd)/R1, the collector voltage Vc of the coupling transistor Q1 is as shown in expression (3). It should be noted that, in expression (3), the potential applied to the cathode K2 of the transfer thyristor T2 is assumed to be the potential $V_L$ to turn the transfer thyristor T2 on, and hereinafter, referred to as the potential $V_L$ applied to the cathode K2 of the transfer thyristor T2. It should be noted that the potential $V_L$ applied to the cathode K2 of the transfer thyristor T2 becomes equal to the power supply potential Vga, in consideration of driving by a single power supply.

$$Vc = Vga + Ic \times Rg = V_L - Rg \times \beta'(V_L + Vd)/R1 \quad (3)$$

To turn the transfer thyristor T2 on, it is required that $V_L < (Vc - Vd)$. Accordingly, expression (4) holds.

$$V_L < V_L - Rg \times \beta' \times (V_L + Vd)/R1 - Vd \quad (4)$$

By solving expression (4) for $V_L$, expression (5) is provided.

$$V_L < -(R1/(Rg \times \beta') + 1) \times Vd \quad (5)$$

In the case of not applying the first exemplary embodiment shown in FIG. 9 (the case where the transfer thyristors T are connected by the coupling diodes D), $V_L < (-2 \times Vd)$, namely, $V_L$ is −3V.

Accordingly, in order that the case where the first exemplary embodiment is applied is operated at higher potential (the potential that is negative and has a smaller absolute value) than the case where the first exemplary embodiment is not applied, it is required to satisfy expression (6). In this case, the threshold voltage of the transfer thyristor T2 becomes higher than −3V.

$$Rg \times \beta' > R1 \qquad (6)$$

It should be noted that, in the case of $V_L = -2 \times Vd$, |Vc|=|Vb|=Vd holds, and therefore the coupling transistor Q1 starts to be saturated around here.

Consequently, to operate with lower operation voltage, the coupling transistor Q1 may be highly saturated. To do this, as shown in expression (7) for example, $Rg \times \beta'$ may be double or more the current limitation resistance R1. In this case, the threshold voltage of the transfer thyristor T2 becomes higher than −2.25V.

$$Rg \times \beta' > 2 \times R1 \qquad (7)$$

In the above description, the current limitation resistance R1 has been described; however, the same holds true for the even-numbered transfer thyristors T to which the second transfer signal φ2 is transmitted via the current limitation resistance R2 and the even-numbered coupling transistors Q connected thereto.

Second Exemplary Embodiment

In the first exemplary embodiment, as shown in FIGS. 6A and 6B, the light-emitting thyristor L1, the transfer thyristor T1 and the coupling transistor Q1 are provided to the first island 301, and the light-emitting thyristor L2, the transfer thyristor T2 and the coupling transistor Q2 are provided to an island similar to the first island 301. The resistance Rg2 is provided to the second island 302.

The collector C1 of the coupling transistor Q1, the first gate Gtf2 of the transfer thyristor T2 and the resistance Rg2 are connected by the connection wiring 77. Other coupling transistors Q, transfer thyristors T and resistances Rg are connected in a similar manner.

In other words, the light-emitting thyristors L, the transfer thyristors T and the coupling transistors Q are respectively constituted in the individual islands, and the resistances Rg are also respectively constituted in the individual islands, and then these are connected by wirings.

In the second exemplary embodiment, the coupling transistor Q1, the transfer thyristor T2 and the resistance Rg2 are connected by the first semiconductor layer 81, the second semiconductor layer 82 and the third semiconductor layer 83.

The other configurations are similar to those in the first exemplary embodiment, and therefore, description of the same portions will be omitted and different portions will be described.

(Light-Emitting Chip U)

Figure 12A:
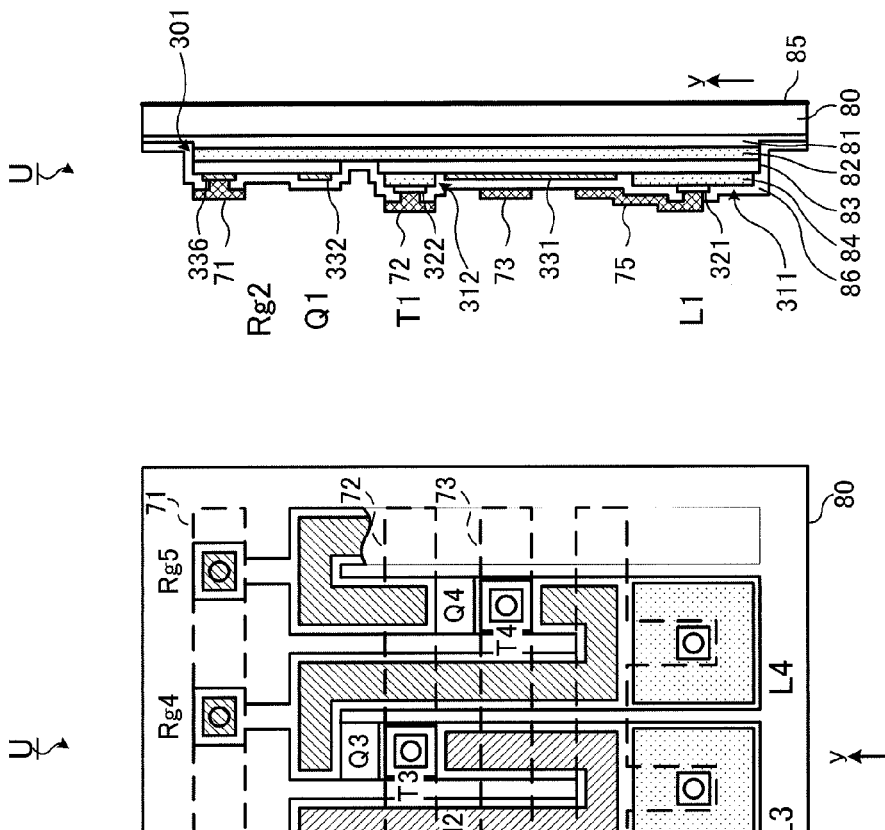
FIGS. 12A and 12B are examples of a layout plan view and a cross-sectional view of a light-emitting chip to which a second exemplary embodiment is applied.
Figure 12B:
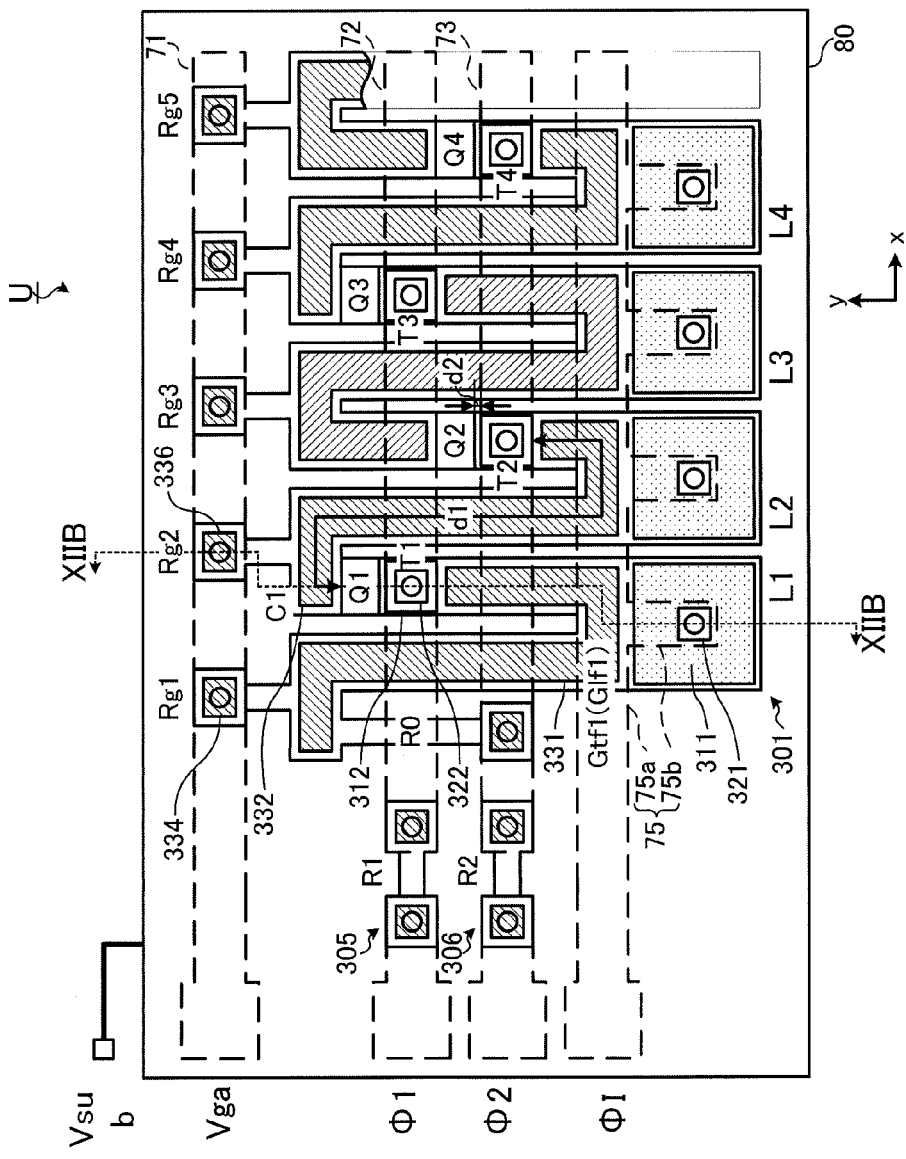

FIGS. 12A and 12B are examples of a layout plan view and a cross-sectional view of the light-emitting chip U to which the second exemplary embodiment is applied. Description of portions same as those in FIGS. 6A and 6B will be omitted, and different portions will be described.

In the light-emitting chip U to which the second exemplary embodiment is applied, the connection wiring 77 is removed, and the p-type third semiconductor layer 83 that constitutes the collector C1 of the coupling transistor Q1 provided to the first island 301 and the p-type third semiconductor layer 83 that constitutes the first gate Gtf2 of the transfer thyristor T2 of an island, which is similar to the first island 301 and provided in parallel to the first island 301, are continuously provided together with the first semiconductor layer 81 and the second semiconductor layer 82. Further, these p-type third semiconductor layers 83 are provided continuously to the p-type third semiconductor layer 83 that constitutes the resistance Rg2 in a similar manner.

Moreover, the p-type third semiconductor layer 83 that constitutes the light-emitting thyristor L1 and the first gate Gtf1 (the first gate Glf1) of the transfer thyristor T1 of the first island 301, the p-type third semiconductor layer 83 that constitutes the resistance Rg1 and the p-type third semiconductor layer 83 that constitutes the start resistance R0 are continuously provided.

Further, other coupling transistors Q, transfer thyristors T and resistances Rg are continuously provided in a similar manner.

As described above, in the light-emitting chip U to which the second exemplary embodiment is applied, the p-type third semiconductor layers 83 of the light-emitting thyristor L, the transfer thyristor T, the coupling transistor Q, the resistance Rg and the start resistance R0 are continuously configured. In other words, the first island 301 in which the light-emitting thyristor L1, the transfer thyristor T1 and the coupling transistor Q1 are provided, the second island 302 in which the resistance Rg1 is provided, the third island 303 in which the resistance Rg2 is provided, an island provided in parallel to the first island 301, in which other light-emitting thyristor L, transfer thyristor T and coupling transistor Q are provided, an island provided in parallel to the second island 302, in which other resistance Rg is provided and the fourth island 304 in which the start resistance R0 is provided, as shown in FIG. 6 form a single island.

In the light-emitting chip U to which the second exemplary embodiment is applied, the connection wirings 76 and 77, and wirings provided in parallel thereto are deleted. In other words, on a surface of the light-emitting chip U, it is possible to reduce a space for providing two wirings, such as the first transfer signal line 72 and the second transfer signal line 73. Accordingly, in the light-emitting chip U to which the second exemplary embodiment is applied, a length in the width direction (y direction in FIGS. 12A and 12B) is reduced.

In the light-emitting chip U to which the first exemplary embodiment is applied, as shown in FIG. 6A, since each of the transfer thyristors T(n−1), T(n) and T(n+1) having continuous numbers is constituted in each of different islands, the transfer thyristor T(n) in the ON state has no effect on the prior and subsequent transfer thyristors T(n−1) and T(n+1). Here, n is an integer of not less than 2, and a smaller number indicates "former" and a larger number indicates "latter".

On the other hand, in the light-emitting chip U to which the second exemplary embodiment is applied, as shown in FIGS. 12A and 12B, since, in the transfer thyristors T(n−1), T(n) and T(n+1) having continuous numbers, the p-type third semiconductor layers 83 are continuously provided, there is a possibility that a current flowing through the transfer thyristor T(n) in the ON state affects the operations of the prior and subsequent transfer thyristors T(n−1) and T(n+1).

For causing the transfer thyristors T to be in the ON state in turn, to thereby normally perform transfer of the ON state, the transfer thyristor T(n) may affect the transfer thyristor T(n+1) larger than the transfer thyristor T(n−1).

As shown in FIGS. 12A and 12B, if it is assumed that the widths of the p-type third semiconductor layers 83 connecting the coupling transistor Q and the transfer thyristor T are equal, it is considered that the ratio of attenuating the base current in the length direction of the p-type third semiconductor layer 83 is same. Accordingly, the length d1 of the p-type third semiconductor layer 83 from the transfer thyristor T(n) in the ON state to the transfer thyristor T(n+1) side may be shorter than the length d2 of the p-type third semiconductor layer 83 from the transfer thyristor T(n) to the transfer thyristor T(n−1) side.

Further, the following conditions will be studied.

Figure 13:
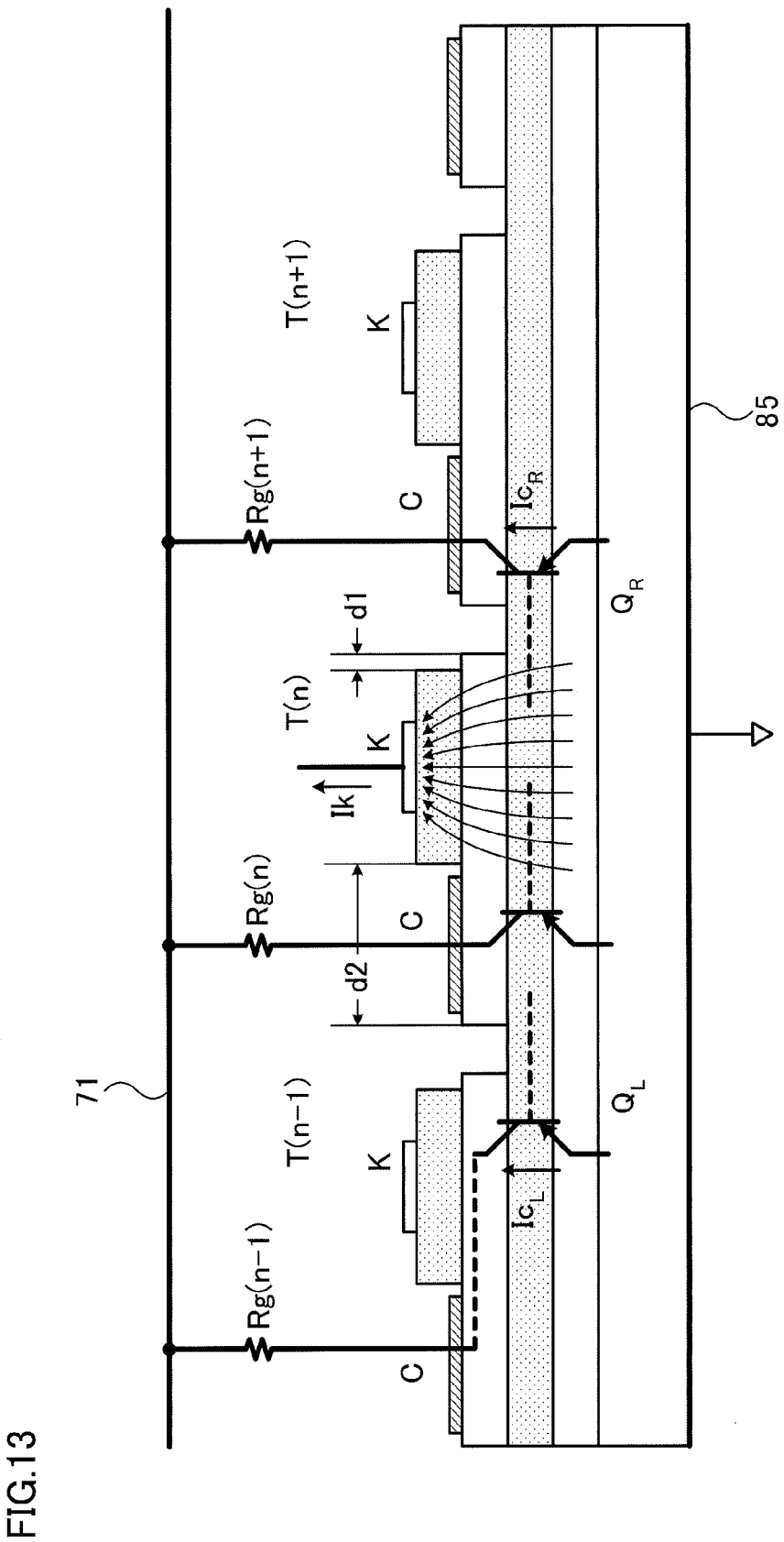
FIG. 13 is a diagram showing cross sections of continuous transfer thyristors T(n−1), T(n) and T(n+1) in the second exemplary embodiment.

FIG. 13 is a diagram showing cross sections of continuous transfer thyristors T(n−1), T(n) and T(n+1) in the second exemplary embodiment.

Here, it is assumed that the transfer thyristor T(n) is in the ON state and the cathode current Ik flows through the transfer thyristor T(n). At this time, it is assumed that the collector current $Ic_R$ in the pnp-transistor $Q_R$ at the left end of the transfer thyristor T(n+1) adjacent on the right side is represented as $Ic_R = \beta'_R \times Ik$ by an apparent current amplification rate $\beta'_R$ of the pnp-transistor $Q_R$ at the left end of the transfer thyristor T(n+1). In a similar manner, it is assumed that the collector current $Ic_L$ in the pnp-transistor $Q_L$ at the right end of the transfer thyristor T(n−1) adjacent on the left side is represented as $Ic_L = \beta'_L \times Ik$ by an apparent current amplification rate $\beta'_L$ of the pnp-transistor $Q_L$ at the right end of the transfer thyristor T(n−1).

In the light-emitting chip U, to normally perform transfer of the ON state, it is required that the potential of the first gate Gtf of the transfer thyristor T(n+1) is higher than the potential of the first gate Gtf of the transfer thyristor T(n−1).

Further, to stably operate the light-emitting chip U, it is required that the potential of the first gate Gtf of the transfer thyristor T(n+1) and the potential of the first gate Gtf of the transfer thyristor T(n−1) are not reversed though being affected by noise or the like.

If both of the pnp-transistor $Q_R$ and the pnp-transistor $Q_L$ are in a saturated state and the collectors C of these transistors become a saturation voltage Vsat, the ON state is not normally transferred because there is no potential difference.

The pnp-transistor $Q_L$ that exists on a far side from the transfer thyristor T(n) in the ON state is hardly saturated because the apparent current amplification rate $\beta'_L$ thereof is smaller than the apparent current amplification rate $\beta'_R$ of the pnp-transistor $Q_R$ that exists on a near side.

If the pnp-transistor $Q_L$ that exists on the far side is not saturated, even though the pnp-transistor $Q_R$ that exists on the near side is saturated, the potential of the first gate Gtf of the transfer thyristor T(n+1) is maintained higher than the potential of the first gate Gtf of the transfer thyristor T(n−1).

A condition for the pnp-transistor $Q_L$ on the far side not to be saturated is represented by expression (8) in a range where expression (6) does not hold.

$$Rg \times \beta'_L < R1 \quad (8)$$

Further, the pnp-transistor $Q_R$ on the near side may be saturated, whereas the pnp-transistor $Q_L$ on the far side may not be saturated. The condition in this case is similar to expression (7), and is represented by expression (9).

$$Rg \times \beta'_R < 2 \times R1 \quad (9)$$

From expressions (8) and (9), expression (10) holds.

$$\beta'_R / \beta'_L > 2 \quad (10)$$

From a true current amplification rate 13 of the pnp-transistors $Q_L$ and $Q_R$ and a diffusion length $\lambda$ of the base current, the apparent current amplification rates $\beta'_R$ and $\beta'_L$ are represented by expressions (11) and (12), respectively.

$$\beta'_R = \beta \times \exp(-d1/\lambda) \quad (11)$$

$$\beta'_L = \beta \times \exp(-d2/\lambda) \quad (12)$$

Accordingly, by substitution of expressions (11) and (12) into expression (10), expression (13) holds.

$$\exp(-(d1-d2)/\lambda) > 2 \quad (13)$$

By taking the natural logarithm of both sides, expression (14) holds.

$$-(d1-d2)/\lambda > \ln(2) \approx 0.7 \quad (14)$$

That is, expression (15) is obtained.

$$d2 - d1 > 0.7\lambda \quad (15)$$

From the above description, the difference (d2−d1) between the length d2 of the p-type third semiconductor layer 83 from the transfer thyristor T(n) in the ON state to the transfer thyristor T(n−1) side and the length d1 of the p-type third semiconductor layer 83 from the transfer thyristor T(n) to the transfer thyristor T(n+1) side may exceed at least 0.7 times the diffusion length $\lambda$ of the base current.

Since the diffusion length $\lambda$ of the base current experimentally obtained is about 4 μm, the difference (d2−d1) between the length d2 of the p-type third semiconductor layer 83 from the transfer thyristor T(n) in the ON state to the transfer thyristor T(n−1) side and the length d1 of the p-type third semiconductor layer 83 from the transfer thyristor T(n) to the transfer thyristor T(n+1) side may exceed 2.8 μm.

Third Exemplary Embodiment

The light-emitting device 65 to which the first exemplary embodiment is applied has a large number of wirings on the circuit board 62, as will be described later. The light-emitting device 65 to which the third exemplary embodiment is applied is capable of suppressing the number of wirings compared to that of the first exemplary embodiment.

Since an image forming apparatus 1 and a print head 14 to which the third exemplary embodiment is applied are similar to the image forming apparatus 1 and the print head 14 shown in FIGS. 1 and 2 in the first exemplary embodiment, description thereof will be omitted, and a description will be started from the light-emitting device 65.

(Light-Emitting Device 65)

Figure 14:
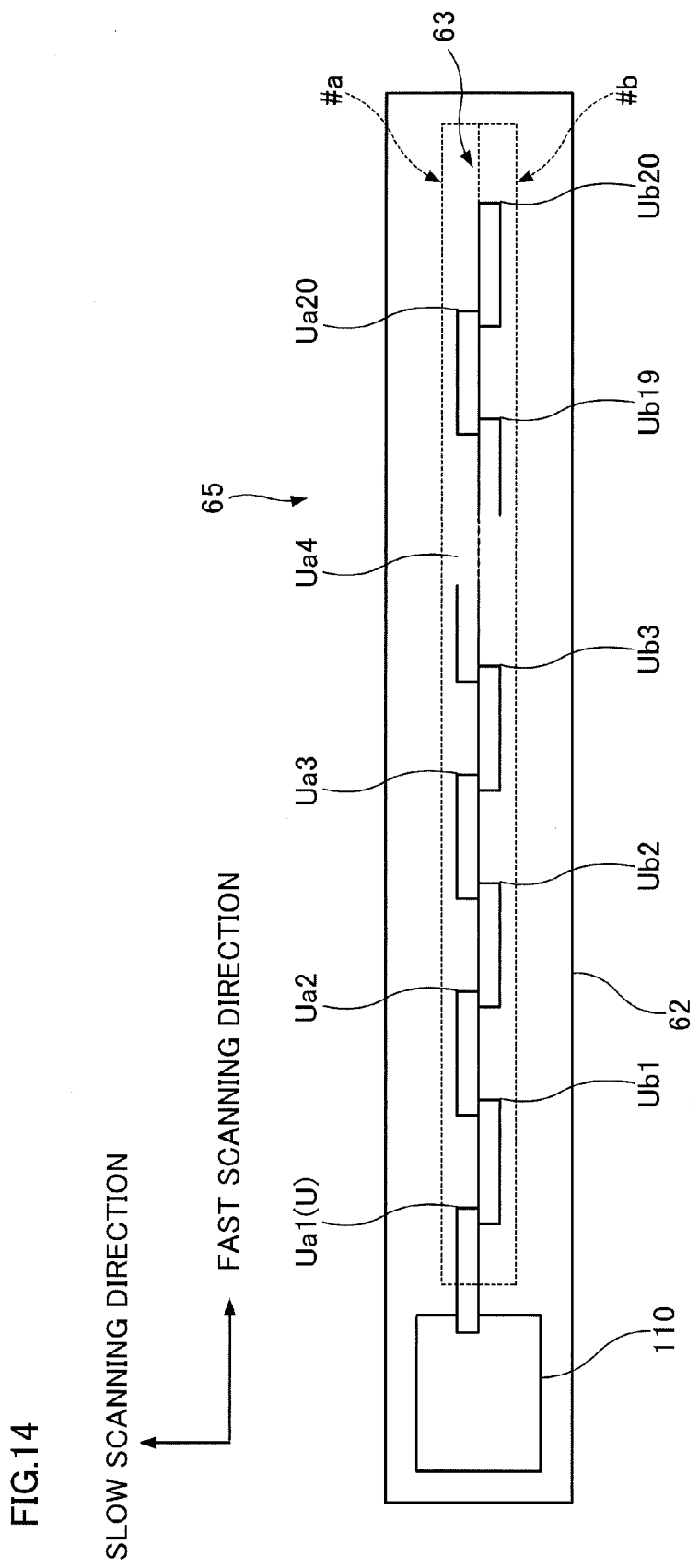
FIG. 14 is a top view of a light-emitting device to which a third exemplary embodiment is applied.

FIG. 14 is a top view of the light-emitting device 65 to which the third exemplary embodiment is applied.

As shown in FIG. 14, a light source portion 63 in the light-emitting device 65 in the third exemplary embodiment is configured by arranging twenty light-emitting chips Ua1 to Ua20 (a light-emitting chip group #a), and twenty light-emitting chips Ub1 to Ub20 (a light-emitting chip group #b) in two lines in a staggered pattern in the fast scanning direction on the circuit board 62. In other words, the third exemplary embodiment divides the forty light-emitting chips U into two light-emitting chip groups (the light-emitting chip group #a and the light-emitting chip group #b). Here, the light-emitting chip group may be abbreviated to "group." The details of the staggered pattern of the light-emitting chip group #a and the light-emitting chip group #b will be described later.

As described above, similar to the first exemplary embodiment, the light-emitting device 65 mounts the signal generating circuit 110 to drive the light source portion 63.

The light-emitting chips Ua1 to Ua20 may have the same configuration as the light-emitting chips Ub1 to Ub20. Thus, the light-emitting chips Ua1 to Ua20 and the light-emitting chips Ub1 to Ub20, when not distinguished, are referred to as a light-emitting chip U.

In the third exemplary embodiment, a total of forty light-emitting chips U are used; however the invention is not limited to this case.

FIGS. 15A and 15B are diagrams showing a configuration of the light-emitting chip U, a configuration of the signal generating circuit 110 of the light-emitting device 65 and a wiring configuration on the circuit board 62, to which the third exemplary embodiment is applied. FIG. 15A shows the configuration of the light-emitting chip U, and FIG. 15B shows the configuration of the signal generating circuit 110 of the light-emitting device 65 and the wiring configuration on the circuit board 62.

First, the configuration of the light-emitting chip U shown in FIG. 15A will be described.

The light-emitting chip U includes a light-emitting portion 102 that includes multiple light-emitting elements (light-emitting thyristors L1, L2, L3, ..., in the third exemplary embodiment) provided in line along and near one of the longitudinal sides on a rectangular substrate 80. The light-emitting chip U further includes terminals (the φ1 terminal, the φ2 terminal, the Vga terminal, a φW1 terminal, a φW2 terminal and the φI terminal) at both ends in the longitudinal direction of the substrate 80, the terminals serving as multiple bonding pads to receive various kinds of control signals. It should be noted that these input terminals are provided in the order of the φW1 terminal, the φ1 terminal, and the Vga terminal from one end of the substrate 80, and are provided in the order of the φI terminal, the φW2 terminal, and the φ2 terminal from the other end of the substrate 80. The light-emitting portion 102 is provided between the Vga and φ2 terminals.

Next, the configuration of the signal generating circuit 110 of the light-emitting device 65 and the wiring configuration on the circuit board 62 will be described with reference to FIG. 15B.

The circuit board 62 of the light-emitting device 65 mounts the signal generating circuit 110 and light-emitting chips U (the light-emitting chips Ua1 to Ua20 and the light-emitting chips Ub1 to Ub20), and wiring to connect between the signal generating circuit 110 and the light-emitting chips Ua1 to Ua20, Ub1 to Ub20 is provided.

First, the configuration of the signal generating circuit 110 will be described.

The signal generating circuit 110 receives input of image-processed image data and various kinds of control signals from the image output controller 30 and the image processor 40 (refer to FIG. 1). The signal generating circuit 110 performs rearrangement of the image data, correction of amount of light, and the like based on these image data and various kinds of control signals.

The signal generating circuit 110 includes a transfer signal generating portion 120a that transmits a first transfer signal φ1a and a second transfer signal φ2a to the light-emitting chip group #a (the light-emitting chips Ua1 to Ua20), and a transfer signal generating portion 120b that transmits a first transfer signal φ1b and a second transfer signal φ2b to the light-emitting chip group #b (the light-emitting chips Ub1 to Ub20) based on the various kinds of control signals.

Then, the signal generating circuit 110 includes a light-up signal generating portion 140a that transmits a light-up signal φIa to the light-emitting chip group #a (the light-emitting chips Ua1 to Ua20), and a light-up signal generating portion 140b that transmits a light-up signal φIb to the light-emitting chip group #b (the light-emitting chips Ub1 to Ub20) based on the various kinds of control signals.

The signal generating circuit 110 includes a write signal generating portion 150 that transmits write signals φW1-1 and φW2-1 to a light-emitting chip pair #1 of the light-emitting chip Ua1 belonging to the light-emitting chip group #a and the light-emitting chip Ub1 belonging to the light-emitting chip group #b, transmits write signals φW1-2 and φW2-2 to a light-emitting chip pair #2 of the light-emitting chip Ua2 belonging to the light-emitting chip group #a and the light-emitting chip Ub2 belonging to the light-emitting chip group #b, and hereinafter, in a similar manner, transmits write signals φW1-20 and φW2-20 to a light-emitting chip pair #20 of the light-emitting chip Ua20 belonging to the light-emitting chip group #a and the light-emitting chip Ub20 belonging to the light-emitting chip group #b.

Here, the write signals φW1-1 to φW1-20, when not distinguished separately, are referred to as a write signal φW1, and the write signals φW2-1 to φW2-20, when not distinguished separately, are referred to as a write signal φW2.

That is, the signal generating circuit 110 includes the write signal generating portion 150 that transmits the two write signals φW1 and φW2 to every pair (the light-emitting chip pairs #1, #2, ..., #20) of the light-emitting chip U belonging to the light-emitting chip group #a and the light-emitting chip U belonging to the light-emitting chip group #b. Here, the light-emitting chip pairs #1, #2, ..., #20, when not distinguished separately, are referred to as a light-emitting chip pair, and abbreviated as "pair" in some cases.

Although the transfer signal generating portion 120a and the transfer signal generating portion 120b are separately shown in FIG. 15B as described above, these are collectively referred to as a transfer signal generating portion 120 in some cases.

Further, similarly, although the light-up signal generating portion 140a and the light-up signal generating portion 140b are separately shown, these are collectively referred to as a light-up signal generating portion 140 in some cases.

In a similar manner, the first transfer signal φ1a and the first transfer signal φ1b, when not distinguished, are referred to as the first transfer signal φ1, and the second transfer signal φ2a and the second transfer signal φ2b, when not distinguished, are referred to as the second transfer signal φ2. The light-up signal φIa and the light-up signal φIb, when not distinguished, are referred to as the light-up signal φI.

Next, an arrangement of the light-emitting chips Ua1 to Ua20, and the light-emitting chips Ub1 to Ub20 will be described.

The light-emitting chips Ua1 to Ua20 belonging to the light-emitting chip group #a are arranged in line at certain intervals in their longitudinal direction. Similarly, the light-emitting chips Ub1 to Ub20 belonging to the light-emitting chip group #b are arranged in line at certain intervals in their longitudinal direction. The light-emitting chips Ua1 to Ua20 belonging to the light-emitting chip group #a and the light-emitting chips Ub1 to Ub20 belonging to the light-emitting chip group #b are arranged in such a staggered pattern that the light-emitting chips Ua1 to Ua20 and Ub1 to Ub20 are opposed to each other and that the light-emitting elements are aligned at predetermined intervals in the fast scanning direction also among the light-emitting chips U. It should be noted that, in the light-emitting chips Ua1, Ua2, Ua3, ... and the light-emitting chips Ub1, Ub2, Ub3, ... shown in FIG. 15B, the direction of arrangement of the light-emitting elements (the numerical order of the light-emitting thyristors L1, L2, L3, ...) shown in FIG. 15A is indicated by an arrow.

Wiring to connect between the signal generating circuit 110 and the light-emitting chips U (the light-emitting chips Ua1 to Ua20 and the light-emitting chips Ub1 to Ub20) will be described.

The circuit board 62 is provided with a power supply line 200a that is connected to the Vsub terminal (refer to FIG. 17, which will be described later) provided on the rear surface of the substrate 80 of the light-emitting chip U, and provides a reference potential Vsub.

The circuit board 62 is also provided with a power supply line 200b that is connected to the Vga terminal provided to each light-emitting chip U and provides a power supply potential Vga for driving.

The circuit board 62 includes a first transfer signal line 201a to transmit a first transfer signal φ1a from the transfer signal generating portion 120a of the signal generating circuit 110 to the φ1 terminals of the light-emitting chips Ua1 to Ua20 of the light-emitting chip group #a, and a second transfer signal line 202a to transmit a second transfer signal φ2a from the transfer signal generating portion 120a of the signal generating circuit 110 to the φ2 terminals of the light-emitting chips Ua1 to Ua20 of the light-emitting chip group #a. The first transfer signal φ1a and the second transfer signal φ2a are transmitted to the light-emitting chips Ua1 to Ua20 of the light-emitting chip group #a in common (in parallel).

Similarly, the circuit board 62 includes a first transfer signal line 201b to transmit a first transfer signal φ1b from the transfer signal generating portion 120b of the signal generating circuit 110 to the φ1 terminals of the light-emitting chips Ub1 to Ub20 of the light-emitting chip group #b, and a second transfer signal line 202b to transmit a second transfer signal φ2b from the transfer signal generating portion 120b of the signal generating circuit 110 to the φ2 terminals of the light-emitting chips Ub1 to Ub20 of the light-emitting chip group #b. The first transfer signal φ1b and the second transfer signal φ2b are transmitted to the light-emitting chips Ub1 to Ub20 of the light-emitting chip group #b in common (in parallel).

The circuit board 62 further includes a light-up signal line 204a to transmit the light-up signal φ1a from the light-up signal generating portion 140a of the signal generating circuit 110 to the φI terminals of the respective light-emitting chips Ua1 to Ua20 of the light-emitting chip group #a. The light-up signal φIa is transmitted to the light-emitting chips Ua1 to Ua20 of the light-emitting chip group #a in common (in parallel).

Similarly, the circuit board 62 includes a light-up signal line 204b to transmit the light-up signal φIb from the light-up signal generating portion 140b of the signal generating circuit 110 to the φI terminals of the respective light-emitting chips Ub1 to Ub20 of the light-emitting chip group #b. The light-up signal φIb is transmitted to the light-emitting chips Ub1 to Ub20 of the light-emitting chip group #b in common (in parallel).

Furthermore, the circuit board 62 includes write signal lines 205-1 to 205-20 and 206-1 to 206-20 through which the write signals φW1 and φW2 are transmitted from the signal generating portion 150 of the signal generating circuit 110 to respective light-emitting chip pairs each configured with one light-emitting chip U belonging to the light-emitting chip group #a and the light-emitting chip U belonging to the light-emitting chip group #b.

In other words, the write signal line 205-1 is connected to the φW1 terminal and transmits the write signal φW1-1, and the write signal line 206-1 is connected to the φW2 terminal and transmits the write signal φW2-1 to the light-emitting chip pair #1 including the light-emitting chip Ua1 belonging to the light-emitting chip group #a and the light-emitting chip Ub1 belonging to the light-emitting chip group #b. The write signal line 205-2 is connected to the φW1 terminal and transmits the write signal φW1-2, and the write signal line 206-2 is connected to the φW2 terminal and transmits the write signal φW2-2 to the light-emitting chip pair #2 including the light-emitting chip Ua2 belonging to the light-emitting chip group #a and the light-emitting chip Ub2 belonging to the light-emitting chip group #b. Hereinafter, in a similar manner, the write signal line 205-20 is connected to the φW1 terminal and transmits the write signal φW1-20, and the write signal line 206-20 is connected to the φW2 terminal and transmits the write signal φW2-20 to the light-emitting chip pair #20 including the light-emitting chip Ua20 belonging to the light-emitting chip group #a and the light-emitting chip Ub20 belonging to the light-emitting chip group #b.

As described above, the reference potential Vsub and the power supply potential Vga are transmitted to all of the light-emitting chips U on the circuit board 62 in common.

The transfer signals φ1a, φ2a and the light-up signal φ1a are transmitted to the light-emitting chip group #a in common. Also, the transfer signals φ1b, φ2b and the light-up signal φIb are transmitted to the light-emitting chip group #b in common.

On the other hand, the write signals φW1 (the write signals φW1-1 to φW1-20) and the write signals φW2 (the write signals φW2-1 to φW2-20) are each transmitted, in common, to the light-emitting chips U in the corresponding one of the light-emitting chip pair (the light-emitting chip pairs #1 to #20) each configured with one light-emitting chip U belonging to the light-emitting chip group #a, and one light-emitting chip U belonging to the light-emitting chip group #b.

It should be noted that, in a case where the light-emitting device 65 is not provided with the signal generating circuit 110, the power supply lines 200a and 200b, the first transfer signal lines 201a and 201b, the second transfer signal lines 202a and 202b, the light-up signal lines 204a and 204b and the write signal lines 205-1 to 205-20 and 206-1 to 206-20 are connected to a connector or the like instead of the signal generating circuit 110, and then connected to the signal generating circuit 110 provided on the outside via a cable connected to the connector or the like.

Figure 16:
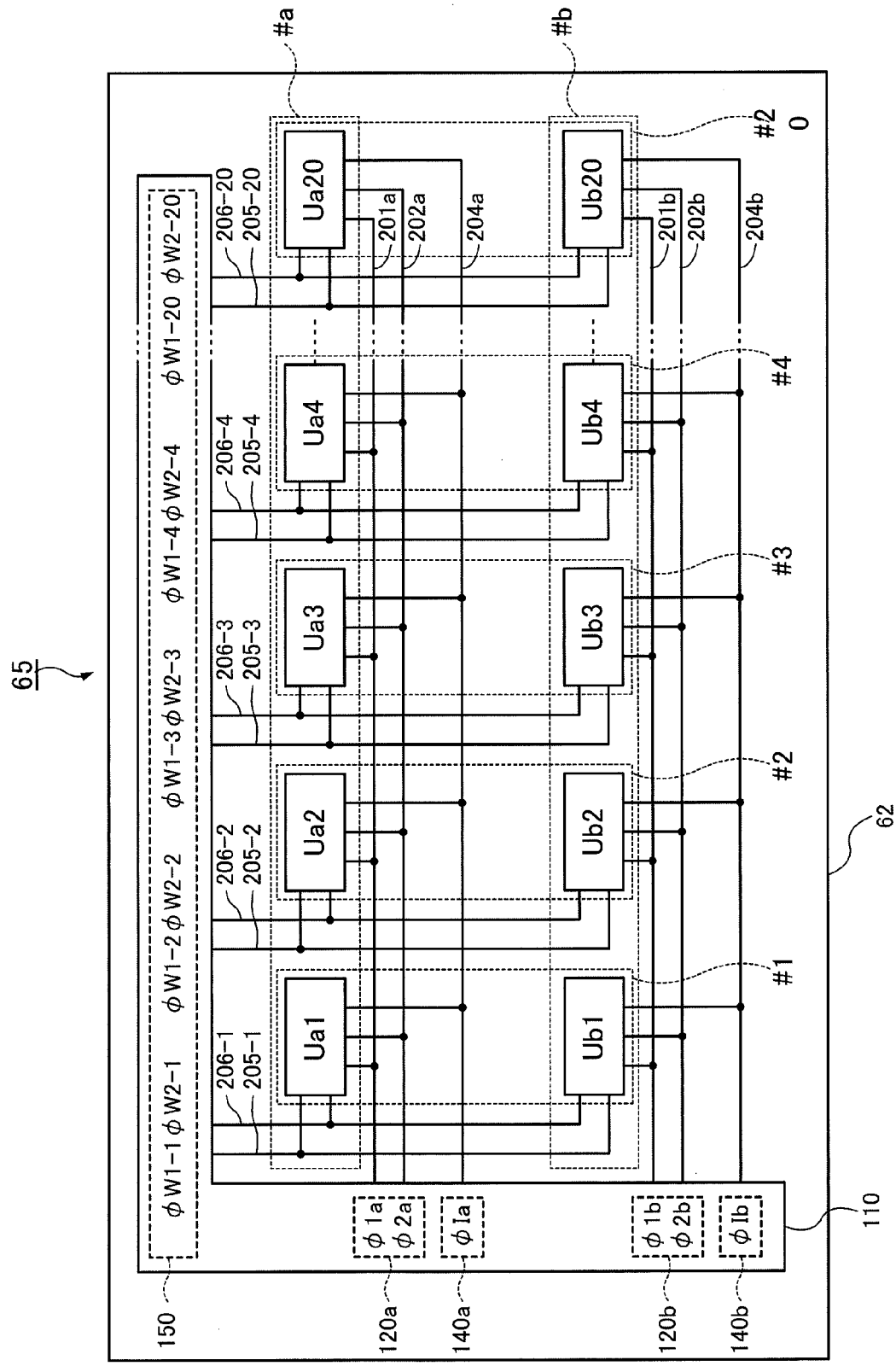
FIG. 16 is a diagram showing the light-emitting chips of the light-emitting device, to which the third exemplary embodiment is applied, being arranged as respective elements in a matrix form.

FIG. 16 is a diagram showing the light-emitting chips U of the light-emitting device 65 to which the third exemplary embodiment is applied, being arranged as respective elements in a matrix form.

FIG. 16 shows that the light-emitting chips U (the light-emitting chips Ua1 to Ua20 and the light-emitting chips Ub1 to Ub20) are arranged as respective elements in a 2×20 matrix form, and shows only the lines of signal (the transfer signals φ1a, φ2a, φ1b, φ2b, the light-up signals φIa, φIb, the write signals φW1-1 to φW1-20, and the write signals φW2-1 to φW2-20) that connect between the above-mentioned signal generating circuit 110 and the light-emitting chips U (the light-emitting chips Ua1 to Ua20 and the light-emitting chips Ub1 to Ub20).

As described above, the transfer signals φ1a, φ2a and the light-up signal φ1a are transmitted to the light-emitting chip group #a in common. It is easily understood that the transfer signals φ1b, φ2b and the light-up signal φIb are transmitted to the light-emitting chip group #b in common.

On the other hand, it is easily understood that the write signals φW1-1 to φW1-20 are each transmitted, in common, to the light-emitting chips U in the corresponding one of the light-emitting chip pairs #1 to #20 each including one light-emitting chip U belonging to the light-emitting chip group #a, and one light-emitting chip U belonging to the light-emitting chip group #b, and in a similar manner, the write signals φW2-1 to φW2-20 are each transmitted, in common, to the light-emitting chips U in the corresponding one of the light-emitting chip pairs #1 to #20 each including one light-emitting chip U belonging to the light-emitting chip group #a, and one light-emitting chip U belonging to the light-emitting chip group #b.

Here, the number of wiring lines provided on the circuit board 62 will be described.

In a case where the third exemplary embodiment is not applied and in the first exemplary embodiment where the light-emitting chips U of the light-emitting device 65 are neither divided into the light-emitting chip groups nor the light-emitting chip pairs (refer to FIGS. 4A and 4B), on the assumption that the number of the light-emitting chips C is forty, forty light-up signal lines 204-1 to 204-40 are needed because the light-up signal φI is transmitted to each of the light-emitting chips U. It should be noted that, in the third exemplary embodiment, the lighting control is performed on two light-emitting thyristors L in parallel in each light-emitting chip U. Accordingly, to perform the lighting control on the two light-emitting thyristors L in parallel in each light-emitting chip U, forty light-up signal lines are further required.

In addition, the first transfer signal line 201, the second transfer signal line 202, and the power supply lines 200a and 200b are needed. Therefore, the number of wiring lines provided for the light-emitting device 65 is eighty-four.

Also, the forty light-up signal lines 204 and the forty light-up signal lines required to perform the lighting control on the two light-emitting thyristors L in parallel in each light-emitting chip U need to have a small resistance because a current is passed through for lighting the light-emitting thyristors L. Thus, thick wiring is needed for the forty light-up signal lines 204 and the forty light-up signal lines required to perform the lighting control on the two light-emitting thyristors L in parallel in each light-emitting chip U. Thus, in the case where the first exemplary embodiment is applied, a great number of thick wiring lines would be provided on the circuit board 62 of the light-emitting device 65, thus the area of the circuit board 62 is increased.

In the third exemplary embodiment, in the case where the number of the light-emitting chip groups two as shown in FIGS. 15B and 16, the number of wiring lines for the light-up signal lines 204a and 204b is two. In addition, the first transfer signal lines 201a and 201b, the second transfer signal lines 202a and 202b, the power supply lines 200a and 200b and the write signal lines 205-1 to 205-20 and 206-1 to 206-20 are needed. Therefore, the number of wiring lines is forty-eight.

In the third exemplary embodiment, the number of wiring lines is 4/7 of that for the case where the third exemplary embodiment is not applied.

Further, in the third exemplary embodiment, the number of thick wiring lines to allow current flow for lighting the light-emitting thyristors L is reduced to two light-up signal lines 204a and 204b. A write thyristor S to be described later is designed to set to an ON state to change the threshold voltage of the light-emitting thyristor L, and therefore, a large current does not flow through the write signal lines 205-1 to 205-20 and 206-1 to 206-20. Therefore, thick wiring lines are not needed for the write signal lines 205-1 to 205-20 and 206-1 to 206-20. For this reason, in the case where the light-emitting chip U according to the third exemplary embodiment is employed, many thick wires provided on the circuit board 62 are not required, and thereby it is possible to suppress the area of the circuit board 62.

Figure 17:
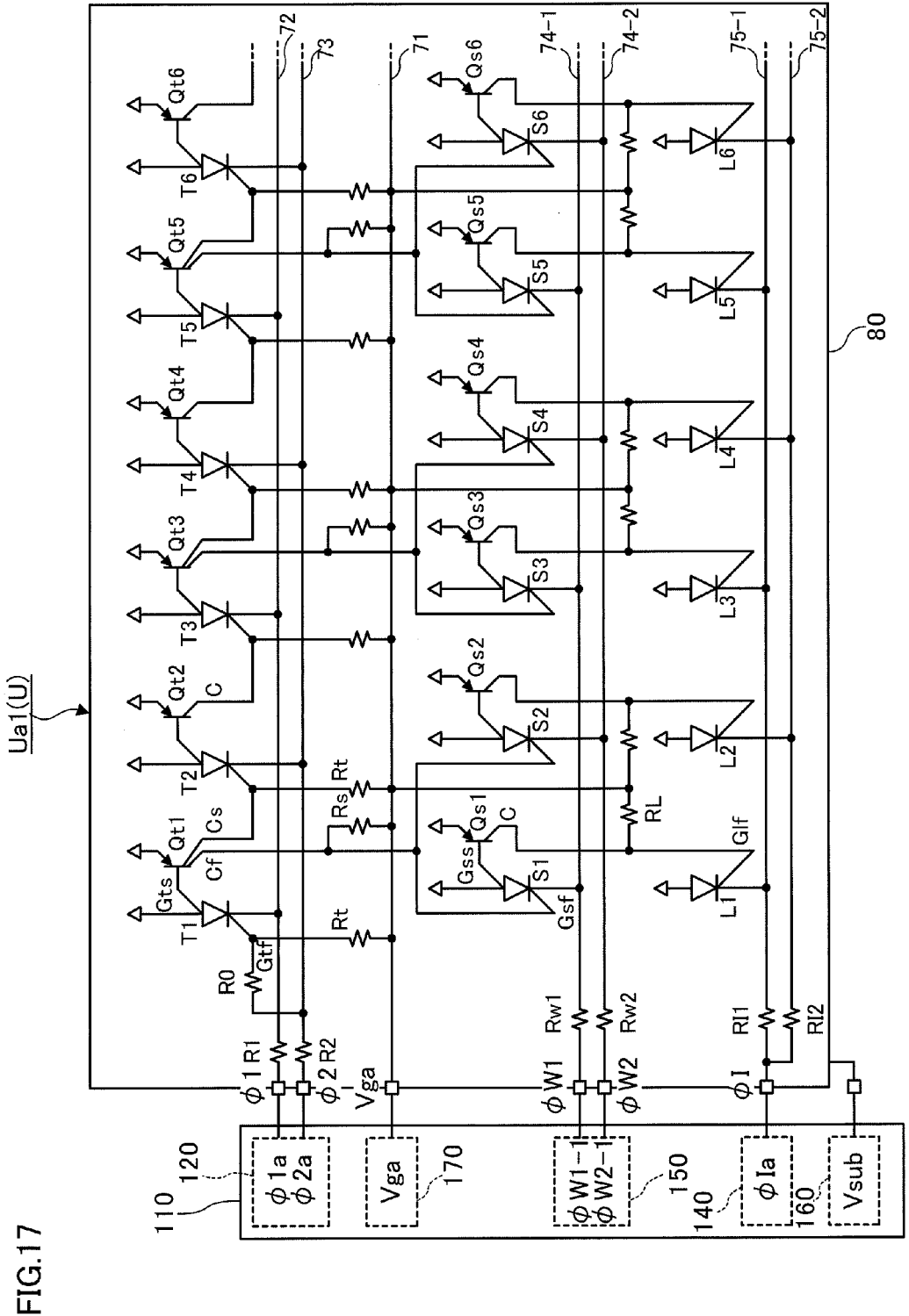
FIG. 17 is an equivalent circuit diagram for illustrating a circuit configuration of the light-emitting chip that mounts a self-scanning type light-emitting element array (SLED) to which the third exemplary embodiment is applied.

FIG. 17 is an equivalent circuit diagram for illustrating a circuit configuration of the light-emitting chip that mounts a self-scanning type light-emitting element array (SLED) to which the third exemplary embodiment is applied. In FIG. 17, each element described below, except for the terminals (the Vga terminal, the φ1 terminal, the φ2 terminal, a φE terminal, a φW terminal and the φI terminal), is arranged based on the layout on each light-emitting chip U. It should be noted that the terminals (the φ1 terminal, the φ2 terminal, the Vga terminal, the φW1 terminal, the φW2 terminal and the φI terminal), although being different from those in FIG. 15A, are shown at the left end of FIG. 17 for convenience of description.

Here, the light-emitting chip U will be described by using the light-emitting chip Ua1 as an example in relation with the signal generating circuit 110. Therefore, in FIG. 17, the light-emitting chip U is denoted as the light-emitting chip Ua1 (U). The other light-emitting chips Ua2 to Ua20 and Ub1 to Ub20 have the same configuration as that of the light-emitting chip Ua1.

As described above, the light-emitting chip Ua1 (U) includes the light-emitting thyristor array (the light-emitting portion 102 (refer to FIG. 15A)) configured with the light-emitting thyristors L1, L2, L3, . . . arranged on the substrate 80 in line.

The light-emitting chip Ua1 (U) also includes a transfer thyristor array configured with transfer thyristors T1, T2, T3, . . . arranged in line in a similar manner as the light-emitting thyristor array, and a write thyristor array configured with write thyristors S1, S2, S3, . . . arranged in line in the similar manner.

Here, the light-emitting thyristors L1, L2, L3, . . . , the transfer thyristors T1, T2, T3, . . . , and the write thyristors S1, S2, S3, . . . , when not individually distinguished, are referred to as the light-emitting thyristor L, the transfer thyristor T and the write thyristor S, respectively.

The light-emitting chip Ua1 (U) includes coupling transistors Qt1, Qt2, Qt3, . . . , which are the pnp-bipolar transistors, located between respective pairs of two adjacent transfer thyristors, taken sequentially from T1, T2, T3, . . . .

The light-emitting chip Ua1 (U) further includes write transistors Qs1, Qs2, Qs3, . . . corresponding to the write thyristors S1, S2, S3, . . . , respectively.

Here, the coupling transistors Qt1, Qt2, Qt3, . . . and the write transistors Qs1, Qs2, Qs3, . . . , when not individually distinguished, are referred to as a coupling transistor Qt and a write transistor Qs, respectively.

The light-emitting chip Ua1 (U) includes one start resistance R0. The light-emitting chip Ua1 (U) further includes current limitation resistances R1 and R2 to prevent excess current from flowing through a first transfer signal line 72 for transmitting a first transfer signal φ1 (in the light-emitting chip Ua1, the first transfer signal φ1a), and a second transfer signal line 73 for transmitting a second transfer signal φ2 (in the light-emitting chip Ua1, the second transfer signal φ2a), respectively. Similarly, the light-emitting chip Ua1 (U) further includes current limitation resistances Rw1 and Rw2 to prevent excess current from flowing through a write signal line 74-1 for transmitting a write signal φW1 (in the light-emitting chip Ua1, the write signal φW1-1), and a write signal line 74-2 for transmitting a write signal φW2 (in the light-emitting chip Ua1, the write signal φW2-1), respectively. Further, the light-emitting chip Ua1 (U) includes current limitation resistances RI1 and RI2 to prevent excess current from flowing through light-up signal lines 75-1 and 75-2 for transmitting a light-up signal φI (in the light-emitting chip Ua1, the light-up signal φIa), respectively.

It should be noted that some or all of the current limitation resistances R1, R2, Rw1, Rw2, RI1 and RI2 may be provided outside of the light-emitting chip Ua1 (U).

The light-emitting chip Ua1 (U) further includes plural resistances (resistances Rt, Rs and RL), but description thereof will be given later.

The light-emitting thyristors L1, L2, L3, . . . , in the light-emitting thyristor array, the transfer thyristors T1, T2, T3, ..., in the transfer thyristor array and the write thyristors S1, S2, S3, ..., in the write thyristor array are arranged in the numerical order from the left in FIG. 17. Similarly, the coupling transistors Qt1, Qt2, Qt3, ... are also arranged in the numerical order from the left in FIG. 17. Further, the write transistors Qs1, Qs2, Qs3, ... are arranged in parallel with the write thyristors S1, S2, S3, ..., in the write thyristor array, respectively.

The light-emitting thyristor array, the transfer thyristor array, and the write thyristor array are arranged in the order of the transfer thyristor array, the write thyristor array, and the light-emitting thyristor array from the top to the bottom in FIG. 17.

It should be noted that, similar to the light-emitting thyristors L and the transfer thyristors T, the write thyristors S are semiconductor elements each including a first gate, a second gate, an anode and a cathode. The coupling transistors Qt and the write transistors Qs are semiconductor elements each including a collector, a base, and an emitter; however, each of odd-numbered coupling transistors Qt includes two collectors (a multi-connector).

In the third exemplary embodiment, irrespective of the numbers of the transfer thyristors T, the write thyristors S and the light-emitting thyristors L, the first and second gates are referred to as the first gate Gtf and the second gate Gts in the transfer thyristors T, the first gate first gate Gsf and the second gate Gss in the write thyristors S, and the first gate Glf in the light-emitting thyristors L. Similarly, irrespective of the numbers of the coupling transistors Qt, the collectors are referred to as the first collector Cf and the second collector Cs in the odd-numbered coupling transistors Qt with the multi-connectors, and referred to as the collector C in the even-numbered coupling transistors Qt. In the write transistors Qs, irrespective of the numbers thereof, the collector is referred to as collector C.

Next, electrical connection of the elements in the light-emitting chip Ua1 (U) will be described.

The anode of each transfer thyristor T, the anode of each write thyristor S, and the anode of each light-emitting thyristor L are connected to the substrate 80 of the light-emitting chip Ua1 (U) (anode common). The emitter of each coupling transistor Qt and the emitter of each write transistor Qs are also connected to the substrate 80 of the light-emitting chip Ua1 (U).

These anodes and emitters are then connected to the power supply line 200a (refer to FIG. 15B) via the back-side electrode 85, which is the Vsub terminal, provided on the rear surface of the substrate 80. The reference potential Vsub is supplied to the power supply line 200a from the reference potential supply portion 160.

The cathodes of odd-numbered transfer thyristors T1, T3, T5, ..., are connected to the first transfer signal line 72 along the transfer thyristor array. The first transfer signal line 72 is then connected to the φ1 terminal via the current limitation resistance R1. The first transfer signal line 201a (refer to FIG. 15B) is connected to the φ1 terminal to transmit the first transfer signal φ1a.

On the other hand, the cathodes of even-numbered transfer thyristors T2, T4, T6, ..., are connected to the second transfer signal line 73 along the transfer thyristor array. The second transfer signal line 73 is then connected to the φ2 terminal via the current limitation resistance R2. The second transfer signal line 202a (refer to FIG. 15B) is connected to the φ2 terminal, to thereby transmit the second transfer signal φ2a.

In the case of the light-emitting chip U1b, the first transfer signal line 201b (refer to FIG. 15B) is connected to the φ1 terminal to transmit the first transfer signal φ1b. Similarly, the second transfer signal line 202b (refer to FIG. 15B) is connected to the φ2 terminal, to thereby transmit the second transfer signal φ2b.

Along the write thyristor array, the cathodes of the odd-numbered write thyristors S are connected to the write signal line 74-1. Then, the write signal line 74-1 is connected to the φW1 terminal via the current limitation resistance Rw1. In the case of the light-emitting chip Ua1, the write signal line 205-1 (refer to FIG. 15B) is connected to the φW1 terminal, to thereby transmit the write signal φW1-1.

On the other hand, along the write thyristor array, the cathodes of the even-numbered write thyristors S are connected to the write signal line 74-2. Then, the write signal line 74-2 is connected to the φW2 terminal via the current limitation resistance Rw2. In the case of the light-emitting chip Ua1, the write signal line 206-1 (refer to FIG. 15B) is connected to the φW2 terminal, to thereby transmit the write signal φW2-1.

Along the light-emitting thyristor array, the cathodes of the odd-numbered light-emitting thyristors L are connected to the light-up signal line 75-1. Then, the light-up signal line 75-1 is connected to the φI terminal via the current limitation resistance RI1.

On the other hand, along the light-emitting thyristor array, the cathodes of the even-numbered light-emitting thyristors L are connected to the light-up signal line 75-2. Then, the light-up signal line 75-2 is connected to the φI terminal via the current limitation resistance RI2.

In the case of the light-emitting chip Ua1, the light-up signal line 204a (refer to FIG. 15B) is connected, to thereby transmit the light-up signal φIa.

It should be noted that, in FIG. 17, the φI terminal is provided in the left end portion of the light-emitting chip U; however, the φI terminal may also be provided in the right end portion of the light-emitting chip U to perform both-end driving. At this time, the light-up signal lines 75-1 and 75-2 are connected to the φI terminal provided in the right end portion via the respective current limitation resistances.

Along the transfer thyristor array, the first gates Gtf of the odd-numbered transfer thyristors T are connected to the power supply line 71 via the resistance Rt. The second gates Gts are connected to the bases of the odd-numbered coupling transistors Qt.

The first collector Cf of each of the odd-numbered coupling transistors Qt is connected to the power supply line 71 via the resistance Rs, and also connected to the first gate Gsf of each of the write thyristor S having the same odd number and the write thyristor S having an even number larger by 1. Then, the second collector Cs is connected to the first gate Gtf of the transfer thyristor having an even number larger by 1 (the latter).

The first gates Gtf of the even-numbered transfer thyristors T are connected to the power supply line 71 via the resistance Rt. The second gates Gts of the even-numbered transfer thyristors T are connected to the bases of the even-numbered coupling transistors Qt.

The collectors C of the even-numbered coupling transistors Qt are connected to the first gates Gtf of the transfer thyristors T having an odd number larger by 1 (the next).

The second gates Gsf of the write thyristors S are connected to the bases of the write transistors Qs correspondingly provided. The collectors C of the write transistors Qs are connected to the power supply line 71 via the resistances RL, and also connected to the first gates Glf of the light-emitting thyristors L having the same numbers, respectively.

As described above, in the light-emitting chip Ua1 (U) according to the third exemplary embodiment, to each of the odd-numbered transfer thyristors T, the write thyristors S having the same numbers and the numbers larger by 1 are connected, and the light-emitting thyristor L is connected to each of the write thyristors S. In other words, the light-emitting chip Ua1 (U) is configured to control two light-emitting thyristors L by the odd-numbered transfer thyristor T.

It should be noted that, though it is assumed that the each odd-numbered coupling transistor Qt has a multi-connector, the odd-numbered coupling transistor Qt may have a single connector, and therefore the first gate Gsf of the write thyristor S and the first gate Gtf of the transfer thyristor T may be connected in common.

It should be noted that the light-emitting chip U shown in FIG. 17, to which the third exemplary embodiment is applied, may be configured based on the structure of the first exemplary embodiment shown in FIGS. 6A and 6B, or may be configured based on the structure of the second exemplary embodiment shown in FIGS. 12A and 12B. Description of the layout and a manufacturing method will be omitted.

Next, operations of the light-emitting device 65 will be described.

Here, description will be given on the assumption that the coupling transistors Qt and the write transistors Qs are saturated in the ON state, and the collectors become the reference potential Vsub ("H" (0V)), which is a potential of the emitters.

Figure 15:
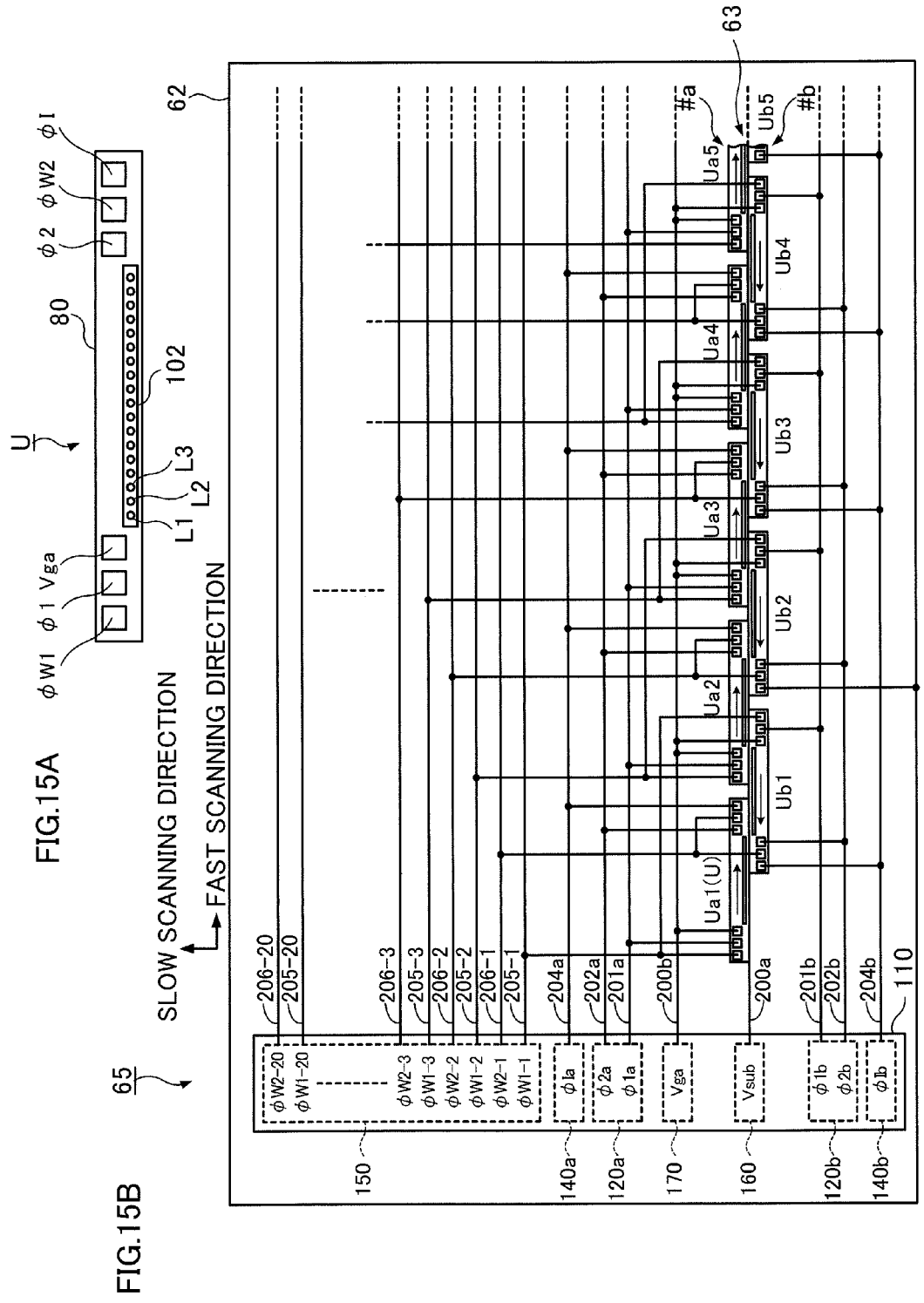
FIGS. 15A and 15B are diagrams showing a configuration of a light-emitting chip, a configuration of a signal generating circuit of the light-emitting device and a wiring configuration on a circuit board, to which the third exemplary embodiment is applied.

The light-emitting device 65 includes the light-emitting chips Ua1 to Ua20 belonging to the light-emitting chip group #a, and the light-emitting chips Ub1 to Ub20 belonging to the light-emitting chip group #b (refer to FIGS. 14-16).

As shown in FIG. 15B, the reference potential Vsub and the power supply potential Vga are supplied to all of the light-emitting chips U (the light-emitting chips Ua1 to Ua20 and the light-emitting chips Ub1 to Ub20) on the circuit board 62 in common.

As described above, the first transfer signal φ1a, the second transfer signal φ2a and the light-up signal φIa are transmitted to the light-emitting chips Ua1 to Ua20 of the light-emitting chip group #a in common. Accordingly, the light-emitting chips Ua1 to Ua20 of the light-emitting chip group #a are driven in parallel.

Similarly, as described above, the first transfer signal φ1b, the second transfer signal φ2b and the light-up signal φIb are transmitted to the light-emitting chips Ub1 to Ub20 of the light-emitting chip group #b in common. Accordingly, the light-emitting chips Ub1 to Ub20 of the light-emitting chip group #b are driven in parallel.

On the other hand, the write signals φW1-1 to φW1-20 and the write signals φW2-1 to φW2-20 are each transmitted, in common, to the corresponding one of the light-emitting chip pairs #1 to #20 each including one light-emitting chip U belonging to the light-emitting chip group #a, and one light-emitting chip U belonging to the light-emitting chip group #b. For example, the write signals φW1-1 and φW2-1 are transmitted to the light-emitting chip pair #1 including the light-emitting chip Ua1 of the light-emitting chip group #a and the light-emitting chip Ub1 of the light-emitting chip group #b in common. Also, the write signals φW1-1 to φW1-20 and the write signals φW2-1 to φW2-20 are transmitted in parallel at the same timing. Consequently, the light-emitting chip pairs #1 to #20 are driven in parallel.

It should be noted that, for adjusting the amount of light of the light-emitting thyristors L, timing of transmission of the respective write signals φW1-1 to φW1-20 and write signals φW2-1 to φW2-20 may be shifted from each other.

Since the light-emitting chips Ua2 to Ua20 of the light-emitting chip group #a are driven in parallel to the light-emitting chip Ua1, and the light-emitting chips Ub2 to Ub20 of the light-emitting chip group #b are driven in parallel to the light-emitting chip Ub1, it suffices to describe the operations of the light-emitting chips Ua1 and Ub1 belonging to the light-emitting chip pair #1. Similarly, since the light-emitting chip pairs #2 to #20 are driven in parallel to the light-emitting chip pair #1, it suffices to describe the light-emitting chip pair #1 to which the light-emitting chips Ua1 and Ub1 belong.

Consequently, hereinafter, operations of the light-emitting chips Ua1 and Ub1 will be described.

Figure 18:
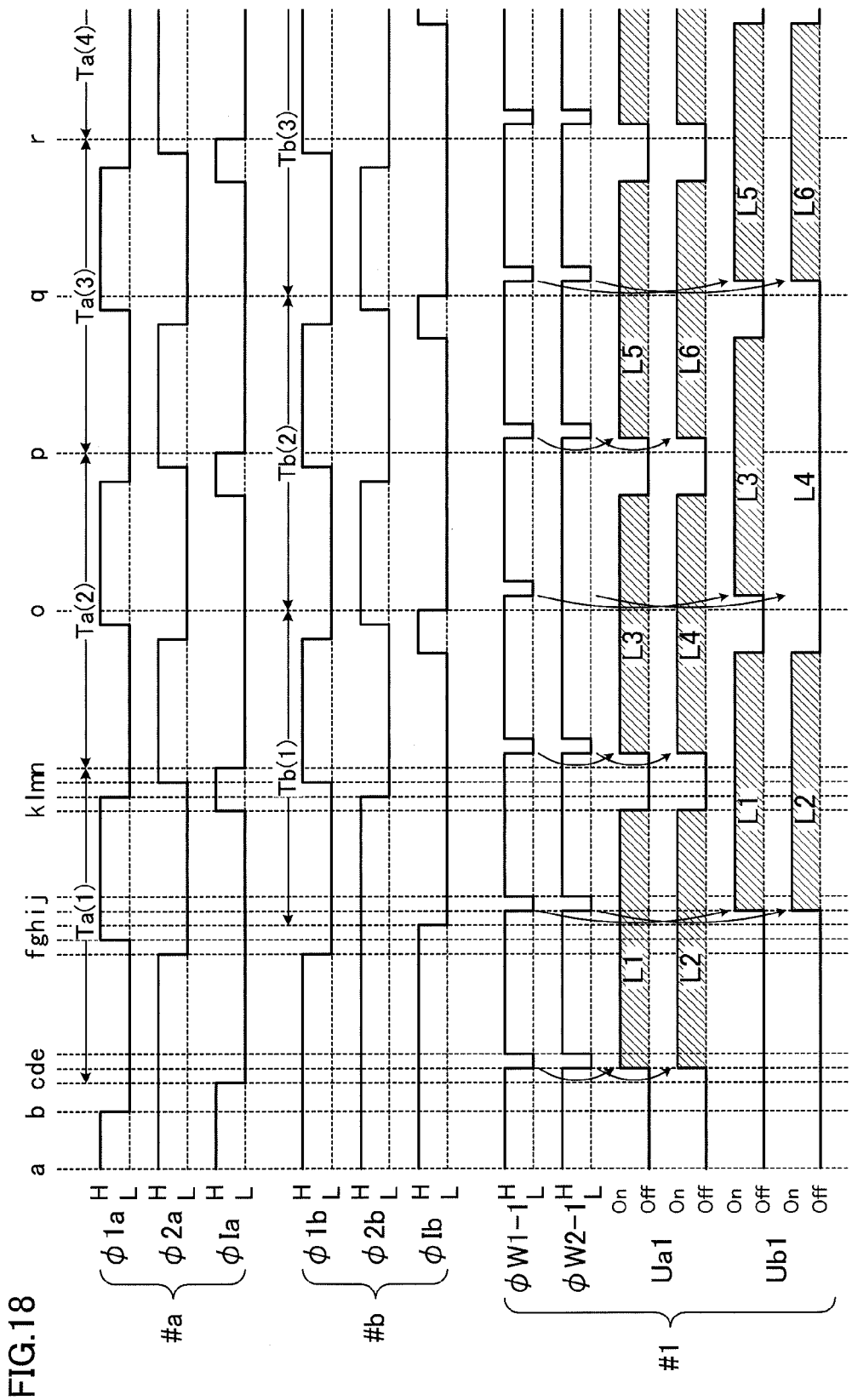
FIG. 18 is a timing chart for illustrating operations of the light-emitting chip to which the third exemplary embodiment is applied.

FIG. 18 is a timing chart for illustrating operations of the light-emitting chip U to which the third exemplary embodiment is applied. FIG. 18 shows a timing chart illustrating operations of the light-emitting chip pair #1 (the light-emitting chips Ua1 and Ub1). FIG. 18 shows the timing chart of a portion that controls whether or not to light up the six light-emitting thyristors L1 to L6 in each light-emitting chip U. It should be noted that, in the following, control of whether or not to light up the light-emitting thyristor L is referred to as lighting control.

In the light-emitting chip Ua1 in the light-emitting chip pair #1, it is assumed that all the light-emitting thyristors L1 to L6 are controlled to be lighted up. On the other hand, in the light-emitting chip Ub1, of the light-emitting thyristors L1 to L6, the light-emitting thyristor L4 is controlled to be lighted off, and the other light-emitting thyristors are controlled to be lighted up.

In FIG. 18, it is assumed that the time elapses in alphabetical order from a time point a to a time point r. During a time period Ta(1) from a time point c to a time point n, lighting control of the light-emitting thyristors L1 and L2 of the light-emitting chip Ua1 of the light-emitting chip group #a is performed. During a time period Ta(2) from a time point n to a time point p, lighting control of the light-emitting thyristors L3 and L4 of the light-emitting chip Ua1 of the light-emitting chip group #a is performed. During a time period Ta(3) from a time point p to a time point r, lighting control of the light-emitting thyristors L5 and L6 of the light-emitting chip Ua1 of the light-emitting chip group #a is performed.

On the other hand, during a time period Tb(1) from a time point h to a time point o, lighting control of the light-emitting thyristors L1 and L2 of the light-emitting chip Ub1 of the light-emitting chip group #b is performed. During a time period Tb(2) from a time point o to a time point q, lighting control of the light-emitting thyristors L3 and L4 of the light-emitting chip Ub1 of the light-emitting chip group #b is performed. During a time period Tb(3) starting from a time point q, lighting control of the light-emitting thyristors L5 and L6 of the light-emitting chip Ub1 of the light-emitting chip group #b is performed. Hereinafter, lighting control of the light-emitting thyristors L having a number of not less than 7 is performed in a similar manner.

In the third exemplary embodiment, time periods Ta(1), Ta(2), Ta(3), have the same length, and, when not individually distinguished, are referred to as a time period T.

The time periods Ta(1), Ta(2), Ta(3), ..., in which the light-emitting chips Ua1, Ua2, Ua3, ... of the light-emitting chip group #a are controlled, and the time periods Tb(1), Tb(2), Tb(3), ..., in which the light-emitting chips Ub1, Ub2, Ub3, ... of the light-emitting chip group #b are controlled are shifted from each other by ½ of (half) the time period T (180 degrees in terms of phase). That is, time period Tb(1) starts ½ of the time period T after the time period Ta(1) starts.

Thus, hereinafter, description will be given of the time periods Ta(1), Ta(2), Ta(3), ..., in which the light-emitting chips Ua1, Ua2, Ua3, ... of the light-emitting chip group #a are controlled.

It should be noted that the length of the time period T may be variable as long as mutual relationship between signals described below is maintained.

All signal waveforms in the time periods Ta(1), Ta(2), Ta(3), . . . , are periodically repeated except for the write signals φW1-1 and φW2-1 that change according to received image data.

Thus, only the operation of signals in the time period Ta(1) from the time point c to the time point n will be described below. The time period from the time point a to the time point c is for the light-emitting chip Ua1 (U) to start its operation. Signals in this time period will be described in the description of the operation later.

The signal waveforms of the first transfer signal φ1a, the second transfer signal φ2a and the light-up signal φIa in the time period Ta(1) will be described.

The first transfer signal φ1a is at "L" ("L" (−3.3V) in the first exemplary embodiment) at the time point c, and shifts from "L" to "H" ("H" (0V) in the first exemplary embodiment) at the time point g. Then, the first transfer signal φ1a shifts from "H" to "L" at the time point l, and maintains "L" at the time point n.

The second transfer signal φ2a is at "H" at the time point c, and shifts from "H" to "L" at the time point f. Then, the second transfer signal φ2a shifts from "L" to "H" at the time point m, and maintains "H" at the time point n.

Here, the first transfer signal φ1a is compared with the second transfer signal φ2a, and it is seen that the waveform of the first transfer signal φ1a in the time period Ta(1) becomes the waveform of the second transfer signal φ2a after ½ of the time period Ta(1) is passed.

That is, the first transfer signal φ1a and the second transfer signal φ2a have signal waveforms that repeat with the time period T. Then, the potential of "H" and "L" are repeated alternately between the first transfer signal φ1a and the second transfer signal φ2a, with a time period in which both first and second transfer signals φ1a and φ2a are at "L", as shown in the time period from the time point f to the time point g, being interposed. The first transfer signal φ1a and the second transfer signal φ2a do not share a time period in which both signals are at "H" simultaneously except for the time period from the time point a to the time point b.

By a pair of signals of the first transfer signal φ1a and the second transfer signal φ2a, the transfer thyristors T shown in FIG. 17 are sequentially turned on.

The light-up signal φIa shifts from "H" to "L" at the time point c, and then shifts from "L" to "H" at the time point k. At the time point n, the light-up signal φIa shifts from "H" to "L".

As will be described later, the light-up signal φIa supplies the light-emitting thyristors L with a current for lighting (emitting light).

The write signal φW1-1 is "H" at the time point c, shifts from "H" to "L" at the time point d, and shifts from "L" to "H" at a time point e. The write signal φW1-1 further shifts from "H" to "L" at the time point i, and shifts from "L" to "H" at a time point j. That is, in the time period Ta(1), the write signal φW1-1 has two time periods in which the write signal φW1 is "L". With respect to the former time period in which the write signal φW1-1 becomes "L" (from the time point d to the time point e), the latter time period in which the write signal φW1-1 becomes "L" (from the time point i to the time point j) is shifted behind by ½ of the time period T.

Then, the former time period in which the write signal φW1-1 becomes "L" (from the time point d to the time point e) is a time period in which the transfer thyristor T1 of the light-emitting chip Ua1 is in the ON state corresponding to the time period in which the first transfer signal φ1a is "L", and causes the light-emitting thyristor L1 of the light-emitting chip Ua1 to be shifted to a light-on state. The latter time period in which the write signal φW1-1 becomes "L" (from the time point i to the time point j) is a time period in which the transfer thyristor T1 of the light-emitting chip Ub1 is in the ON state corresponding to the time period in which the first transfer signal φ1b is "L", which is behind by ½ of the time period T, and causes the light-emitting thyristor L2 of the light-emitting chip Ub1 to be shifted to the light-on state.

In the time period Ta(1), the write signal φW2-1 has the waveform same as that of the write signal φW1-1. That is, the former time period in which the write signal φW2-1 becomes "L" (from the time point d to the time point e) is a time period in which the transfer thyristor T1 of the light-emitting chip Ua1 is in the ON state corresponding to the time period in which the first transfer signal φ1a is "L", and causes the light-emitting thyristor L2 of the light-emitting chip Ua1 to be shifted to a light-on state. The latter time period in which the write signal φW2-1 becomes "L" (from the time point i to the time point j) is a time period in which the transfer thyristor T1 of the light-emitting chip Ub1 is in the ON state corresponding to the time period in which the first transfer signal φ1b is "L", which is behind by ½ of the time period T, and causes the light-emitting thyristor L2 of the light-emitting chip Ub1 to be shifted to the light-on state.

Now, the operations of the light-emitting device 65 will be described according to the timing chart shown in FIG. 18 with reference to FIGS. 15A, 15B and 17.

(1) Time Point a

The state (initial state) of the light-emitting device 65 at the time point a, at which the reference potential Vsub and the power supply potential Vga are started to be supplied, will be described.

<Light-Emitting Device 65>

At the time point a in the timing chart shown in FIG. 18, the potential of the power supply line 200a is set at the reference potential Vsub of "H" (0V), and the potential of the power supply line 200b is set at the power supply potential Vga of "L" (−3.3V) (refer to FIG. 15B). Thus, the respective Vsub and Vga terminals of the light-emitting chips U (the light-emitting chips Ua1 to Ua20 and the light-emitting chips Ub1 to Ub20) are set at "H" and "L", respectively (refer to FIG. 17).

The transfer signal generating portion 120a of the signal generating circuit 110 sets both of the first and the second transfer signals φ1a and φ2a at "H," and the transfer signal generating portion 120b sets both of the first and the second transfer signals φ1b and φ2b at "H." Then, the first transfer signal lines 201a, 201b and the second transfer signal lines 202a, 202b are set at "H" (refer to FIG. 15B). Accordingly, the respective φ1 and φ2 terminals of the light-emitting chips U (the light-emitting chips Ua1 to Ua20 and the light-emitting chips Ub1 to Ub20) are set at "H." The potential of the first transfer signal line 72 connected to the φ1 terminal via the current limitation resistance R1 is also set at "H," and the potential of the second transfer signal line 73 connected to the φ1 terminal via the current limitation resistance R2 is also set at "H" (refer to FIG. 17).

Further, the light-up signal generating portion 140a of the signal generating circuit 110 sets the light-up signal φIa at "H," and the light-up signal generating portion 140b sets the light-up signal φIb at "H." Then, the light-up signal lines 204a and 204b are set at "H" (refer to FIG. 15B). Accordingly, the φI terminal of the light-emitting chip U is set at "H." The light-up signal lines 75-1 and 75-2 connected to the φI terminal are also set at "H" (refer to FIG. 17).

The write signal generating portion 150 of the signal generating circuit 110 sets the write signals φW1-1 to φW1-20φ and the write signals φW2-1 to φW2-20 at "H." Then, the write signal lines 205-1 to 205-20 and the write signal lines 206-1 to 206-20 are set at "H" (refer to FIG. 15B). Accordingly, the φW1 terminal and the φW2 terminal of the light-emitting chip U are set at "H" (refer to FIG. 17).

The φW1 terminal of the light-emitting chip U is connected to the write signal line 74-1 via the current limitation resistance Rw1, and the φW2 terminal is connected to the write signal line 74-2 via the current limitation resistance Rw2. Since both φW1 and φW2 terminals of the light-emitting chip U are set at "H", the write signal lines 74-1 and 74-2 are also set at "H" (refer to FIG. 17).

Next, operations of the light-emitting chips U (the light-emitting chips Ua1 to Ua20 and the light-emitting chips Ub1 to Ub20) will be described centered on the light-emitting chips Ua1 and Ub1 belonging to the light-emitting chip pair #1 according to the timing chart shown in FIG. 18 with reference to FIG. 17.

<Light-Emitting Chip Ua1>

Since the anodes of the transfer thyristors T, the write thyristors S and the light-emitting thyristors L are connected to the Vsub terminal, these anodes are set at "H."

On the other hand, respective cathodes of odd-numbered transfer thyristors T1, T3, T5, ... are connected to the first transfer signal line 72 and are set at "H." Respective cathodes of even-numbered transfer thyristors T2, T4, T6, ... are connected to the second transfer signal line 73 and are set at "H." Consequently, both the anode and the cathode of the transfer thyristor T are set at "H," thus the transfer thyristor T is in the OFF state.

Similarly, the cathodes of the odd-numbered write thyristors S are connected to the write signal line 74-1, and are set at "H." The cathodes of the even-numbered write thyristors S are connected to the write signal line 74-2, and are set at "H." Accordingly, both the anode and the cathode of the write thyristor S are set at "H," thus the write thyristor S is in the OFF state.

Further, the cathode of the light-emitting thyristor L is connected to the light-up signal lines 75-1 and 75-2, and is set at "H." Thus, both the anode and the cathode of the light-emitting thyristor L are set at "H," and the light-emitting thyristor L is in the OFF state.

The base of the coupling transistor Qt is connected to the second gate Gts of the transfer thyristor T. Since the transfer thyristor T is in the OFF state, the second gate Gts is at "H". Accordingly, since both the emitter and the base of the coupling transistor Qt are at "H", the coupling transistor Qt is in the OFF state.

Similarly, the base of the write transistor Qs is connected to the second gate Gss of the write thyristor S. Since the write thyristor S is in the OFF state, the second gate Gss is at "H". Accordingly, since both the emitter and the base of the write transistor Qs are at "H", the write transistor Qs is in the OFF state.

The first gate Gtf of the transfer thyristor T is connected to the power supply line 71 via the resistance Rt. The power supply line 71 is set at the power supply potential Vga of "L". Consequently, the potential of the first gate Gtf is at "L" except for the first gate Gtf of the transfer thyristor T1 to be described later.

The first gate Gsf of the write thyristor S is connected to the power supply line 71 via the resistance Rs. Consequently, the potential of the first gate Gsf is at "L".

Further, the first gate Glf of the light-emitting thyristor L is connected to the power supply line 71 via the resistance RL. Consequently, the potential of the first gate Glf is at "L."

From the above description, the threshold voltages of the transfer thyristor T, the write thyristor S and the light-emitting thyristor L, except for the transfer thyristor T1 to be described later, are obtained by subtracting the diffusion potential Vd (1.5V) form the potential of the first gates Gtf, Gsf and Glf ("L" (−3.3V)), namely, −4.8V.

The first gate Gtf of the transfer thyristor T1 on one end of the transfer thyristor array in FIG. 17 is connected to the second transfer signal line 73 via the start resistance R0. The second transfer signal line 73 is connected to the φ32 terminal of "H" via the current limitation resistance R2. Accordingly, the first gate Gtf of the transfer thyristor T1 is set at the potential determined by the current limitation resistance R2 between the φ2 terminal of "H" and the power supply line 71, the start resistance R0 and the resistance Rt.

Here, the threshold voltage of the transfer thyristor T1 is set so that the transfer thyristor T1 is turned on when the first transfer signal φ1a shifts from "H" (0V) to "L" (−3.3V). For example, when the first gate Gtf of the transfer thyristor T1 is supposed to be at a negative value close to "H" (0V), the threshold voltage of the transfer thyristor T1 is a value close to −1.5V.

<Light-Emitting Chip Ub1>

The initial state in the light-emitting chip Ub1 is the same as that in the light-emitting chip Ua1, and accordingly, description thereof will be omitted.

(2) Time Point b

At the time point b shown in FIG. 18, the first transfer signal φ1a transmitted to the light-emitting chip group #a shifts from "H" (0V) to "L" (−3.3V). Thereby, the light-emitting device 65 enters into an operating state.

<Light-Emitting Chip Ua1>

The first transfer signal line 72 shifts from "H" (0V) to "L" (−3.3V). Then, the transfer thyristor T1 with a threshold voltage of −1.5 V is turned on. However, since the threshold voltage of the odd-numbered transfer thyristors T having the number of not less than 3 is −4.8 V, thus those transfer thyristors T may not shift to the ON state. On the other hand, the even-numbered transfer thyristors T are not turned on because the second transfer signal φ2a is at "H" (0V).

When the transfer thyristor T1 is turned on, the first gate Gtf becomes "H" (0V) of the anode. The potential of the cathode (the first transfer signal line 72 in FIG. 17) of the transfer thyristor T1 becomes −1.5V, which is obtained by subtracting the diffusion voltage Vd (1.5V) from "H" (0V) of the anode of the transfer thyristor T1.

Moreover, when the transfer thyristor T1 is turned on, the coupling transistor Qt1, whose base is connected to the second gate Gts, shifts from the OFF state to the ON state. Then, the potential of the first collector Cf and the second collector Cs of the coupling transistor Qt1 becomes "H" (0V) of the emitter.

Then, the first gate Gtf of the transfer thyristor T2 connected to the second collector Cs becomes "H" (0V), and the threshold voltage of the transfer thyristor T2 becomes −1.5V.

On the other hand, when the first collector Cf of the coupling transistor Qt becomes "H" (0V), the first gate Gsf of each of the write thyristors S1 and S2 connected to the first collector becomes "H" (0V), and thereby the threshold value of each of the write thyristors S1 and S2 becomes −1.5V.

However, since both the write signal lines 74-1 and 74-2 are at "H", any of the write transistors S is not turned on.

In addition, any light-emitting thyristor L does not shift to the ON state.

In other words, only the transfer thyristor T1 is turned on at the time point b. Immediately after the time point b (refers to a steady state after some changes in the thyristor are caused by changes in a potential of a signal at the time point b here), the transfer thyristor T1 and the coupling transistor Qt1 are in the ON state, and the other transfer thyristors T, the write thyristors S, the light-emitting thyristors L, the coupling transistors Qt and the write transistors Qs are in the OFF state.

It should be noted that, hereinafter, the thyristors (the transfer thyristors T, the write thyristors S and the light-emitting thyristors L) and the transistors (the coupling transistors Qt and the write transistor Qs) in the ON state will be mentioned, whereas description of the thyristors (the transfer thyristors T, the write thyristors S and the light-emitting thyristors L) and the transistors (the coupling transistors Qt and the write transistor Qs) in the OFF state will be omitted.

<Light-Emitting Chip Ub1>

The signal transmitted to the light-emitting chip group #b to which the light-emitting chip Ub1 belongs does not change, and therefore, the initial state of the light-emitting chip Ub1 is maintained.

(3) Time Point c

At the time point c, the light-up signal $\phi$Ia transmitted to the light-emitting chip group #a shifts from "H" (0V) to "L" (−3.3V).

<Light-Emitting Chip Ua1>

Even if the light-up signal lines 75-1 and 75-2 become "L" (−3.3V), the threshold voltage of the light-emitting thyristors L is −4.8V, and therefore, none of the light-emitting thyristors L is turned on.

Therefore, the transfer thyristor T1 and the coupling transistor Qt1 are in the ON state immediately after the time point c.

<Light-Emitting Chip Ub1>

Since the signal transmitted to the light-emitting chip group #b to which the light-emitting chip Ub1 belongs does not change, the initial state of the light-emitting chip Ub1 is maintained.

(4) Time Point d

At the time point d, the write signals $\phi$W1-1 and $\phi$W2-1 transmitted to the light-emitting chip pair #1 to which the light-emitting chip Ua1 of the light-emitting chip group #a and the light-emitting chip Ub1 of the light-emitting chip group #b belong shift from "H" (0V) to "L" (−3.3V).

<Light-Emitting Chip Ua1>

The write signal lines 74-1 and 74-2 shift from "H" (0V) to "L" (−3.3V). Then, the write thyristors S1 and S2, whose threshold voltages are both −1.5V, are turned on. It should be noted that the write thyristors S with the number of not more than 3 are not turned on because the threshold voltage of the write thyristors S is −4.8V.

When the write thyristors S1 and S2 are turned on, the write transistors Qs1 and Qs2, whose bases are connected to the respective second gates Gss of the write thyristors S1 and S2, shift from the OFF state to the ON state. Then, the collector of each of the write transistors Qs1 and Qs2 becomes "H" (0V) of the emitter. Further, the cathodes of the write transistors Qs1 and Qs2 (the write signal lines 74-1 and 74-2) become −1.5V.

Since the first gates Glf of the light-emitting thyristors L1 and L2 are connected to the collectors of the write transistors Qs1 and Qs2, respectively, the potential of the first gates Glf becomes "H" (0V). Consequently, the threshold voltage of the light-emitting thyristors L1 and L2 becomes −1.5V.

Since the light-up signal line 75-1 to which the cathode of the light-emitting thyristor L1 is connected and the light-up signal line 75-2 to which the cathode of the light-emitting thyristor L2 is connected have already been at "L" (−3.3V) at the time point c, the light-emitting thyristors L1 and L2 are turned on to be lighted.

Then, the first gates Glf of the light-emitting thyristors L1 and L2 become "H" (0V), the cathodes (the light-up signal lines 75-1 and 75-2) become −1.5V.

Accordingly, immediately after the time point d, the transfer thyristor T1, the coupling transistor Qt1, the write thyristors S1 and S2, the write transistors Qs1 and Qs2 and the light-emitting thyristors L1 and L2 are in the ON state.

<Light-Emitting Chip Ub1>

The write signal lines 74-1 and 74-2 shift from "H" to "L". However, the threshold voltage of the write thyristors S is −4.8V. Accordingly, none of the write thyristors S is capable of turning on.

(5) Time Point e

At the time point e, the write signals $\phi$W1-1 and $\phi$W2-1 transmitted to the light-emitting chip pair #1, to which the light-emitting chip Ua1 of the light-emitting chip group #a and the light-emitting chip Ub1 of the light-emitting chip group #b belong, shift from "L" (−3.3V) to "H" (0V).

<Light-Emitting Chip Ua1>

The write signal lines 74 shift to "H" (0V). Since both the cathode and the anode become "H", the write thyristors S1 and S2 having been in the ON state are turned off. Then, the write transistors Qs1 and Qs2 shift from the ON state to the OFF state.

It should be noted that, since the light-up signal $\phi$Ia is at "L" (−3.3V), the light-emitting thyristors L1 and L2 in the ON state maintain the ON state.

Accordingly, immediately after the time point e, the transfer thyristor T1, the coupling transistor Qt1 and the light-emitting thyristors L1 and L2 are in the ON state.

<Light-Emitting Chip Ub1>

The write signal lines 74-1 and 74-2 that have been at "L" (−3.3V) return to "H" (0V).

(6) Time Point f

At the time point f, the second transfer signal $\phi$2a transmitted to the light-emitting chip group #a shifts from "H" (0V) to "L" (−3.3V).

The first transfer signal $\phi$1b transmitted to the light-emitting chip group #b shifts from "H" (0V) to "L" (−3.3V).

<Light-Emitting Chip Ua1>

The second transfer signal line 73 shifts from "H" (0V) to "L" (−3.3V). Then, the transfer thyristor T2 with the threshold voltage of −1.5V is turned on. However, the even-numbered transfer thyristors T with a number of not less than 4 does not shift to the ON state because the threshold voltage thereof is −4.8V.

When the transfer thyristor T2 is turned on, the potential of the cathode of the transfer thyristor T2 (the second transfer signal line 73 in FIG. 17) becomes −1.5V obtained by subtracting the diffusion potential Vd (1.5V) from "H" (0V) of the anode of the transfer thyristor T2.

When the transfer thyristor T2 is turned on, the coupling transistor Qt2, whose base is connected to the second gate Gts, shifts from the OFF state to the ON state. Then, the collector C of the coupling transistor Qt1 becomes "H" (0V) of the emitter.

Then, the first gate Gtf of the transfer thyristor T3 connected to the collector C becomes "H" (0V), and the threshold voltage of the transfer thyristor T3 becomes −1.5V.

Accordingly, immediately after the time point f, the transfer thyristors T1 and T2, the coupling transistors Qt1 and Qt2 and the light-emitting thyristors L1 and L2 are in the ON state.

<Light-Emitting Chip Ub1>

Operations of the light-emitting chip Ub1 at the time point f are similar to those of the light-emitting chip Ua1 at the time point b. That is, the transfer thyristor T1 is turned on. This causes the first transfer signal line 72 to become −1.5V. Further, the coupling transistor Q1 shifts from the OFF state to the ON state. Then, the threshold voltage of the write thyristors S1 and S2 becomes −1.5V.

In other words, the operations of the light-emitting chip Ub1 are shifted from the operations of the light-emitting chip Ua1 by ½ of the time period T (180 degrees in terms of phase).

Accordingly, immediately after the time point f, the transfer thyristor T1 and the coupling transistor Qt1 are in the ON state.

(7) Time Point g

At the time point g, the first transfer signal ϕ1a transmitted to the light-emitting chip group #a shifts from "L" (−3.3V) to "H" (0V).

<Light-Emitting Chip Ua1>

The first transfer signal line 72 shifts to "H" (0V). Then, the transfer thyristor T1 that has been in the ON state is turned off because both the anode and the cathode become "H".

Then, the coupling transistor Qt1 shifts from the ON state to the OFF state. The first gates Gsf of the write thyristors S1 and S2 become "L" (−3.3V) of the power supply line 71, and thereby the threshold voltage of the write thyristors S1 and S2 becomes −4.8V. That is, the threshold voltage of all the write thyristors S becomes −4.8V.

It should be noted that the light-emitting thyristors L1 and L2 that have been in the ON state maintain the ON state because the light-up signal ϕIa is at "L" (−3.3V).

Accordingly, immediately after the time point g, the transfer thyristor T2, the coupling transistor Qt2 and the light-emitting thyristors L1 and L2 are in the ON state.

<Light-Emitting Chip Ub1>

Since the signal transmitted to the light-emitting chip group #b, to which the light-emitting chip Ub1 belongs, is not changed, the state at the time point f is maintained.

(8) Time Point h

At the time point h, the light-up signal ϕIb transmitted to the light-emitting chip group #b shifts from "H" (0V) to "L" (−3.3V).

<Light-Emitting Chip Ua1>

Since the signal transmitted to the light-emitting chip group #a, to which the light-emitting chip Ua1 belongs, is not changed, the state at the time point g is maintained.

<Light-Emitting Chip Ub1>

Operations of the light-emitting chip Ub1 at the time point h are similar to those of the light-emitting chip Ua1 at the time point c. That is, even though the light-up signal line 75 becomes "L" (−3.3V), the threshold voltage of the light-emitting thyristors L is −4.8V, and therefore, none of the light-emitting thyristors L is turned on.

Accordingly, immediately after the time point h, the transfer thyristor T1 and the coupling transistor Qt1 are in the ON state.

(9) Time Point i

At the time point i, the write signals ϕW1-1 and ϕW2-1 transmitted to the light-emitting chip pair #1, to which the light-emitting chip Ua1 of the light-emitting chip group #a and the light-emitting chip Ub1 of the light-emitting chip group #b belong, shift from "H" (0V) to "L" (−3.3V).

<Light-Emitting Chip Ua1>

The write signal lines 74-1 and 74-2 shift from "H" to "L". However, the write thyristors S are at the threshold voltage of −4.8V. Consequently, none of the write thyristors S is capable of turning on.

Accordingly, immediately after the time point i, the transfer thyristor T2, the coupling transistor Qt2 and the light-emitting thyristors L1 and L2 are in the ON state.

<Light-Emitting Chip Ub1>

Operations of the light-emitting chip Ub1 at the time point i are similar to those of the light-emitting chip Ua1 at the time point d. That is, when the write signal lines 74-1 and 74-2 shift from "H" to "L", the write thyristors S1 and S2, both having the threshold voltage of −1.5V, are turned on.

When the write thyristors S1 and S2 are turned on, the write transistors Qs1 and Qs2 shift from the OFF state to the ON state. Then, the threshold voltage of the light-emitting thyristors L1 and L" becomes −1.5V.

Since the light-up signal line 75-1 to which the cathode of the light-emitting thyristor L1 is connected and the light-up signal line 75-2 to which the cathode of the light-emitting thyristor L2 is connected have already been at "L" (−3.3V) at the time point h, the light-emitting thyristors L1 and L2 are turned on to be lighted.

Accordingly, immediately after the time point i, the transfer thyristor T1, the coupling transistor Qt1, the write thyristors S1 and S2, the write transistors Qs1 and Qs2 and the light-emitting thyristors L1 and L2 are in the ON state.

(10) Time Point j

At the time point j, the write signals ϕW1-1 and ϕW2-1 transmitted to the light-emitting chip pair #1, to which the light-emitting chip Ua1 of the light-emitting chip group #a and the light-emitting chip Ub1 of the light-emitting chip group #b belong, shift from "L" (−3.3V) to "H" (0V).

<Light-Emitting Chip Ua1>

The write signal lines 74-1 and 74-2 that have been at "L" (−3.3V) return to "H" (0V).

Accordingly, immediately after the time point j, the transfer thyristor T2, the coupling transistor Qt2 and the light-emitting thyristors L1 and L2 are in the ON state.

<Light-Emitting Chip Ub1>

Operations of the light-emitting chip Ub1 at the time point j are similar to those of the light-emitting chip Ua1 at the time point e. That is, the write signal lines 74 shift to "H" (0V), and the write thyristors S1 and S2 that have been in the ON state are turned off. Then, the write transistors Qs1 and Qs2 shift from the ON state to the OFF state.

Accordingly, immediately after the time point j, the transfer thyristor T1, the coupling transistor Qt1 and the light-emitting thyristors L1 and L2 are in the ON state.

(11) Time Point k

At the time point k, the light-up signal ϕ1a transmitted to the light-emitting chip group #a shifts from "L" (−3.3V) to "H" (0V).

<Light-Emitting Chip Ua1>

The light-up signal lines 75-1 and 75-2 shift to "H" (0V). Then, since both the cathode and the anode become "H", the light-emitting thyristors L1 and L2 having been in the ON state are turned off, to be thereby lighted off (not lighted). This causes the first gates Glf of the light-emitting thyristors L1 and L2 to become "L" (−3.3V) of the power supply line 71 via the resistance RL. Then, the threshold voltage of the light-emitting thyristors L1 and L2 becomes −4.8V.

In other words, the light-emitting thyristors L1 and L2 in the light-emitting chip Ua1 are lighted on (emit light) (turned on) at a timing of shifting of the write signals ϕW1-1 and ϕW2-1 from "H" to "L" at the time point d, and are lighted off (turn off) at a timing of shifting the light-up signal φIa from "L" to "H" at the time point k. The time period from the time point d to the time point k corresponds to the lighting (light-emitting) period of the light-emitting thyristors L1 and L2 in the light-emitting chip Ua1.

Immediately after the time point k, the transfer thyristor T2 and the coupling transistor Qt2 are in the ON state.

<Light-Emitting Chip Ub1>

Since the signal transmitted to the light-emitting chip group #b, to which the light-emitting chip Ub1 belongs, is not changed, the state at the time point j is maintained.

(12) Time Point l

At the time point l, the first transfer signal φ1a transmitted to the light-emitting chip group #a shifts from "H" (0V) to "L" (−3.3V).

The second transfer signal φ2a transmitted to the light-emitting chip group #b shifts from "H" (0V) to "L" (−3.3V).

<Light-Emitting Chip Ua1>

The first transfer signal line 72 shifts from "H" (0V) to "L" (−3.3V). Then, the transfer thyristor T3 with the threshold voltage of −1.5V is turned on. However, since the threshold voltage of the even-numbered transfer thyristors T having the number of not less than 5 is −4.8 V, thus those transfer thyristors T may not shift to the ON state. In addition, the first gate Gtf of the transfer thyristor T1 is connected to the second transfer signal line 73 of −1.5V via the start resistance 0V, and is also connected to the power supply line 71 of "L" (−3.3V) via the resistance Rt. Accordingly, the threshold voltage of the first gate Gtf is −3V at the highest. Therefore, the transfer thyristor T3 with the threshold voltage of −1.5V is turned on.

Then, the coupling transistor Qt3 shifts from the OFF state to the ON state.

Similar to the case at the time point b, the first gate Gtf of the transfer thyristor T4 connected to the second collector Cs becomes "H" (0V), and thereby the threshold voltage of the transfer thyristor T4 becomes −1.5V.

On the other hand, the first gate Gsf of each of the write thyristors S3 and S4 connected to the first collector becomes "H" (0V), and the threshold voltage of each of the write thyristors S3 and S4 becomes −1.5V.

Accordingly, immediately after the time point l, the transfer thyristors T2 and T3 and the coupling transistors Qt2 and Qt3 are in the ON state.

<Light-Emitting Chip Ub1>

Operations of the light-emitting chip Ub1 at the time point l are similar to those of the light-emitting chip Ua1 at the time point f. That is, the second transfer signal line 73 shifts from "H" (0V) to "L" (−3.3V), and the transfer thyristor T2 with the threshold voltage of −1.5V is turned on. Then, the coupling transistor Qt2 shifts from the OFF state to the ON state, and the threshold voltage of the transfer thyristor T3 becomes −1.5V.

Accordingly, immediately after the time point l, the transfer thyristors T1 and T2, the coupling transistors Qt1 and Qt2, and the light-emitting thyristors L1 and L2 are in the ON state.

(13) Time Point m

At the time point m, the second transfer signal φ2a transmitted to the light-emitting chip group #a shifts from "L" (−3.3V) to "H" (0V). The first transfer signal φ1b transmitted to the light-emitting chip group #b shifts from "L" (−3.3V) to "H" (0V).

<Light-Emitting Chip Ua1>

The second transfer signal line 73 shifts to "H" (0V). Since both the cathode and the anode become "H", the transfer thyristor T2 having been in the ON state is turned off.

Then, the coupling transistor Qt2 shifts from the ON state to the OFF state.

Accordingly, immediately after the time point m, the transfer thyristor T3 and the coupling transistor Qt3 are in the ON state.

<Light-Emitting Chip Ub1>

Operations of the light-emitting chip Ub1 at the time point m are similar to those of the light-emitting chip Ua1 at the time point g. That is, the first transfer signal line 72 shifts to "H" (0V), and the transfer thyristor T1 is turned off. Then, the coupling transistor Qt1 shifts from the ON state to the OFF state, and thereby, the threshold voltage of the write thyristors S1 and S2 become −4.8V. That is, the threshold voltage of all the write thyristors S becomes −4.8V.

It should be noted that the light-emitting thyristors L1 and L2 in the ON state maintain the ON state because the light-up signal φIa is at "L" (−3.3V).

Accordingly, immediately after the time point m, the transfer thyristor T2, the coupling transistor Qt2 and the light-emitting thyristors L1 and L2 are in the ON state.

(14) Time Point n

At the time point n, the light-up signal φIa transmitted to the light-emitting chip group #a shifts from "H" (0V) to "L" (−3.3V).

<Light-Emitting Chip Ua1>

Operations of the light-emitting chip Ua1 at the time point n are similar to those of the light-emitting chip Ua1 at the time point c.

<Light-Emitting Chip Ub1>

Since the signal transmitted to the light-emitting chip group #b, to which the light-emitting chip Ub1 belongs, is not changed, the state at the time point j is maintained.

It should be noted that the operations of the light-emitting chip Ub1 are shifted behind the operations of the light-emitting chip Ua1 by ½ of the time period T.

That is, at the time point n and afterward, operations starting from the time point c are repeated.

It should be noted that, when the light-emitting thyristor L is not lighted up, the write signal φW2-1 may be maintained at "H" (0V) without setting the signal at "L" (−3.3V) as shown immediately after the time point o in the time period Tb(2).

As described above, in the third exemplary embodiment, it is possible to set the threshold voltage of the transfer thyristors T, the write thyristors S and the light-emitting thyristors L at −1.5V because the coupling transistors Qt and the write transistors Qs are used. Accordingly, the difference between the threshold voltage and the potential of "L" (−3.3V) of the first transfer signal line 72, the second transfer signal line 73, the write signal lines 74-1 and 74-2 and the light-up signal lines 75-1 and 75-2 is large. In other words, it is possible to have large operation margins.

Figure 19:
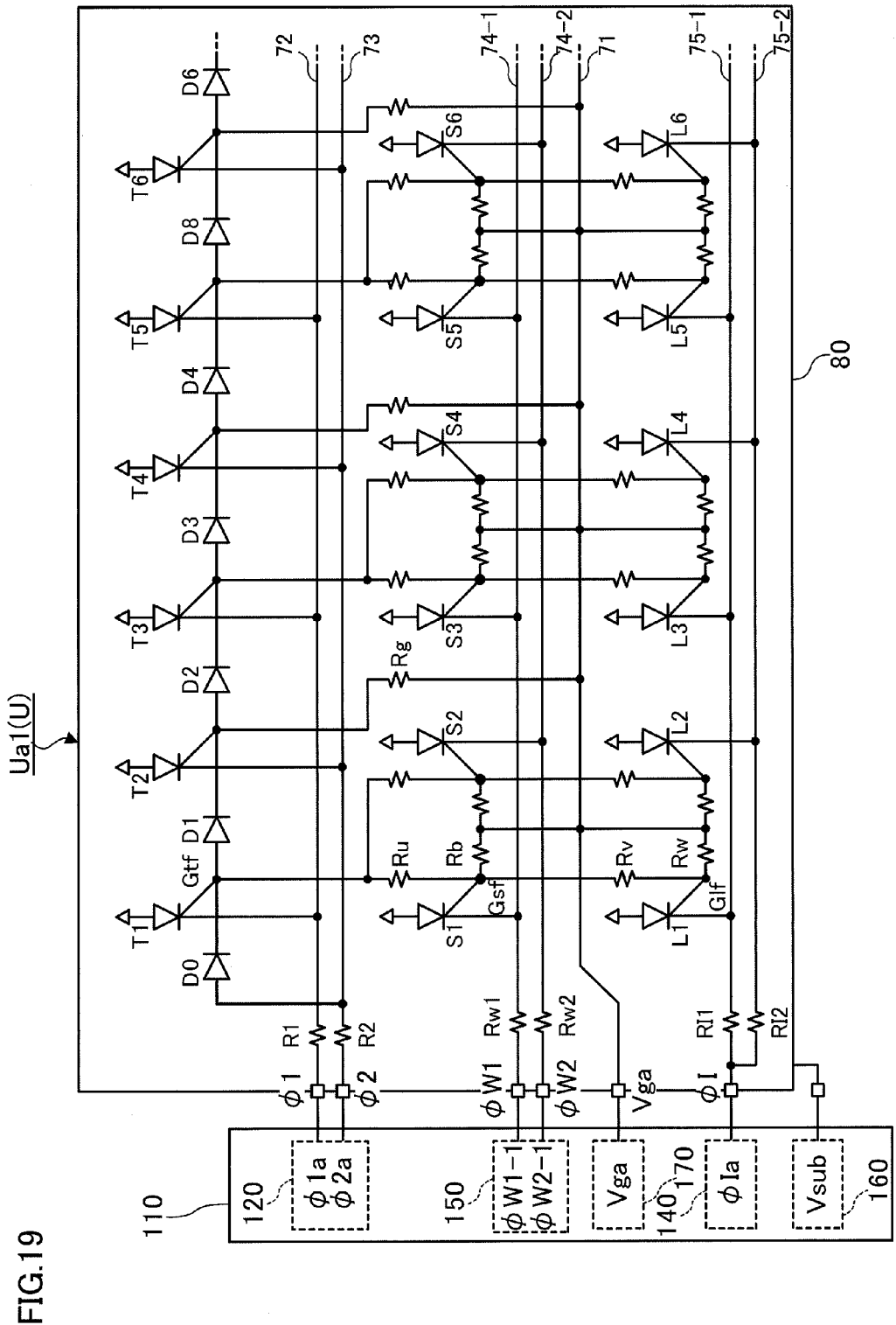
FIG. 19 is an equivalent circuit diagram for illustrating a circuit configuration of the light-emitting chip that mounts a self-scanning type light-emitting device array (SLED) to which the third exemplary embodiment is not applied.

FIG. 19 is an equivalent circuit diagram for illustrating a circuit configuration of the light-emitting chip U that mounts a self-scanning type light-emitting device array (SLED), to which the third exemplary embodiment is not applied. Hereinafter, similar components to those of the light-emitting chip U shown in FIG. 17 that mounts a self-scanning type light-emitting device array (SLED), to which the third exemplary embodiment is applied, are labeled with the same reference numerals, and detailed description thereof will be omitted, and different components will be described.

In the light-emitting chip U that mounts a self-scanning type light-emitting device array (SLED), to which the third exemplary embodiment is not applied, coupling diodes D are used instead of the coupling transistors Qt. In addition, a start diode D0 is used instead of the start resistance R0.

The first gates Gtf of the odd-numbered transfer thyristors T are connected to the first gates Gsf of the write thyristors S having the same numbers and the numbers larger by 1 via resistances Ru, respectively. These first gates Gsf are connected to the power supply line 71 via resistances Rb, and also connected to the first gates Glf of the light-emitting thyristors L having the same numbers via resistances Rv, respectively. The first gates Glf of the light-emitting thyristors L are connected to the power supply line 71 via the resistances Rw, respectively.

The first gates Gtf of the even-numbered transfer thyristors T are connected to the power supply line 71 via the resistances Rg, respectively.

Even the light-emitting chip U that mounts a self-scanning type light-emitting device array (SLED), to which the third exemplary embodiment is not applied, if being arranged as shown in FIG. 15B, operates according to the timing chart in FIG. 18.

Hereinafter, according to the timing chart in FIG. 18, the operations of the light-emitting chip U shown in FIG. 19, to which the third exemplary embodiment is not applied, will be described centered on portions different from those of the light-emitting chip U shown in FIG. 17, to which the third exemplary embodiment is applied.

Here, in FIG. 19, it is assumed that the ratio of the resistance value (Ru) of the resistance Ru, the resistance value (Rv) of the resistance Rv, the resistance value (Rw) of the resistance Rw and the resistance value (Rb) of the resistance Rb is Ru:Rv:Rw:Rb=0.2:1:1:1.

At the time point a in FIG. 18, in the start diode D0, an anode is connected to the second transfer signal line 73 of "H" (0V), and a cathode is connected to the power supply line 73 ("L" (−3.3V)) via the resistances Ru and Rb. Accordingly, the start diode D0 has a forward bias, and the potential of the cathode is −1.5V, which is obtained by subtracting the diffusion potential (1.5V) from the potential "H" (0V) of the anode. The first gate Gtf of the transfer thyristor T1 is connected to the cathode of the start diode D0. Accordingly, the threshold voltage of the transfer thyristor T1 is −3V.

In addition, the cathode of the start diode D0 with the potential of −1.5V is connected to an anode of the coupling diode D1. A cathode of the coupling diode D1 is connected to the power supply line 71 ("L" (−3.3V)) via the resistance Rg. Accordingly, the coupling diode D1 also has a forward bias, and the potential of the cathode of the coupling diode D1 is −3V, which is obtained by subtracting the diffusion potential Vd (1.5V) from −1.5V of the anode.

Then, the first gate Gtf of the transfer thyristor T2 is connected to the cathode of the coupling diode D1 with the potential of −3V. Accordingly, the threshold voltage of the transfer thyristor T2 is −4.5V.

It should be noted that the coupling diodes D having the number of 1 or more are not affected by the potential of the anode of the start diode D0 being "H" (0V), and the first gates of the transfer thyristors T having the number of not less than 3 connected to the cathodes of the coupling diodes D, respectively, are also connected to the power supply line 71 ("L" (−3.3V)) via the respective resistances Rg. Accordingly, the threshold voltage of these transfer thyristors T is −4.8V.

The first gate Gsf of the write thyristor S1 is connected to the power supply line 71 ("L" (−3.3V)) via the resistance Rb, and also connected to the first gate Gtf of the transfer thyristor T1 with the potential of −1.5V via the resistance Ru. The first gate Gsf of the light-emitting thyristor L1 is connected to the power supply line 71 ("L" (−3.3V)) via the resistance Rw, and also connected to the first gate Gtf of the write thyristor S1 via the resistance Rv.

The same is true for the write thyristor S2 and the light-emitting thyristor L2.

Consequently, supposing that Ru:Rv:Rw:Rb=0.2:1:1:1, the potential of the first gates Gsf of the write thyristors S1 and S2 is −1.92V, the threshold voltage of the write thyristors S1 and S2 is −3.42V, the potential of the first gates Glf of the light-emitting thyristors L1 and L2 is −2.61V and the threshold voltage of the light-emitting thyristors L1 and L2 is −4.11V.

It should be noted that the potential of the first gates Gsf of the write thyristors S having the number of not less than 3 and the potential of the first gates Glf of the light-emitting thyristors L are −3.3V, and the threshold voltage of the write thyristors S1 and S2 and the light-emitting thyristors L1 and L2 is −4.8V.

Moreover, at the time point b, the first transfer signal φ1 shifts from "H" (0V) to "L" (−3.3V), and then the transfer thyristor T1 with the threshold voltage of −3V is turned on. Then, the first gate Gtf of the transfer thyristor T1 becomes "H" (0V), and then the anode of the coupling diode D1 becomes "H" (0V).

Since the cathode of the coupling diode D1 is connected to the power supply line 71 ("L" (−3.3V)) via the resistance Rg, the coupling diode D1 has a forward bias and the potential of the cathode becomes −1.5V, which is obtained by subtracting the diffusion potential Vd (1.5V) from "H" (0V) of the anode. The first gate Gtf2 of the transfer thyristor T2 is connected to the anode of the coupling diode D1 with the potential of −1.5V, and thereby the threshold voltage of the transfer thyristor T2 becomes −3V.

It should be noted that the potential of the cathode of the coupling diode D3 connected to the first gate Gtf of the transfer thyristor T3 becomes −3V, and the threshold voltage of the transfer thyristor T3 becomes −4.5V.

Since the potential of the first gates Gtf of the transfer thyristors T having the number of not less than 4 is −3.3V, the threshold voltage of these transfer thyristors is maintained to be −4.8V.

At this time, the potential of the first gates Gsf of the write thyristors S1 and S2 becomes −0.76V, and thereby the threshold voltage of the write thyristors S1 and S2 becomes −2.26V, and the potential of the first gates Glf of the light-emitting thyristors L1 and L2 becomes −2.03V, and thereby the threshold voltage of the light-emitting thyristors L1 and L2 becomes −3.52V.

It should be noted that the first gates Gsf of the write thyristors S3 and S4 are connected to the first gates Gtf of the transfer thyristor T3 with the potential of −3V via the resistances Ru. Accordingly, the potential of the first gates Gsf of the write thyristors S1 and S2 becomes −3.07V, and thereby the threshold voltage of the write thyristors S1 and S2 becomes −4.57V, and the potential of the first gate Glf of the light-emitting thyristors L1 and L2 becomes −3.18V, and thereby the threshold voltage of the light-emitting thyristors L1 and L2 becomes −4.68V.

It should be noted that the threshold voltage of the write thyristors S having the number of not less than 5 and the light-emitting thyristors L is maintained to be −4.8V.

At the time point d, the write signals φW1-1 and φW2-1 shift from "H" (0V) to "L" (−3.3V), and then the write thyristors S1 and S2 with the threshold voltage of −2.26V are both turned on. The potential of the first gates Gtf of the write thyristors S1 and S2 become "H" (0V). Then, the first gate Gtf of the light-emitting thyristor L1 is connected to the first gate Gtf of the write thyristor S1 of "H" (0V) via the resistance Rv, and is also connected to the power supply line 71 ("L" (−3.3V)) via the resistance Rw, and therefore, the potential of the first gate Gtf of the light-emitting thyristor L1 becomes −1.65V. Accordingly, the threshold voltage of the light-emitting thyristor L1 becomes −3.15V. The same is true for the light-emitting thyristor L2.

At this time, since the light-up signal φ1a has already shifted from "H" (0V) to "L" (−3.3V) at the time point c, the light-emitting thyristors L1 and L2 are turned on.

In other words, when the odd-numbered transfer thyristors T are in the ON state and the write thyristors S are turned on, the light-emitting thyristors L are lighted on.

The light-emitting device 65 that includes the light-emitting chip U shown in FIG. 19, to which the third exemplary embodiment is not applied, also operates according to the timing chart shown in FIG. 18, though operations at the other time points will not be described.

However, the threshold voltage of the transfer thyristors T when being turned on is −3V, and the potential difference with "L" (−3.3V) of the first transfer signal φ1 or the second transfer signal φ2 is 0.3V. Further, the threshold voltage of the write thyristors S when being turned on is −2.26V, and the potential difference with "L" (−3.3V) of the write signals φW1 and φW2 is 1.04V. Then, the threshold voltage of the light-emitting thyristors L when being turned on is −3.15V, and the potential difference with "L" (−3.3V) of the light-up signal φI is 0.15V.

In the coupling diodes D, since the diffusion potential Vd is generated between the cathode and the anode, the threshold voltage of the transfer thyristors T is twice the diffusion potential Vd (2×Vd). Accordingly, it is impossible to make the potential difference between the threshold voltage of the transfer thyristors T and "L" (−3.3V) of the first transfer signal φ1 or the second transfer signal φ2 larger than 0.3V.

On the other hand, in the light-emitting chip U shown in FIG. 17, to which the third exemplary embodiment is applied, the threshold voltage of the transfer thyristors T, the write thyristors S and the light-emitting thyristors L when being turned on is −1.5V, and the potential difference with "L" (−3.3V) of the first transfer signal φ1 or the second transfer signal φ2, the write signals φW1 and φW2 and the light-up signal φI is 1.8V.

In short, the light-emitting chip U shown in FIG. 17, to which the third exemplary embodiment is applied, has larger operation margins compared to the light-emitting chip U shown in FIG. 19, to which the third exemplary embodiment is not applied. It should be noted that, in the light-emitting device 65 that includes the light-emitting chip U shown in FIG. 19, to which the third exemplary embodiment is not applied, the potential difference between the threshold voltage of the write thyristors S and the write signals φW1 and φW2 and the potential difference between the threshold voltage of the light-emitting thyristors L and the light-up signal φI can be adjusted by magnitudes of the resistances Ru, Rv, Rw and Rb. However, even though these potential differences are adjusted, it is difficult for the light-emitting device 65 that includes the light-emitting chip U, to which the third exemplary embodiment is not applied, to make the operation margins larger compared to the light-emitting device 65 that includes the light-emitting chip U, to which the third exemplary embodiment is applied.

In addition, in the light-emitting chip U shown in FIG. 19, to which the third exemplary embodiment is not applied, when the light-emitting thyristors L come to the ON state, the resistance Rv reduces the resistance value thereof upon receiving modulation in conductivity. For example, if it is assumed that Rv:Rb=0.1:1, the threshold voltage of the write thyristors S becomes −1.8V. Even though, for example, any one of the odd-numbered write thyristors S is in the ON state and the potential of the write signal line 74-1 is −1.5V, if the light-emitting thyristor L of the different number is in the ON state, the threshold voltage of the write thyristor S of the different number required to be maintained becomes −1.8V, and accordingly, there is a possibility that the write thyristor S of the different number is erroneously turned on due to a noise or the like.

In contrast, in the light-emitting chip U shown in FIG. 17, to which the third exemplary embodiment is applied, the light-emitting thyristor L is connected to the write thyristor S via the write transistor Qs. Accordingly, if the write transistor Qs is in the OFF state, the write thyristor S is not affected by the light-emitting thyristor L being in the ON state.

Consequently, the light-emitting chip U shown in FIG. 17, to which the third exemplary embodiment is applied, suppresses occurrence of malfunctions compared to the light-emitting chip U shown in FIG. 19, to which the third exemplary embodiment is not applied.

It should be noted that, in the light-emitting device 65 shown in FIGS. 15A, 15B and 16, to which the third exemplary embodiment is applied, the light-emitting chip U is divided into two light-emitting chip groups; however, the light-emitting chip U may be divided into the three or more light-emitting chip groups.

Moreover, in the light-emitting chip U shown in FIG. 17, to which the third exemplary embodiment is applied, the light-emitting chip U is configured to perform lighting control on two light-emitting thyristors L by the odd-numbered transfer thyristors T. The lighting control may be performed on the three or more light-emitting thyristors by the odd-numbered transfer thyristors T. Moreover, the plural light-emitting thyristors L may be subjected to the lighting control by the even-numbered transfer thyristors L.

Further, the light-emitting chip U may be configured so that all the transfer thyristors T perform the lighting control on the light-emitting thyristors L, respectively.

In the first, second and third exemplary embodiments, description has been given by assuming that the thyristor (the transfer thyristor T, the light-emitting thyristor L and the write thyristor S (the third exemplary embodiment)) is configured as the anode common in which the anodes are connected to the substrate 80, and that the transistor (the coupling transistor Q (the first and second exemplary embodiments), the coupling transistor Qt (the third exemplary embodiment) and the write transistor Qs (the third exemplary embodiment)) is configured as the pnp-bipolar transistor. By changing the polarity of the circuit, the thyristor (the transfer thyristor T, the light-emitting thyristor L and the write thyristor S) may be configured as the cathode common in which the cathodes are connected to the substrate 80, and the transistor (the coupling transistor Q, the coupling transistor Qt and the write transistor Qs) may be configured as the npn-bipolar transistor.

Moreover, in the first, second and third exemplary embodiments, the transfer thyristor T is driven by the two-phase transfer signal, namely, the first transfer signal φ1 and the second transfer signal φ2; however, a transfer signal having three or more phases may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light-emitting component comprising:
a plurality of transfer thyristors, each configured with a semiconductor layer stack in which a first semiconductor layer of a first conduction type, a second semiconductor layer of a second conduction type, which is different from the first conduction type, a third semiconductor layer of the first conduction type and a fourth semiconductor layer of the second conduction type are laminated in order, each of the plurality of transfer thyristors shifting to an ON state in order;
a plurality of coupling transistors, each configured with the first semiconductor layer, the second semiconductor layer and the third semiconductor layer in the semiconductor layer stack, provided to couple a former transfer thyristor and a latter transfer thyristor that are adjacent in the order of transferring the ON state in the plurality of transfer thyristors, and setting the latter transfer thyristor in a condition capable of shifting to the ON state by causing the coupling transistor itself to be in the ON state affected by the former transfer thyristor shifting to the ON state, the first semiconductor layer and the second semiconductor layer of each coupling transistor being continued to the first semiconductor layer and the second semiconductor layer of the former transfer thyristor;
a plurality of first resistances, each provided between the third semiconductor layer of each of the plurality of transfer thyristors and a wiring for power supply;
a second resistance provided on an end portion of a wiring that is commonly connected to the fourth semiconductor layer of each of the plurality of transfer thyristors for supplying a potential to set the transfer thyristor in the ON state, a resistance value of the second resistance being smaller than a product of a resistance value the first resistance and a ratio of a collector current of one of the plurality of coupling transistors connected subsequent to one of the plurality of transfer thyristors that is in the ON state to a cathode current of the transfer thyristor in the ON state; and
a plurality of light-emitting thyristors, each configured with the semiconductor layer stack, being set in a light-enabled state corresponding to one of the plurality of transfer thyristors that is in the ON state, and emitting light of a predetermined wavelength by shifting from an OFF state to the ON state.

2. The light-emitting component according to claim 1, wherein double of the resistance value of the second resistance is smaller than a product of the resistance value of the first resistance and the ratio of the collector current of one of the plurality of coupling transistors connected subsequent to one of the plurality of transfer thyristors that is in the ON state to a cathode current of the transfer thyristor in the ON state.

3. The light-emitting component according to claim 1, wherein, in each of the plurality of coupling transistors, the first semiconductor layer, the second semiconductor layer and the third semiconductor layer are continued to the first semiconductor layer, the second semiconductor layer and the third semiconductor layer, respectively, in one of the plurality of transfer thyristors, which is connected subsequent to the coupling transistor.

4. The light-emitting component according to claim 2, wherein, in each of the plurality of coupling transistors, the first semiconductor layer, the second semiconductor layer and the third semiconductor layer are continued to the first semiconductor layer, the second semiconductor layer and the third semiconductor layer, respectively, in one of the plurality of transfer thyristors, which is connected subsequent to the coupling transistor.

5. The light-emitting component according to claim 3, wherein, in each of the plurality of transfer thyristors, a length of the third semiconductor layer, on which the fourth semiconductor layer forming the transfer thyristor is provided, extending off from one end portion of the fourth semiconductor layer in a direction toward a side to which the ON state is to be transferred is shorter than a length of the third semiconductor layer extending off from the other end portion of the fourth semiconductor layer in a direction toward a side from which the ON state has been transferred.

6. The light-emitting component according to claim 4, wherein, in each of the plurality of transfer thyristors, a length of the third semiconductor layer, on which the fourth semiconductor layer forming the transfer thyristor is provided, extending off from one end portion of the fourth semiconductor layer in a direction toward a side to which the ON state is to be transferred is shorter than a length of the third semiconductor layer extending off from the other end portion of the fourth semiconductor layer in a direction toward a side from which the ON state has been transferred.

7. The light-emitting component according to claim 1, further comprising:
a plurality of write thyristors, each configured with the semiconductor layer stack, connected to any one of the plurality of coupling transistors and shifting from the OFF state to the ON state affected by the coupling transistor shifting from the OFF state to the ON state; and
a plurality of write transistors each configured with the first semiconductor layer, the second semiconductor layer and the third semiconductor layer in the semiconductor layer stack, provided corresponding to each of the plurality of write thyristors, connected to any one of the plurality of light-emitting thyristors and setting the connected light-emitting thyristor in a light-enabled state by shifting from the OFF state to the ON state affected by the corresponding write thyristor shifting from the OFF state to the ON state.

8. The light-emitting component according to claim 2, further comprising:
a plurality of write thyristors, each configured with the semiconductor layer stack, connected to any one of the plurality of coupling transistors and shifting from the OFF state to the ON state affected by the coupling transistor shifting from the OFF state to the ON state; and
a plurality of write transistors each configured with the first semiconductor layer, the second semiconductor layer and the third semiconductor layer in the semiconductor layer stack, provided corresponding to each of the plurality of write thyristors, connected to any one of the plurality of light-emitting thyristors and setting the connected light-emitting thyristor in a light-enabled state by shifting from the OFF state to the ON state affected by the corresponding write thyristor shifting from the OFF state to the ON state.

9. The light-emitting component according to claim 3, further comprising:
a plurality of write thyristors, each configured with the semiconductor layer stack, connected to any one of the plurality of coupling transistors and shifting from the OFF state to the ON state affected by the coupling transistor shifting from the OFF state to the ON state; and
a plurality of write transistors each configured with the first semiconductor layer, the second semiconductor layer and the third semiconductor layer in the semiconductor layer stack, provided corresponding to each of the plurality of write thyristors, connected to any one of the plurality of light-emitting thyristors and setting the connected light-emitting thyristor in a light-enabled state by shifting from the OFF state to the ON state affected by the corresponding write thyristor shifting from the OFF state to the ON state.

10. The light-emitting component according to claim 4, further comprising:
a plurality of write thyristors, each configured with the semiconductor layer stack, connected to any one of the plurality of coupling transistors and shifting from the OFF state to the ON state affected by the coupling transistor shifting from the OFF state to the ON state; and
a plurality of write transistors each configured with the first semiconductor layer, the second semiconductor layer and the third semiconductor layer in the semiconductor layer stack, provided corresponding to each of the plurality of write thyristors, connected to any one of the plurality of light-emitting thyristors and setting the connected light-emitting thyristor in a light-enabled state by shifting from the OFF state to the ON state affected by the corresponding write thyristor shifting from the OFF state to the ON state.

11. The light-emitting component according to claim 5, further comprising:
a plurality of write thyristors, each configured with the semiconductor layer stack, connected to any one of the plurality of coupling transistors and shifting from the OFF state to the ON state affected by the coupling transistor shifting from the OFF state to the ON state; and
a plurality of write transistors each configured with the first semiconductor layer, the second semiconductor layer and the third semiconductor layer in the semiconductor layer stack, provided corresponding to each of the plurality of write thyristors, connected to any one of the plurality of light-emitting thyristors and setting the connected light-emitting thyristor in a light-enabled state by shifting from the OFF state to the ON state affected by the corresponding write thyristor shifting from the OFF state to the ON state.

12. The light-emitting component according to claim 6, further comprising:
a plurality of write thyristors, each configured with the semiconductor layer stack, connected to any one of the plurality of coupling transistors and shifting from the OFF state to the ON state affected by the coupling transistor shifting from the OFF state to the ON state; and
a plurality of write transistors each configured with the first semiconductor layer, the second semiconductor layer and the third semiconductor layer in the semiconductor layer stack, provided corresponding to each of the plurality of write thyristors, connected to any one of the plurality of light-emitting thyristors and setting the connected light-emitting thyristor in a light-enabled state by shifting from the OFF state to the ON state affected by the corresponding write thyristor shifting from the OFF state to the ON state.

13. A print head comprising:
a light-emitting unit including:
a plurality of transfer thyristors, each configured with a semiconductor layer stack in which a first semiconductor layer of a first conduction type, a second semiconductor layer of a second conduction type, which is different from the first conduction type, a third semiconductor layer of the first conduction type and a fourth semiconductor layer of the second conduction type are laminated in order, each of the plurality of transfer thyristors shifting to an ON state in order;

a plurality of coupling transistors, each configured with the first semiconductor layer, the second semiconductor layer and the third semiconductor layer in the semiconductor layer stack, provided to couple a former transfer thyristor and a latter transfer thyristor that are adjacent in the order of transferring the ON state in the plurality of transfer thyristors, and setting the latter transfer thyristor in a condition capable of shifting to the ON state by causing the coupling transistor itself to be in the ON state affected by the former transfer thyristor shifting to the ON state, the first semiconductor layer and the second semiconductor layer of each coupling transistor being continued to the first semiconductor layer and the second semiconductor layer of the former transfer thyristor;
a plurality of first resistances, each provided between the third semiconductor layer of each of the plurality of transfer thyristors and a wiring for power supply;
a second resistance provided on an end portion of a wiring that is commonly connected to the fourth semiconductor layer of each of the plurality of transfer thyristors for supplying a potential to set the transfer thyristor in the ON state, a resistance value of the second resistance being smaller than a product of a resistance value the first resistance and a ratio of a collector current of one of the plurality of coupling transistors connected subsequent to one of the plurality of transfer thyristors that is in the ON state to a cathode current of the transfer thyristor in the ON state; and
a plurality of light-emitting thyristors, each configured with the semiconductor layer stack, being set in a light-enabled state corresponding to one of the plurality of transfer thyristors that is in the ON state, and emitting light of a predetermined wavelength by shifting from an OFF state to the ON state, and
an optical unit that forms an image with light emitted from the light-emitting unit.

14. An image forming apparatus comprising:
an image carrier;
a charging unit that charges the image carrier;
an exposure unit that includes a light-emitting section and exposes the image carrier charged by the charging unit with light emitted by the light-emitting section through an optical section, the light-emitting section including:
a plurality of transfer thyristors, each configured with a semiconductor layer stack in which a first semiconductor layer of a first conduction type, a second semiconductor layer of a second conduction type, which is different from the first conduction type, a third semiconductor layer of the first conduction type and a fourth semiconductor layer of the second conduction type are laminated in order, each of the plurality of transfer thyristors shifting to an ON state in order;
a plurality of coupling transistors, each configured with the first semiconductor layer, the second semiconductor layer and the third semiconductor layer in the semiconductor layer stack, provided to couple a former transfer thyristor and a latter transfer thyristor that are adjacent in the order of transferring the ON state in the plurality of transfer thyristors, and setting the latter transfer thyristor in a condition capable of shifting to the ON state by causing the coupling transistor itself to be in the ON state affected by the former transfer thyristor shifting to the ON state, the first semiconductor layer and the second semiconductor layer of each coupling transistor being continued to the first semiconductor layer and the second semiconductor layer of the former transfer thyristor;

a plurality of first resistances, each provided between the third semiconductor layer of each of the plurality of transfer thyristors and a wiring for power supply;

a second resistance provided on an end portion of a wiring that is commonly connected to the fourth semiconductor layer of each of the plurality of transfer thyristors for supplying a potential to set the transfer thyristor in the ON state, a resistance value of the second resistance being smaller than a product of a resistance value the first resistance and a ratio of a collector current of one of the plurality of coupling transistors connected subsequent to one of the plurality of transfer thyristors that is in the ON state to a cathode current of the transfer thyristor in the ON state; and a plurality of light-emitting thyristors, each configured with the semiconductor layer stack, being set in a light-enabled state corresponding to one of the plurality of transfer thyristors that is in the ON state, and emitting light of a predetermined wavelength by shifting from an OFF state to the ON state;

a developing unit that develops an electrostatic latent image formed on the image carrier by exposure of the exposure unit; and a transfer unit that transfers an image developed on the image carrier onto a transferred body.

* * * * *